United States Patent
Swager et al.

(10) Patent No.: US 11,891,481 B2
(45) Date of Patent: Feb. 6, 2024

(54) POLY(ARYL ETHER) BASED POLYMERS AND ASSOCIATED GAS SEPARATION MEMBRANES

(71) Applicant: Massachusetts Institute of Technology, Cambridge, MA (US)

(72) Inventors: Timothy Manning Swager, Newton, MA (US); Zachary Smith, Belmont, MA (US); Francesco Maria Benedetti, Urbania (IT); Sheng Guo, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 159 days.

(21) Appl. No.: 17/357,252

(22) Filed: Jun. 24, 2021

(65) Prior Publication Data
US 2022/0282041 A1    Sep. 8, 2022

Related U.S. Application Data

(60) Provisional application No. 63/155,697, filed on Mar. 2, 2021.

(51) Int. Cl.
*B01D 53/22* (2006.01)
*C08G 65/40* (2006.01)
(Continued)

(52) U.S. Cl.
CPC ....... *C08G 65/4075* (2013.01); *B01D 53/228* (2013.01); *B01D 67/0006* (2013.01); *B01D 67/0093* (2013.01); *B01D 69/02* (2013.01); *B01D 71/52* (2013.01); *C08G 65/4087* (2013.01); *C08G 65/485* (2013.01); *C08J 5/18* (2013.01); *B01D 2325/20* (2013.01); *B01D 2325/34* (2013.01); *C08G 2650/36* (2013.01); *C08J 2371/12* (2013.01)

(58) Field of Classification Search
CPC ............... B01D 71/52; B01D 67/0093; B01D 2325/34; B01D 67/0006; B01D 2325/20; B01D 53/228; B01D 69/02; C08J 2371/12; C08J 5/18; C08G 65/485; C08G 2650/36; C08G 65/4075; C08G 65/4087
See application file for complete search history.

(56) References Cited

U.S. PATENT DOCUMENTS 1,932,688 A * 10/1933 Brubaker ............... C08G 63/48
                                                         528/295.5
5,030,252 A *  7/1991 Sanders, Jr. ........... B01D 71/52
                                                            95/55
(Continued)

FOREIGN PATENT DOCUMENTS

WO    WO 2017/015336 A1    1/2017
WO    WO 2017/195068 A1    11/2017

OTHER PUBLICATIONS

International Search Report and Written Opinion for Application No. PCT/US2021/065072, dated Apr. 22, 2022.
(Continued)

*Primary Examiner* — Anthony R Shumate
(74) *Attorney, Agent, or Firm* — Wolf, Greenfield & Sacks, P.C.

(57) ABSTRACT

Compositions and methods related to the synthesis and application of poly(aryl ether)s are generally described.

14 Claims, 44 Drawing Sheets

(51) Int. Cl.
  C08G 65/48    (2006.01)
  C08J 5/18     (2006.01)
  B01D 71/52    (2006.01)
  B01D 67/00    (2006.01)
  B01D 69/02    (2006.01)

(56) References Cited

U.S. PATENT DOCUMENTS

| | | | | |
|---|---|---|---|---|
| 5,034,034 | A | * | 7/1991 | Sanders, Jr. ............ C08G 64/12 96/13 |
| 5,082,921 | A | * | 1/1992 | Parker ................ C08G 65/4031 528/125 |
| 6,913,696 | B1 | * | 7/2005 | Korngold ............. B01D 61/362 210/500.36 |
| 9,676,906 | B1 | | 6/2017 | Huang et al. |
| 2005/0191841 | A1 | * | 9/2005 | Aoyama ............ H01L 21/76807 438/619 |
| 2006/0155097 | A1 | * | 7/2006 | Weber .................... C08G 75/23 528/125 |
| 2007/0117954 | A1 | | 5/2007 | Swager et al. |
| 2012/0223010 | A1 | * | 9/2012 | Mickols ................. C08G 65/48 210/500.33 |
| 2015/0322210 | A1 | * | 11/2015 | Sriram ................. C08G 65/332 528/391 |
| 2019/0054429 | A1 | * | 2/2019 | Di Nicolo' ............. B01D 69/06 |
| 2019/0060835 | A1 | * | 2/2019 | Ding ...................... B01D 71/48 |
| 2020/0282363 | A1 | * | 9/2020 | Harrigan ................ B01D 71/48 |
| 2022/0040647 | A1 | * | 2/2022 | Di Nicolo' ............. C08G 65/40 |
| 2022/0282042 | A1 | | 9/2022 | Swager et al. |

OTHER PUBLICATIONS

Bezzu et al., A spirobifluorene-based polymer of intrinsic microporosity with improved performance for gas separation. Adv Mater. Nov. 20, 2012;24(44):5930-3. doi: 10.1002/adma.201202393. Epub Sep. 7, 2012.

Carta et al., An efficient polymer molecular sieve for membrane gas separations. Science. Jan. 18, 2013;339(6117):303-7.

Gao et al., Controlling fluoride-forming reactions for improved rate capability in lithium-perfluorinated gas conversion batteries. Adv Energy Mater 2019; 1900393.

Gao et al., Advances in the chemistry and applications of alkali-metal-gas batteries. Nat Rev Chem. Oct. 2020; 4:566-83.

He et al., Electrochemical Conversion of Nitrogen Trifluoride as a Gas-to-Solid Cathode in Li Batteries. J Phys Chem Lett. Aug. 16, 2018;9(16):4700-4706. doi: 10.1021/acs.jpclett.8b01897. Epub Aug. 3, 2018.

Huang et al. Sterically encumbered poly(arylene ether)s containing spiro-annulated substituents: Synthesis and thermal properties. J Poly Sci A; Poly Chem. Dec. 2010; 48(24): 5872-84.

Li et al., A high-capacity lithium-gas battery based on sulfur fluoride conversion. J Phys Chem C. 2018; 122(13): 7128-38.

Percec et al., Termination by reductive elimination in the polyetherification of bis(arylchlorides) activated by carbonyl groups, with bisphenolates. Macromol. 1991; 24(21): 5889-92.

Rose et al., Polymer ultrapermeability from the inefficient packing of 2D chains. Nat Mater. Sep. 2017;16(9):932-937. doi: 10.1038/nmat4939. Epub Jul. 31, 2017.

Yu et al., Role of amine type of CO2 separation performance within amine functionalized silica/organosilica membranes: a review. Appl Sci. Jun. 2018; 8(7): 1032.

Moghadam et al., 1.Development of a Cambridge Structural Database Subset: A Collection of Metal-Organic Frameworks for Past, Present, and Future. Chemistry Materials 2017 29 (7), 2618-2625.

Slater et al., Porous materials. Function-led design of new porous materials. Science. May 29, 2015;348(6238):aaa8075. doi: 10.1126/science.aaa8075. PMID: 26023142.

Tian et al., Porous Aromatic Frameworks (PAFs). Chem Rev. Aug. 26, 2020;120(16):8934-8986. doi: 10.1021/acs.chemrev.9b00687. Epub Feb. 26, 2020. PMID: 32101403.

Budd et al., Solution-processed, organophilic membrane derived from a polymer of intrinsic microporosity. Adv Mater. Mar. 2004; 16(5): 456-9.

Dhara et al., Fluorinated high-performance polymers: poly(arylene ether)s and aromatic polyimides containing trifluoromethyl groups. Prog Poly Sci. Apr. 2010; 35(8): 1022-77.

He et al., Polymers with Side Chain Porosity for Ultrapermeable and Plasticization Resistant Materials for Gas Separations. Adv Mater. May 2019;31(21):e1807871. doi: 10.1002/adma.201807871. Epub Apr. 9, 2019.

Shamsabadi et al., A New Pentiptycene-Based Dianhydride and Its High-Free-Volume Polymer for Carbon Dioxide Removal. ChemSusChem. Jan. 23, 2018;11(2):472-482. doi: 10.1002/cssc.201701491. Epub Jan. 4, 2018.

Shibasaki et al., Synthesis of Poly(aryl ether) by Pd-catalyzed polycondensation. Chem Lett. Aug. 2002; 31(8): 794-5.

Wang et al., Synthesis of new fluorene-based poly(aryl ether) containing pendant tert-butyl groups for low dielectric materials. Coll Poly Sci. Oct. 2014; 293: 313-8.

Zou et al., Synthesis of cardo poly(arylene ether ketone amide)s by heterogeneous palladium-catalyzed polycondensation of aromatic diiodides, aromatic diamines containing cardo groups and CO. Poly Bull. Jun. 2019; 77(4): 1983-2001.

* cited by examiner

| Entry | Ligand | Mn (kg/mol) | Mw (kg/mol) | PDI |
|---|---|---|---|---|
| 1 | JohnPhos | 1.70 | 2.09 | 1.23 |
| 2 | tBuXPhos | 64.2 | 99.9 | 1.56 |
| 3 | tBuBrettPhos | 10.3 | 16.2 | 1.58 |
| 4 | no Pd & L | 0.44 | 0.44 | 1.00 |

| Entry | Ligand | Mn (kg/mol) | Mw (kg/mol) | PDI |
|---|---|---|---|---|
| 1 | JohnPhos | 2.06 | 2.61 | 1.27 |
| 2 | tBuXPhos | 2.54 | 3.60 | 1.42 |
| 3 | tBuBrettPhos | 57.8 | 111.5 | 1.93 |

[a]Evaluated by gel permeation chromatography (GPC) in THF against a polystyrene calibration at room temperature. [b]Yields of PEEI. Mn(number-average molar weight); Mw(mass-average molar weight); PDI(polydispersity index) = Mw/Mn.

FIG. 6

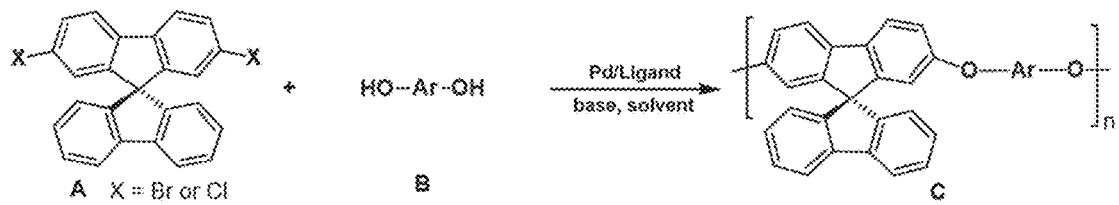
| Entry | A | B | Ligand | Mn (kg/mol)[a] | Đ (Mw/Mn) | Yield (%)[b] | BET surface area (m²/g) |
|---|---|---|---|---|---|---|---|
| 1 | Br (A1) | B1 | tBuBrettPhos | 20.9 | 2.1 | 96 | 37 (C1) |
| 2 | Br | B2 | tBuBrettPhos | 23.1 | 2.0 | 93 | 50 (C2) |
| 3 | Br | B3 | tBuBrettPhos | 33.4 | 1.6 | 96 | 668 (C3) |
| 4 | Cl (A2) | B3 | tBuXPhos | 28.3 | 1.7 | 95 | - |
| 5 | Br | B3 | tBuXPhos | 20.8 | 2.3 | 93 | - |
| 6 | Br | B3 | JohnPhos | 9.3 | 2.2 | 93 | - |
| 7[c] | Br/Cl | B3 | - | 0.4 | 1.1 | - | - |
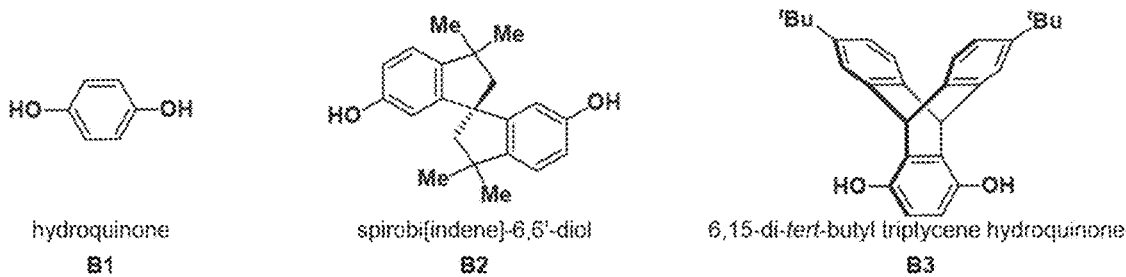
hydroquinone
B1
spirobi[indene]-6,6'-diol
B2
6,15-di-*tert*-butyl triptycene hydroquinone
B3
FIG. 7

ROMP Brush Polymer

SBF-TBTrip-I 1% tetrabromide

| 120 °C Thermally treat film (42μm) | | | MeOH treat film (45μm) | | | MeOH treat film (50μm) | |
|---|---|---|---|---|---|---|---|
| | 3d aged | 159d aged | | 5d aged | 145d aged | | 1d aged |
| H₂ | 484 ± 20 | 437 ± 18 | H₂ | 545 ± 37 | 411 ± 28 | H₂ | 493 ± 24 |
| N₂ | 20.9 ± 0.8 | 18.0 ± 0.7 | N₂ | 31.8 ± 2.2 | 20.2 ± 1.4 | N₂ | 27.6 ± 1.3 |
| CH₄ | 33.5 ± 1.3 | 27.9 ± 1.1 | CH₄ | 56.3 ± 4.0 | 34.0 ± 2.3 | CH₄ | 47.7 ± 2.3 |
| CO₂ | 432 ± 17 | 374 ± 15 | CO₂ | 593 ± 41 | 410 ± 28 | CO₂ | 527 ± 25 |
| C₂H₆ | / | 24.8 ± 1.0 | C₂H₆ | / | 39.4 ± 2.7 | C₂H₆ | 63.7 ± 3.1 |
| C₃H₈ | / | 4.5 ± 0.2 | C₃H₈ | / | 6.6 ± 0.5 | C₃H₈ | 8.2 ± 0.4 |
| H₂/CH₄ | 14.4 | 15.7 | H₂/CH₄ | 9.7 | 12.1 | H₂/CH₄ | 10.3 |
| CO₂/CH₄ | 12.9 | 13.4 | CO₂/CH₄ | 10.5 | 12.1 | CO₂/CH₄ | 11.1 |
| C₂H₆/C₃H₈ | / | 5.5 | C₂H₆/C₃H₈ | / | 6.0 | C₂H₆/C₃H₈ | 7.8 |

SBF-TBTrip-II

SBF-TBTrip-II

CNSBF-TBTrip-I

CNSBF-TBTrip-I

NiPr2SBF-TBTrip-I

NiPr2SBF-TBTrip-I

POLY(ARYL ETHER) BASED POLYMERS AND ASSOCIATED GAS SEPARATION MEMBRANES

RELATED APPLICATIONS

This application claims the benefit of priority under 35 U.S.C. § 119(e) of U.S. Provisional Application No. 63/155,697, filed Mar. 2, 2021, entitled "POLY(ARYL ETHER) BASED POLYMERS," the disclosure of which is incorporated by reference in its entirety.

TECHNICAL FIELD

Compositions and methods related to the synthesis and application of poly(aryl ether)s are generally described.

BACKGROUND

Poly(aryl ether)s (PAEs) are a class of polymeric materials that have a variety of uses and applications based on their stabilities, glass transition temperatures, chemical resistance, and ability to undergo aggressive post-polymerization functionalization. A number of commercial products are based on PAEs, which make use of their ability to interface with organic solvents, endure high compressive loads, and maintain mechanical properties at elevated temperatures. PAEs are limited in scope, however, as a result of the limitations in their synthesis. An expanded scope of PAE structures can expand the range of properties and applications displayed by these materials. Accordingly, methods and compositions related to the synthesis and application of poly(aryl ether)s are desirable.

SUMMARY

Compositions and methods related to the synthesis and application of poly(aryl ether)s are generally described. The subject matter of the present invention involves, in some cases, interrelated products, alternative solutions to a particular problem, and/or a plurality of different uses of one or more systems and/or articles.

According to some embodiments, a method of making a gas separation membrane comprising a poly(aryl ether) is described. In certain embodiments, the method comprises providing a first prepolymer comprising a monomer of the formula $(X)_x$—Ar—$(OH)_y$, wherein Ar comprises at least one aryl or heteroaryl group, X is a halogen or a halogen equivalent, each X is the same or different, and x+y is at least two; providing a second prepolymer comprising a comonomer of the formula $(X)_x$—Ar'—$(OH)_y$, wherein Ar' comprises at least one aryl or heteroaryl group, X is a halogen or a halogen equivalent, each X is the same or different, and x+y is at least two; providing a catalyst; providing a base; reacting the first prepolymer with the second prepolymer in the presence of the catalyst and the base to provide the poly(aryl ether); and forming a gas separation membrane comprising the composition.

According to certain embodiments, a gas separation membrane is described. In some embodiments, the gas separation membrane comprises a composition, the composition comprising a poly(aryl ether) of the formula $[(-Ar-O-Ar'-O-)_n]$ or $[(-Ar'-O-Ar-O-)_n]$, wherein Ar' comprises at least one aryl or heteroaryl group, Ar' comprises a spirobifluorene, n is greater than 1, and the poly(aryl ether) has a BET surface area greater than or equal to 200 $m^2/g$.

According to some embodiments, a method of separating a target gas from a mixture of gases is described. In certain embodiments, the method comprises exposing the mixture of gases to a gas separation membrane, wherein the gas separation membrane comprises a poly(aryl ether) of the formula $[(-Ar-O-Ar'-O-)_n]$ or $[(-Ar'-O-Ar-O-)_n]$, wherein Ar comprises at least one aryl or heteroaryl group, Ar' comprises a spirobifluorene, n is greater than 1, and the poly(aryl ether) has a BET surface area greater than or equal to 200 $m^2/g$, and separating the target substance from the mixture of substances.

In some embodiments, a gas separation membrane is described. In certain embodiments, the gas separation membrane comprises a composition, the composition comprising a poly(aryl ether) of the formula $[(-Ar-O-Ar'-O-)_n]$ or $[(-Ar'-O-Ar-O-)_n]$, wherein Ar comprises at least one aryl or heteroaryl group, Ar' comprises at least one aryl or heteroaryl group, n is greater than 1, and the poly(aryl ether) has a BET surface area greater than or equal to 200 $m^2/g$, and one or more metals associated with the poly(aryl ether), wherein each metal is associated with the poly(aryl ether) through at least two bonding interactions between each metal and Ar or Ar', wherein the at least two bonding interactions comprise a bond between a metal and a functional group comprising a Lewis basic donor atom.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIG. 6 shows, according to some embodiments, the synthesis of poly(aryl ether)s using catalysts with various phosphine ligands;

FIG. 7 shows, according to some embodiments, the synthesis of various poly(aryl ether)s;

FIGS. 25A-24F show, according to some embodiments, the structure of poly(aryl ether)s and their change in permeability to $CO_2$ as a function of $CO_2$ pressure;

DETAILED DESCRIPTION

Figure 1A:
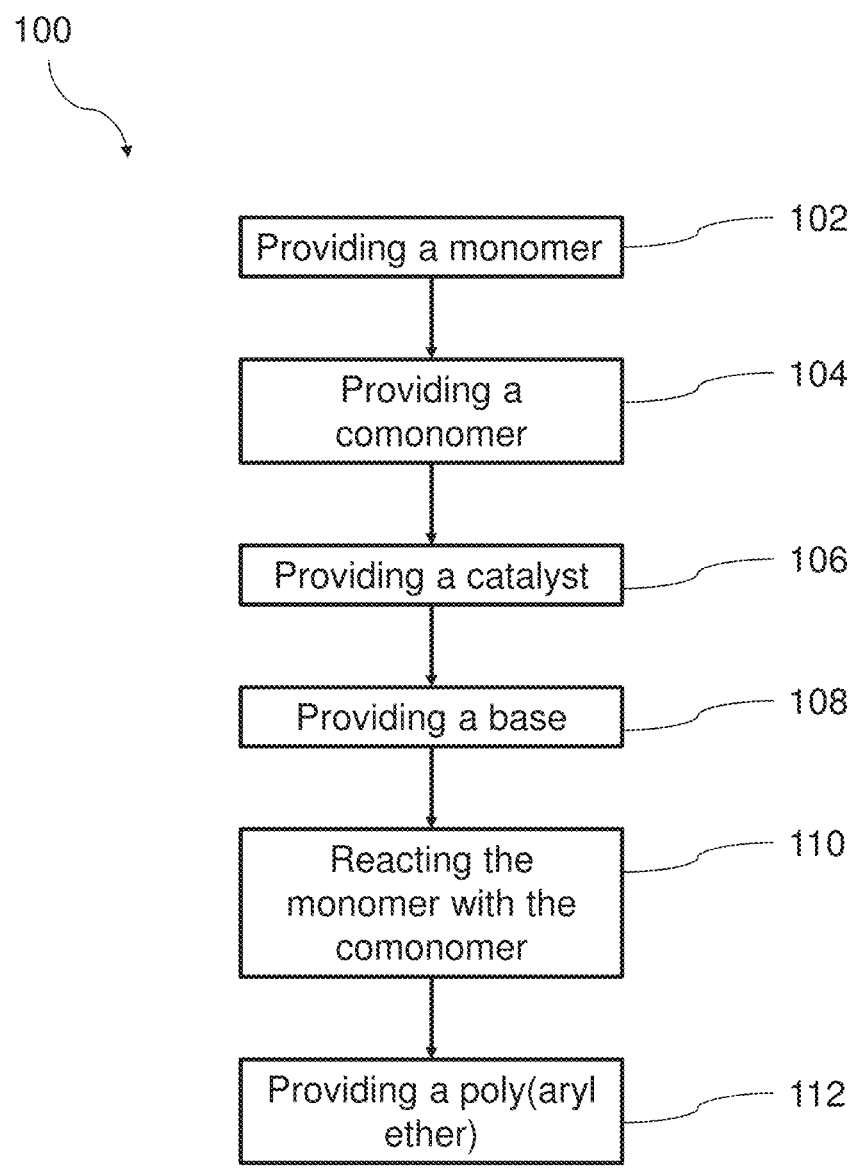
FIG. 1A shows, according to some embodiments, a method of producing a poly(aryl ether)

Compositions and methods related to the synthesis and application of poly(aryl ether)s are generally described. For example, a method of producing poly(aryl ether)s is described, wherein the method comprises catalyzed reactions between an aryl-hydroxide and an aryl-halogen to create an aryl-oxygen-aryl linkage with the formation of a new carbon-oxygen bond and a loss of a hydrogen halide. The synthetic methods described herein allow for the production of a wide variety of poly(aryl ether)s that were previously inaccessible by conventional synthetic methods. An expanded scope of poly(aryl ether)s allows for the integration of these materials into a wide variety of applications, including, for example, gas and liquid separation membranes, adsorbents, photocatalysts, and catalyst supports. The synthetic methods described herein also provide an economic advantage compared to conventional synthetic methods, as lower cost starting materials may be used to produce the poly(aryl ether)s for use as structural materials and/or and coatings in any of the aforementioned applications.

The Inventors have realized that conventional methods of synthesizing poyl(aryl ethers) have certain limitations. Conventional poly(aryl ether)s, for example, have had limited structural scope because they have been synthesized by either nucleophilic aromatic substitution (S$_N$Ar) reactions or oxidation of phenols. The S$_N$Ar reactions often require a halide containing monomer (e.g., an aryl-fluoride) that is further activated by an electron withdrawing group. Aryl-fluorides are expensive starting materials and have contributed to the high costs of poly(aryl ether)s. The electron withdrawing group stabilizes reaction intermediates and achieve high reaction yields that produce high molecular weight polymers. Accordingly, most commercial poly(aryl ether) materials contain Ar—CO—Ar (diaryl carbonyl) and Ar—SO$_2$—Ar (diaryl sulfone) groups in their backbone, wherein the carbonyl or sulfone groups are the electron withdrawing elements that facilitate their synthesis. It is possible to also achieve high conversion in S$_N$Ar reactions with other electron withdrawing groups and electron deficient aromatic halides, such as pyridine-halides, pyrazine-halides, and nitro-aromatic-halides. Electron withdrawing groups, however, can cause poly(aryl ether)s to be susceptible to degradation by nucleophiles, including hydroxides and thiolates, which can limit the applications of the poly (aryl ether) material. For example, ion exchange membranes that incorporate polymer backbones with electron withdrawing groups may be used to transport hydroxide or highly active catalytic systems having Zr(OH)$_4$, resulting in degradation of the membrane over time due to exposure of the hydroxide nucleophile to the electron withdrawing groups.

The synthetic methods described herein do not require either aryl-fluorides or electron withdrawing groups in the starting materials, therefore offering an economically attractive alternative to the production of poly(aryl ether)s while also expanding the scope of accessible poly(aryl ether)s. The structural diversity of the starting materials may be tailored to finely-tune the properties of the poly(aryl ether) product. For example, poly(aryl ether)s produced by the methods described herein may have higher molecular weights, higher temperature stabilities, new functionalities, and intrinsic free volume, as compared to poly(aryl ether)s produced by conventional methods.

In certain embodiments, the method of producing a poly (aryl ether) as described herein comprises reacting a first prepolymer (e.g., comprising a monomer) with a second prepolymer (e.g., comprising comonomer) in the presence of a catalyst. Additional reagents may be employed during the synthesis or after the synthesis of the poly(aryl ether) in order to impart certain properties on the resulting poly(aryl ether) as desired. In some embodiments, for example, the first prepolymer may be reacted with the second prepolymer and a third prepolymer (e.g., comprising a second comonomer). The second comonomer may increase the stability, temperature resistance, and/or molecular weight of the poly (aryl ether). The poly(aryl ether) may be end capped with a reagent (e.g., an endcapping agent), in certain embodiments, to provide certain functions. The endcapping agent, for example, may be a chain initiating reagent, therefore providing a poly(aryl ether) that may be subjected to further reactivity by free-radical initiation by application of heat or light. The synthesized poly(aryl ether) may be functionalized with desired functional groups, and/or existing functional groups may be exchanged as desired.

Wherever the term "monomer", "comonomer" (or "first comonomer"), and "second comonomer" is used herein, it is to be understood that the monomer may be provided as a first prepolymer comprising the monomer and/or a first oligomer including the monomer, the comonomer (or first comonomer) may be provided as a second prepolymer comprising the comonomer (or first comonomer) and/or a second oligomer including the comonomer (or first comonomer), and the second comonomer may be provided as a third prepolymer comprising the second comonomer and/or a third oligomer including the second comonomer.

The poly(aryl ether)s described herein have a wide variety of applications, including, for example, use in fluid (e.g., gas and/or liquid) separation, fluid adsorption, metal sequestration, photocatalysis, and/or catalyst supports. The Inventors have realized and appreciated, for example, that separation membranes using free volume and microporous polymers may be used as an alternative to energy-intensive conventional gas separation technologies, such as distillation and absorption. The poly(aryl ether)s described herein may be formed into films and/or sheets and/or coated onto existing substrates for use as fluid separation membranes, in some embodiments. Free volume promoting (e.g., high rigidity, three-dimensional) monomers and/or comonomers monomers, for example, may be employed during synthesis of the poly(aryl ether)s to provide finely tuned porous materials for use in separation membranes for separation of targeted fluids, as desired. The poly(aryl ether)s may also be tailored during their synthesis such that the resulting material can be used for targeted fluid adsorption.

Prepolymers (e.g., monomers and/or comonomers) may be employed during production of the poly(aryl ether)s that are capable of binding one or more metals (e.g., nitrogen heterocycles). The resulting poly(aryl ether)s may be used for any of a variety of suitable applications, including, for example, metal sequestration. For example, the poly(aryl ether)s may be used to selectively sequester toxic metals from solution (e.g., aqueous solutions). The sequestration of metals may be confirmed by evaluating the absorption and/or emission properties of the poly(aryl ether) associated the one or more metals. In some embodiments, the poly(aryl ether)s may selectively bind to metals and/or metal salts to enable complexation and facilitated transport of gases and liquids for membrane-based separations. In other embodiments, the poly(aryl ether)s may be configured to bind one or more luminescent metals to provide phosphorescent metal complexes that can be used, for example, in luminescent displays and/or sensing technologies.

The poly(aryl ether)s described herein may also be used in catalysis, for example, as a photocatalyst and/or catalyst support. In some embodiments, one or more chromophores may be integrated into the poly(aryl ether) that are capable of excited state redox events upon, for example, exposure to and absorption of light of an appropriate wavelength. The chromophore may, in certain embodiments, be the second comonomer. The poly(aryl ether) may also be associated with one or more components (e.g., metals) that display catalytic activity, and the poly(aryl ether) may be tethered to a supporting substrate, thereby acting as a catalyst support.

FIG. 1A shows, according to some embodiments, a method of producing (e.g., synthesizing) a poly(aryl ether). In some embodiments, method 100 of producing a poly(aryl ether) comprises step 102 of providing a monomer. In certain embodiments, for example, the monomer is dissolved and/or suspended in a suitable solvent (e.g., toluene, dimethoxyethane (DME)), thereby providing a solution and/or suspension comprising the monomer.

According to some embodiments, the monomer may be of the formula $(X)_x$—Ar—$(OH)_y$, wherein the sum of x and y is at least two. In some embodiments, x and y may be equal in the formula $(X)_x$—Ar—$(OH)_y$. In other embodiments, x is greater than y. In yet other embodiments, y is greater than x. Certain effects resulting from x and y being equal, x being greater than y, and y being greater than x with respect to the monomer of the formula $(X)_x$—Ar—$(OH)_y$, such as the presence of residual X groups and/or OH groups, are explained in greater detail herein.

In certain non-limiting embodiments, x in the formula $(X)_x$—Ar—$(OH)_y$ may be zero, thereby providing a monomer with the formula Ar—$(OH)_y$ wherein y is equal to or greater than two.

According to certain embodiments, Ar in the formula $(X)_x$—Ar—$(OH)_y$ comprises at least one aryl group (e.g., one aryl group, two aryl groups, three aryl groups, four aryl groups, etc.) and/or at least one heteroaryl group (e.g., one heteroaryl group, two heteroaryl groups, three heteroaryl groups, four heteroaryl groups, etc.). As used herein, the term "aryl" is given its ordinary meaning in the art and generally refers to single-ring, multiple-ring, or multiple-fused-ring aromatic groups comprising, for example, 5-, 6- and 7-membered ring aromatic groups, all optionally substituted. The term "heteroaryl" is also given its ordinary meaning in the art and generally refers to an aryl group as described herein in which one or more atoms is a heteroatom (e.g., oxygen, nitrogen, sulfur, and the like). In some embodiments, Ar comprises one or more of a benzene group, a phenanthrene group, an iptycene group (e.g., a triptycene group), a spirobi(indene) group, a fluorene group, a benzophenone group, a biphenyl group (e.g., a spiro-biphenyl group, a bridged biphenyl group), a binaphthyl group, a pyrene group, an anthracene group, a triphenylene group, a pyrazine group, an indole group, a thiophene group, a bithiophene group, a pyrrole group, an oligophenylene group, a stilbene group, a diphenyl acetylene group, an anthraquinone group, a metallocene group, a spirobifluorene group, a pyridine group, a bipyridine group, and/or a phenanthroline group, any of which may be optionally substituted (e.g., with one or more functional groups). Other aryl groups are also possible. In some embodiments, the one or more functional groups may comprise an aliphatic group (e.g., a methyl group, an ethyl group, a propyl group, a butyl group, an alkene, an alkyne), a nitrile group (—C≡N), an amine group (e.g., a primary amine, a secondary amine, a tertiary amine), and/or an aldehyde group.

In certain embodiments, Ar in the formula $(X)_x$—Ar—$(OH)_y$ comprises one or more cyclic groups and/or heterocyclic groups. For example, in some embodiments, Ar comprises one or more of a cyclopentane group, a bicyclic ring structure (e.g., a [2.2.1] bicyclic ring structure, a [2.2.2] bicyclic ring structure, a [2.2.3] bicyclic ring structure, a [2.3.1] bicyclic ring structure), and/or a polycyclic ring structure, any of which may be optionally substituted (e.g., with one or more functional groups). Other cyclic groups are also possible.

In some non-limiting embodiments, Ar in the formula $(X)_x$—Ar—$(OH)_y$ comprises an iptycene group (e.g., a triptycene group). The iptycene group may be functionalized, in some embodiments, with one or more aliphatic groups (e.g., methyl groups, ethyl groups, propyl groups, butyl groups, etc.).

According to some embodiments, X in the formula $(X)_x$—Ar—$(OH)_y$ comprises a halogen or a halogen equivalent. As used herein, the term "halogen equivalent" generally refers to a functional group or chemical moiety displaying similar chemical properties to a halogen, such as, for example, electronic effects. In certain embodiments, for example, the halogen is bromide ($Br^-$), chloride ($Cl^-$), and/or iodide ($I^-$). The halogen equivalent may, in some embodiments, comprise a nitro group (—$NO_2$) and/or a —$OSO_2R$ group.

According to certain embodiments wherein x is greater than 1, each X may be the same or different.

In certain embodiments, the monomer may be purchased from commercial sources. In other embodiments, the monomer may be synthesized using techniques known to a person of ordinary skill in the art.

In certain embodiments, method 100 of producing (e.g., synthesizing) the poly(aryl ether) comprises step 104 of providing a comonomer. In some embodiments, the comonomer is provided in the presence of the monomer. For example, in certain embodiments the comonomer may be dissolved and/or suspended in the solution and/or suspension comprising the monomer, thereby providing a solution and/or suspension comprising the monomer and the comonomer.

According to certain embodiments, the comonomer may be of the formula $(X)_x$—Ar'—$(OH)_y$, wherein the sum of x and y is at least two. In some embodiments, x and y may be equal in the formula $(X)_x$—Ar'—$(OH)_y$. In other embodiments, x is greater than y. In yet other embodiments, y is greater than x. Certain effects resulting from x and y being equal, x being greater than y, and y being greater than x with respect to the comonomer of the formula $(X)_x$—Ar'—$(OH)_y$, such as the presence of residual OH groups and/or X groups, are explained in greater detail herein.

In some non-limiting embodiments, y in the formula $(X)_x$—Ar'—$(OH)_y$ may be zero, thereby providing a comonomer with the formula $(X)_x$—Ar' wherein x is greater than or equal to two.

According to some embodiments, Ar' in the formula $(X)_x$—Ar'—$(OH)_y$ comprises at least one aryl group and/or at least one heteroaryl group. In certain embodiments, for example, Ar' comprises a benzene group, a phenanthrene group, an iptycene group (e.g., a triptycene group), a spirobi (indene) group, a fluorene group, a benzophenone group, a biphenyl group (e.g., a spiro-biphenyl group, a bridged biphenyl group), a binaphthyl group, a pyrene group, an anthracene group, a triphenylene group, a pyrazine group, an indole group, a thiophene group, a bithiophene group, a pyrrole group, an oligophenylene group, a stilbene group, a diphenyl acetylene group, an anthraquinone group, a metallocene group, a spirobifluorene group, a pyridine group, a bipyridine group, and/or a phenanthroline group, any of which may be optionally substituted (e.g., with one or more functional groups). Other aryl groups are also possible. In some embodiments, the one or more functional groups may comprise an aliphatic group, a nitrile group, an amine group, and/or one more aldehyde groups.

According to certain embodiments, Ar' in the formula $(X)_x$—Ar'—$(OH)_y$ comprises one or more cyclic groups and/or heterocyclic groups. In some embodiments, for example, Ar' comprises one or more of a cyclopentane group, a bicyclic ring structure (e.g., a [2.2.1] bicyclic ring structure, a [2.2.2] bicyclic ring structure, a [2.2.3] bicyclic ring structure, a [2.3.1] bicyclic ring structure), and/or a polycyclic ring structure, any of which may be optionally substituted (e.g., with one or more functional groups). Other cyclic groups are also possible.

In some non-limiting embodiments, Ar' in the formula $(X)_x$—Ar'—$(OH)_y$ comprises a spirobifluorene. The spirobifluorene may, in certain embodiments, be functionalized with one or more nitrile groups, one or more amine groups (e.g., a primary, secondary, or tertiary amine), and/or one or more aldehyde groups. In some embodiments, X in the formula $(X)_x$—Ar'—$(OH)_y$ comprises a halogen or a halogen equivalent. According to certain embodiments, for example, the halogen is bromide (Br$^-$), chloride (Cl$^-$), and/or iodide (I$^-$). In some embodiments, the halogen equivalent comprises a nitro group (—NO$_2$) and/or a —OSO$_2$R group. According to some embodiments wherein x is greater than 1, each X may be the same or different.

According to some embodiments, the comonomer may be purchased from commercial sources. In other embodiments, the comonomer may be synthesized using techniques known to a person of ordinary skill in the art.

In certain embodiments, the monomer and the comonomer are chemically the same species. In other embodiments, the monomer and the comonomer are chemically different species.

According to certain embodiments, method 100 of producing (e.g., synthesizing) the poly(aryl ether) comprises step 106 of providing a catalyst. In some embodiments, the catalyst is provided in the presence of the monomer and/or comonomer. For example, in certain embodiments, the catalyst may be dissolved and/or suspended in the solution and/or suspension comprising the monomer and the comonomer, thereby providing a solution and/or suspension comprising the monomer, comonomer, and catalyst.

The catalyst may advantageously facilitate (e.g., catalyze) the reaction between the monomer (e.g., $(X)_x$—Ar—$(OH)_y$) and the comonomer (e.g., $(X)_x$—Ar'—$(OH)_y$) to form the poly(aryl ether), as explained in further detail herein. As would be generally understood by a person of ordinary skill in the art, for example, the catalyst may reduce the activation energy of the reaction and/or change the reaction mechanism of the reaction, thereby increasing the rate of reaction between the monomer (e.g., $(X)_x$—Ar—$(OH)_y$) and the comonomer (e.g., $(X)_x$—Ar'—$(OH)_y$) without the catalyst being substantially consumed.

Any of a variety of suitable catalysts may be employed. In some embodiments, for example, the catalyst comprises a metal. Exemplary metals include palladium, nickel, and/or iron, although other metals are possible. The metal may be bound to one or more ligands (e.g., phosphine ligands), in certain embodiments. In some non-limiting embodiments, the metal is palladium (Pd) and the ligand is an organophosphine ligand.

As explained in further detail herein, the catalyst may be a catalyst precursor comprising an endcapping agent, wherein the endcapping agent may be used to terminally cap the poly(aryl ether). In some embodiments, for example, the catalyst precursor may comprise a metal catalyst bound to the endcapping agent. In certain embodiments, as the endcapping agent terminally caps the poly(aryl ether), the catalyst facilitates the reaction between the monomer and the comonomer.

In certain embodiments, method 100 of producing (e.g., synthesizing) the poly(aryl ether) comprises step 108 of providing a base (e.g., a Brønsted base). In some embodiments, the base is provided in the presence of the monomer, comonomer, and/or catalyst. For example, in some embodiments, the base may be dissolved and/or suspended in the solution and/or suspension comprising the monomer, comonomer, and the catalyst, thereby providing a solution and/or suspension comprising the monomer, comonomer, catalyst, and base.

In certain embodiments, the monomer (e.g., $(X)_x$—Ar—$(OH)_y$) and the comonomer (e.g., $(X)_x$—Ar'—$(OH)_y$) react to form the poly(aryl ether), as explained in further detail herein, with a loss of HX. In some such embodiments, the base (e.g., Brønsted base) advantageously neutralizes the formation of HX.

Any of a variety of suitable bases (e.g., Brønsted bases) may be employed. In certain embodiments, for example, the base comprises a phosphate (e.g., $K_3PO_4$), an alkyl amine, an imine, an alkoxide, a carbonate, fluoride, a pyridyl, a beta-amino imine, a hydroxide, sodium hydride, a metal hydride, and/or a metal oxide. Other bases are possible.

According to some embodiments, method 100 of producing (e.g., synthesizing) the poly(aryl ether) comprises step 110 of reacting the monomer with the comonomer and step 112 of providing the poly(aryl ether). The monomer may be reacted with the comonomer in any of a variety of suitable manners. In certain embodiments, for example, the monomer is reacted with the comonomer in the presence of the catalyst. The monomer may be reacted with the comonomer in the presence of the base (e.g., to neutralize the formation of HX upon the reaction of $(X)_x$—Ar—$(OH)_y$ and $(X)_x$—Ar'—$(OH)_y$). In some embodiments, the reaction between the monomer and the comonomer is facilitated by stirring and/or the application of heat, as explained in greater detail herein.

The monomer (e.g., $(X)_x$—Ar—$(OH)_y$) and the comonomer (e.g., $(X)_x$—Ar'—$(OH)_y$) may be reacted in any of a variety of suitable ratios. Varying the ratio of the monomer and the comonomer may, in some embodiments, vary one or more chemical properties and/or physical properties of the resulting poly(aryl ether). Advantageously, in some embodiments, the amount of the monomer and/or the comonomer may be chosen so that the chemical properties and/or physical properties of the resulting poly(aryl ether) are tailored for one or more specific functions. In some embodiments, the monomer (e.g., $(X)_x$—Ar—$(OH)_y$) and the comonomer (e.g., $(X)_x$—Ar'—$(OH)_y$) are reacted in a 1:1 ratio. In other embodiments, the ratio of the monomer (e.g., $(X)_x$—Ar—$(OH)_y$) to the comonomer (e.g., $(X)_x$—Ar'—$(OH)_y$) is greater than 1 (e.g., greater than or equal to 1.1, greater than or equal to 1.5, greater than or equal to 2, greater than or equal to 3, greater than or equal to 4, etc.). In other embodiments, the ratio of the comonomer (e.g., $(X)_x$—Ar'—$(OH)_y$) to the monomer (e.g., $(X)_x$—Ar—$(OH)_y$) is greater than 1 (e.g., greater than or equal to 1.1, greater than or equal to 1.5, greater than or equal to 2, greater than or equal to 3, greater than or equal to 4, etc.).

According to some embodiments, the monomer (e.g., $(X)_x$—Ar—$(OH)_y$) and/or the comonomer (e.g., $(X)_x$—Ar'—$(OH)_y$) may be chosen so that, cumulatively, the value of x is cumulatively equal to the value of y. In some such embodiments, the resulting poly(aryl ether) may have substantially the same amount of residual X groups and residual OH groups. In other embodiments, the monomer (e.g., $(X)_x$—Ar—$(OH)_y$) and/or the comonomer (e.g., $(X)_x$—Ar'—$(OH)_y$) may be chosen so that the value of x is cumulatively greater than y. In some such embodiments, the resulting poly(aryl ether) may have more residual X groups than residual OH groups. Alternatively, in certain embodiments, the monomer (e.g., $(X)_x$—Ar—$(OH)_y$) and/or the comonomer (e.g., $(X)_x$—Ar'—$(OH)_y$) may be chosen so that the value of y cumulatively is greater than x. In some such embodiments, the resulting poly(aryl ether) may have more residual OH groups than residual X groups. Advantageously, production of the poly(aryl ether) may be tailored depending on whether residual X groups or residual OH groups are desired. As explained in greater detail herein, residual X and/or OH groups on the poly(aryl ether) may advantageously facilitate the functionalization of the poly(aryl ether) in a later chemical processing step.

The monomer may be reacted with the comonomer at any of a variety of suitable temperatures. In some embodiments, for example, the monomer is reacted with the comonomer at a temperature greater than or equal to 20° C., greater than or equal to 50° C., greater than or equal to 75° C., greater than or equal to 100° C., greater than or equal to 125° C., greater than or equal to 150° C., or greater than or equal to 175° C. In certain embodiments, the monomer is reacted with the comonomer at a temperature less than or equal to 200° C., less than or equal to 175° C., less than or equal to 150° C., less than or equal to 125° C., less than or equal to 100° C., less than or equal to 75° C., or less than or equal to 50° C. Combinations of the above recited ranges are also possible (e.g., the monomer is reacted with the comonomer at a temperature between greater than or equal to 20° C. and less than or equal to 200° C., the monomer is reacted with the comonomer at a temperature between greater than or equal to 100° C. and less than or equal to 150° C.). Other ranges are also possible.

The monomer may be reacted with the comonomer for any of a variety of suitable times. In certain embodiments, for example, the monomer is reacted with the comonomer for a time greater than or equal to 1 hour, greater than or equal to 5 hours, greater than or equal to 10 hours, greater than or equal to 15 hours, greater than or equal to 20 hours, greater than or equal to 24 hours, or greater than or equal to 36 hours. In some embodiments, the monomer is reacted with the comonomer for a time less than or equal to 48 hours, less than or equal to 36 hours, less than or equal to 24 hours, less than or equal to 20 hours, less than or equal to 15 hours, less than or equal to 10 hours, or less than or equal to 5 hours. Combinations of the above recited ranges are also possible (e.g., the monomer is reacted with the comonomer for a time between greater than or equal to 1 hour and less than or equal to 48 hours, the monomer is reacted with the comonomer for a time between greater than or equal to 15 hours and less than or equal to 24 hours). Other ranges are also possible.

According to certain embodiments, the poly(aryl ether) comprises the reaction product of the monomer (e.g., $(X)_x$—Ar—$(OH)_y$) reacted with the comonomer (e.g., $(X)_x$—Ar'—$(OH)_y$). In some embodiments, for example, the poly(aryl ether) is of the formula $[(-Ar-O-Ar'-O-)_n]$ or $[(-Ar'-O-Ar-O-)_n]$, wherein n is greater than 1, as explained in further detail below.

In some embodiments, Ar and/or Ar' in the formula $[(-Ar-O-Ar'-O-)_n]$ or $[(-Ar'-O-Ar-O-)_n]$ comprise at least one aryl group and/or at least one heteroaryl group, any of which may be optionally substituted, as explained above with respect to the monomer of the formula $(X)_x$—Ar—$(OH)_y$ and the comonomer of the formula $(X)_x$—Ar'—$(OH)_y$. In certain embodiments, Ar and/or Ar' in the formula $[(-Ar-O-Ar'-O-)_n]$ or $[(-Ar'-O-Ar-O-)_n]$ comprise at least one cyclic group and/or heterocyclic group, any of which may be optionally substituted, as explained above with respect to the monomer of the formula $(X)_x$—Ar—$(OH)_y$ and the comonomer of the formula $(X)_x$—Ar'—$(OH)_y$.

According to certain embodiments, the poly(aryl ether) does not comprise a ketone, sulfone, nitro, biphenyl, and/or polycyclic aromatic functional group. In some embodiments, the poly(aryl ether) has the same number of C—F bonds as were present in the constituent monomer (e.g., $(X)_x$—Ar—$(OH)_y$) and the comonomer (e.g., $X)_x$—Ar'—$(OH)_y$), cumulatively.

Figure 1B:
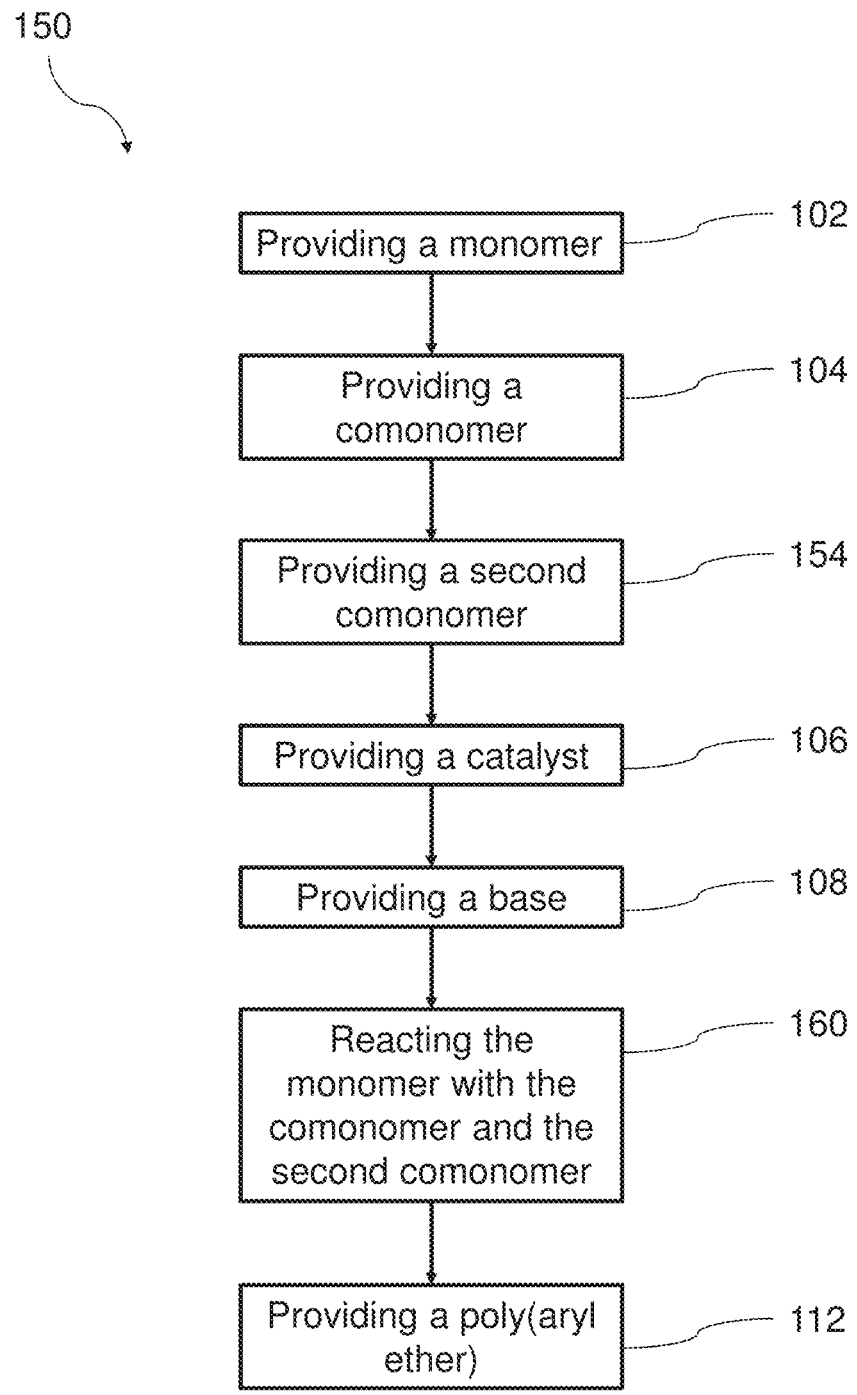
FIG. 1B shows, according to some embodiments, a method of producing a poly(aryl ether) comprising a second comonomer.

According to certain embodiments, other agents may be employed during production (e.g., synthesis) of the poly (aryl ether) that may impart certain properties on the poly (aryl ether). FIG. 1B shows, according to some embodiments, a method of producing (e.g., synthesizing) a poly (aryl ether) comprising a second comonomer. In some embodiments, for example, method 150 of producing (e.g., synthesizing) the poly(aryl ether) may comprise step 154 of providing a second comonomer that has a different chemical composition than the comonomer (e.g., first comonomer). The second comonomer may be provided in the presence of the monomer and/or the comonomer (e.g., first comonomer). In some embodiments, for example, the second comonomer may be dissolved and/or suspended in the solution and/or suspension comprising the monomer and the comonomer (e.g., first comonomer), thereby providing a solution and/or suspension comprising the monomer, comonomer (e.g., first comonomer), and second comonomer.

In some embodiments, the second comonomer is of the formula $(X)_x$—Ar"—$(OH)_y$, wherein the sum of x and y is at least two. In certain embodiments, x and y may be equal in the formula $(X)_x$—Ar"—$(OH)_y$. In other embodiments, x is greater than y. In yet other embodiments, y is greater than x. The structure of the second comonomer may be chosen, in some embodiments, such that the resulting poly(aryl ether) has substantially the same amount of residual X groups and residual OH groups, more residual X groups than residual OH groups, or more residual OH groups than residual X groups, as explained herein in greater detail.

In some non-limiting embodiments, y in the formula $(X)_x$—Ar"—$(OH)_y$ may be zero, thereby providing a second comonomer with the formula $(X)_x$—Ar" wherein x is greater than or equal to two.

According to certain embodiments, Ar" in the formula $(X)_x$—Ar"—$(OH)_y$ comprises at least on aryl group and/or at least on heteroaryl group. In some embodiments, for example, Ar" comprises a benzene group, a phenanthrene group, an iptycene group (e.g., a triptycene group), a spirobi(indene) group, a fluorene group, a benzophenone group, a biphenyl group (e.g., a spiro-biphenyl group, a bridge biphenyl group), a binaphthyl group, a pyrene group, an anthracene group, a triphenylene group, a pyrazine group, an indole group, a thiophene group, a bithiophene group, a pyrrole group, an oligophenylene group, a stilbene group, a diphenyl acetylene group, an anthraquinone group, a metallocene group, a spirobifluorene group, a pyridine group, a bipyridine group, and/or a phenanthroline group, any of which may be optionally substituted (e.g., with one or more functional groups). Other aryl groups are also possible. In some embodiments, the one or more functional groups may comprise an aliphatic group, a nitrile group, an amine group, and/or an aldehyde group.

In some embodiments, Ar" in the formula $(X)_x$—Ar"—$(OH)_y$ comprises one or more cyclic groups and/or heterocyclic groups. In some embodiments, for example, Ar" comprises a cyclopentane group, a bicyclic ring structure (e.g., a [2.2.1] bicyclic ring structure, a [2.2.2] bicyclic ring structure, a [2.2.3] bicyclic ring structure, a [2.3.1] bicyclic ring structure), and/or a polycyclic ring structure, any of which may be optionally substituted (e.g., with one or more functional groups). Other cyclic groups are also possible.

In some non-limiting embodiments, Ar" in the formula $(X)_x$—Ar"—$(OH)_y$ comprises a spirobifluorene. The spirobifluorene may, in certain embodiments, be functionalized with one or more nitrile groups, one or more amine groups, and/or one or more aldehyde groups.

In some embodiments, X in the formula $(X)_x$—Ar"—$(OH)_y$ comprises a halogen or a halogen equivalent (e.g., bromide, chloride, iodide, a nitro group, and/or a —OSO$_2$R group). In certain embodiments wherein x is greater than 1, each X may be the same or different.

According to certain embodiments, the second comonomer may be purchased from commercial sources. In other embodiments, the second comonomer may be synthesized using techniques known to a person of ordinary skill in the art.

Method 150 of producing (e.g., synthesizing) the poly (aryl ether) may, in some embodiments, comprise step 160 of reacting the monomer with the comonomer (e.g., first comonomer) and the second comonomer in the presence of the catalyst (and, optionally, the base) and step 112 of providing the poly(aryl ether). As a result of reacting the monomer with the comonomer (e.g., first comonomer) and the second comonomer, the poly(aryl ether) may, in certain embodiments, be of the formula $[(-Ar'-O-Ar-O-Ar''-O-)_n]$ or $[(-Ar''-O-Ar-O-Ar'-O-)_n]$, wherein n is greater than 1 (e.g., greater than 1 and less than or equal to 1,000).

In some embodiments, Ar, Ar', and/or Ar" in the formula $[(-Ar'-O-Ar-O-Ar''-O-)_n]$ or $[(-Ar''-O-Ar-O-Ar'-O-)_n]$ may comprise at least one aryl group and/or heteroaryl group, any of which may be optionally substituted, as explained above with respect to the monomer of the formula $(X)_x$—Ar—$(OH)_y$, the comonomer (e.g., first comonomer) of the formula $(X)_x$—Ar'—$(OH)_y$, and the second comonomer of the formula $(X)_x$—Ar"—$(OH)_y$, respectively. In some embodiments, Ar, Ar', and/or Ar" in the formula $[(-Ar'-O-Ar-O-Ar''-O-)_n]$ or $[(-Ar''-O-Ar-O-Ar'-O-)_n]$ may comprise at least one cyclic group and/or heterocyclic group, any of which may be optionally substituted, as explained above with respect to the monomer of the formula $(X)_x$—Ar—$(OH)_y$, the comonomer (e.g., first comonomer) of the formula $(X)_x$—Ar'—$(OH)_y$, and the second comonomer of the formula $(X)_x$—Ar"—$(OH)_y$, respectively.

Figure 1C:
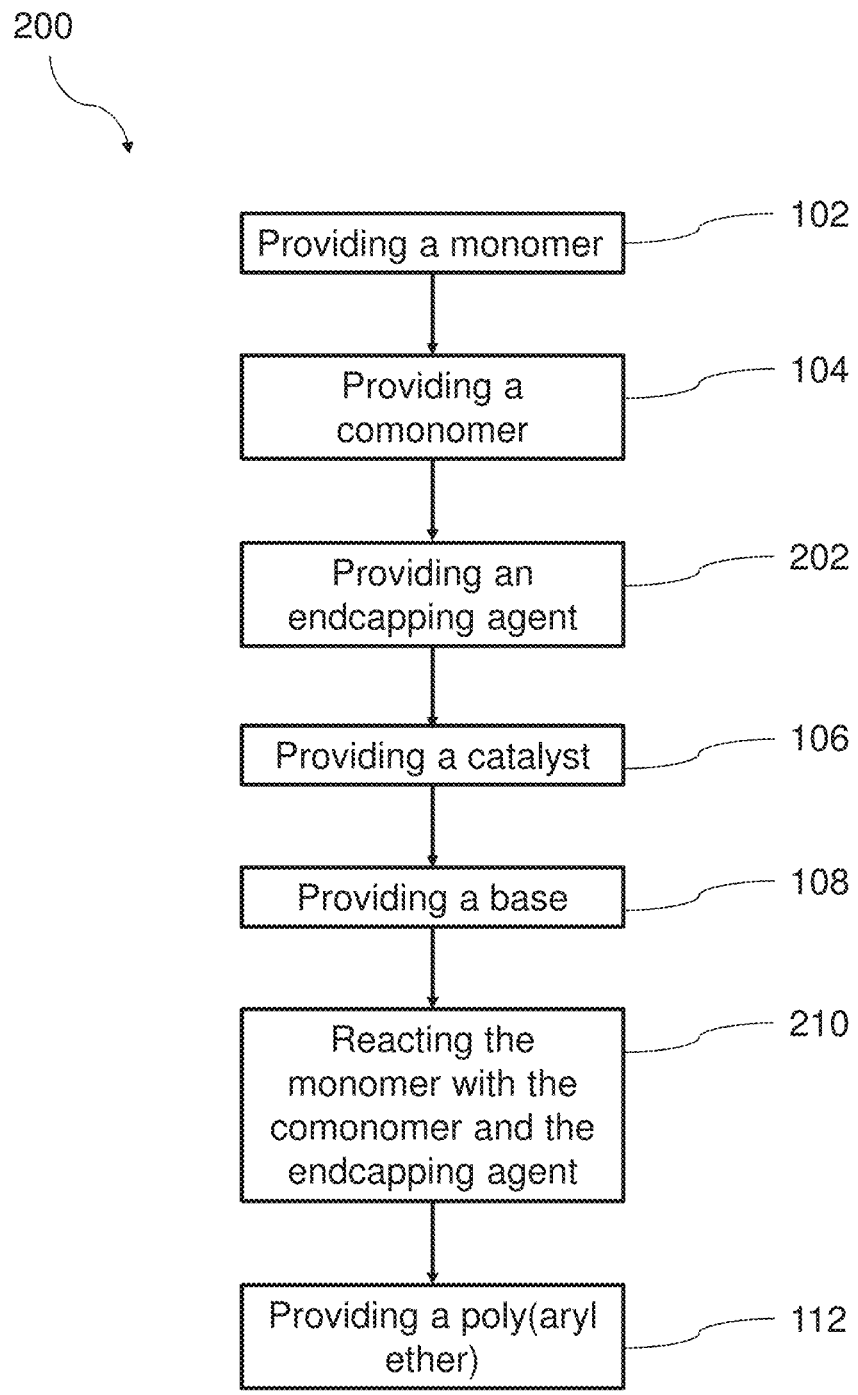
FIG. 1C shows, according to some embodiments, a method of producing a poly(aryl ether) comprising an endcapping agent.

FIG. 1C shows, according to some embodiments, a method of producing (e.g., synthesizing) a poly(aryl ether) comprising an endcapping agent. According to some embodiments, method 200 of producing (e.g., synthesizing) the poly(aryl ether) comprises step 202 of providing an endcapping agent. The endcapping agent may be provided in the presence of the monomer and the comonomer, in some embodiments. For example, in certain embodiments, the endcapping agent may be dissolved and/or suspended in the solution and/or suspension comprising the monomer and the comonomer, thereby providing a solution and/or suspension comprising the monomer, comonomer, and endcapping agent. In certain embodiments, the endcapping agent may be provided in the presence of the catalyst (and, optionally, the base) in addition to the monomer and the comonomer. The endcapping agent may be provided in the presence of the second comonomer, according to some embodiments, in addition to the monomer and the comonomer (and/or the catalyst and, optionally, the base).

According to some embodiments, the endcapping agent comprises an aryl group (e.g., benzene), a heteroaryl group, a cyclic group, a heterocyclic group, an aliphatic group (e.g., an alkane, an alkene, an alkyne), a polymer, or a nanoparticle, any of which may be optionally substituted (e.g., with one or more functional groups).

In certain non-limiting embodiments, the endcapping agent comprises a cyclic hydrocarbon (e.g., norbornene).

According to certain embodiments, the endcapping agent is a chain initiating agent. The endcapping agent, for example, may be configured to take part in a chain initiation reaction in which one or more free radicals are produced upon exposure to one or more initiators. The one or more initiators may be heat and/or light, in some embodiments. Employing an endcapping agent that is a chain initiating agent advantageously provides the ability to react the poly(aryl ether) with one or more reagents through, for example, propagation.

Figure 1D:
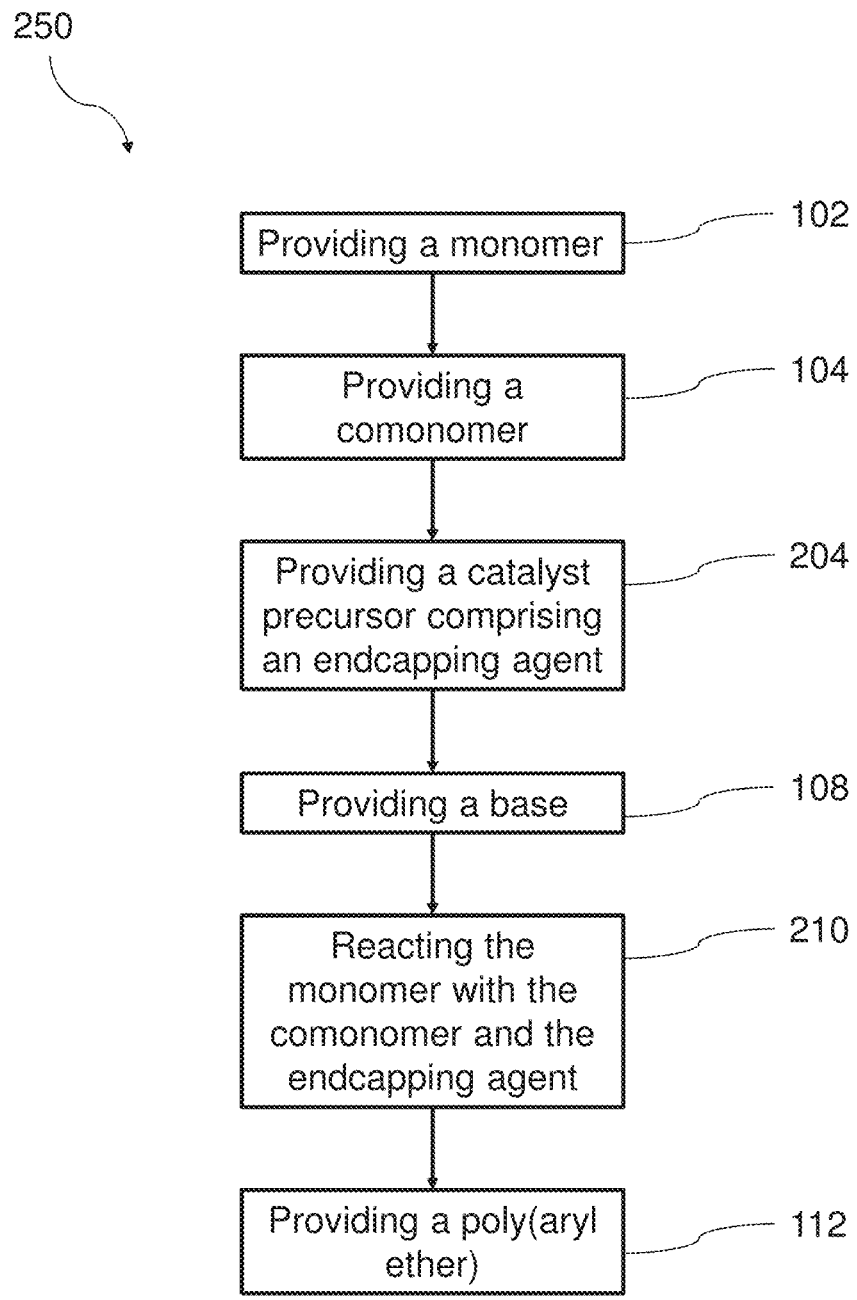
FIG. 1D shows, according to some embodiments, a method of producing a poly(aryl ether) with a catalyst precursor comprising an endcapping agent.

As described herein, the catalyst may be a catalyst precursor comprising an endcapping agent, in some embodiments. For example, in certain embodiments, the catalyst precursor comprises a metal bound to one or more ligands, wherein the one or more of the ligands comprises the endcapping agent. FIG. 1D shows, according to some embodiments, a method of producing (e.g., synthesizing) a poly(aryl ether) with a catalyst precursor comprising an endcapping agent. In some embodiments, method 250 of producing a poly(aryl ether) comprises step 204 of providing a catalyst precursor comprising an endcapping agent.

According to some embodiments, method 200 (or method 250) of producing (e.g., synthesizing) the poly(aryl ether) may comprise step 210 of reacting the monomer with the comonomer and the endcapping agent and step 112 of providing the poly(aryl ether). The endcapping agent may advantageously cap at least one terminus of the poly(aryl ether), thereby providing a mechanism to tailor the functionality and/or reactivity of one or more termini of the poly(aryl ether). The monomer may be reacted with the comonomer and the endcapping agent in the presence of the catalyst (and, optionally, the base), in some embodiments (e.g., as shown in FIG. 1C). In other embodiments, the monomer is reacted with the comonomer in the presence of the catalyst precursor (and, optionally, the base), wherein the catalyst precursor comprises the endcapping agent (e.g., as shown in FIG. 1D). In some such embodiments, as the endcapping agent caps the poly(aryl ether), the catalyst and facilitates the reaction between the monomer and the comonomer.

In certain embodiments, as a result of reacting the monomer with the comonomer and the endcapping agent, the poly(aryl ether) may be of the formula [(—Ar—O—Ar'—O—)$_n$EC], [EC(—Ar—O—Ar'—O—)$_n$], [EC—O—Ar'(—Ar—O—Ar'—O—)$_n$EC], [(—Ar'—O—Ar—O—)$_n$EC], [EC(—Ar'—O—Ar—O—)$_n$], [EC(—Ar'—O—Ar—O)$_n$—Ar'—EC], [EC(—Ar—O—Ar'—O—)$_n$Ar—EC], or [EC(—Ar'—O—Ar—O—)$_n$EC], wherein n is greater than 1 (e.g., greater than 1 and less than or equal to 1,000) and EC is the endcapping agent. In some such embodiments, Ar and/or Ar' may comprise at least one aryl group and/or heteroaryl group, any of which may be optionally substituted, as explained above with respect to the monomer of the formula (X)$_x$—Ar—(OH)$_y$ and the comonomer (e.g., first comonomer) of the formula (X)$_x$—Ar'—(OH)$_y$. In some embodiments, Ar and/or Ar' may comprise at least one cyclic group and/or heterocyclic group, any of which may be optionally substituted, as explained above with respect to the monomer of the formula (X)$_x$—Ar—(OH)$_y$ and the comonomer (e.g., first comonomer) of the formula (X)$_x$—Ar'—(OH)$_y$.

Figure 1E:
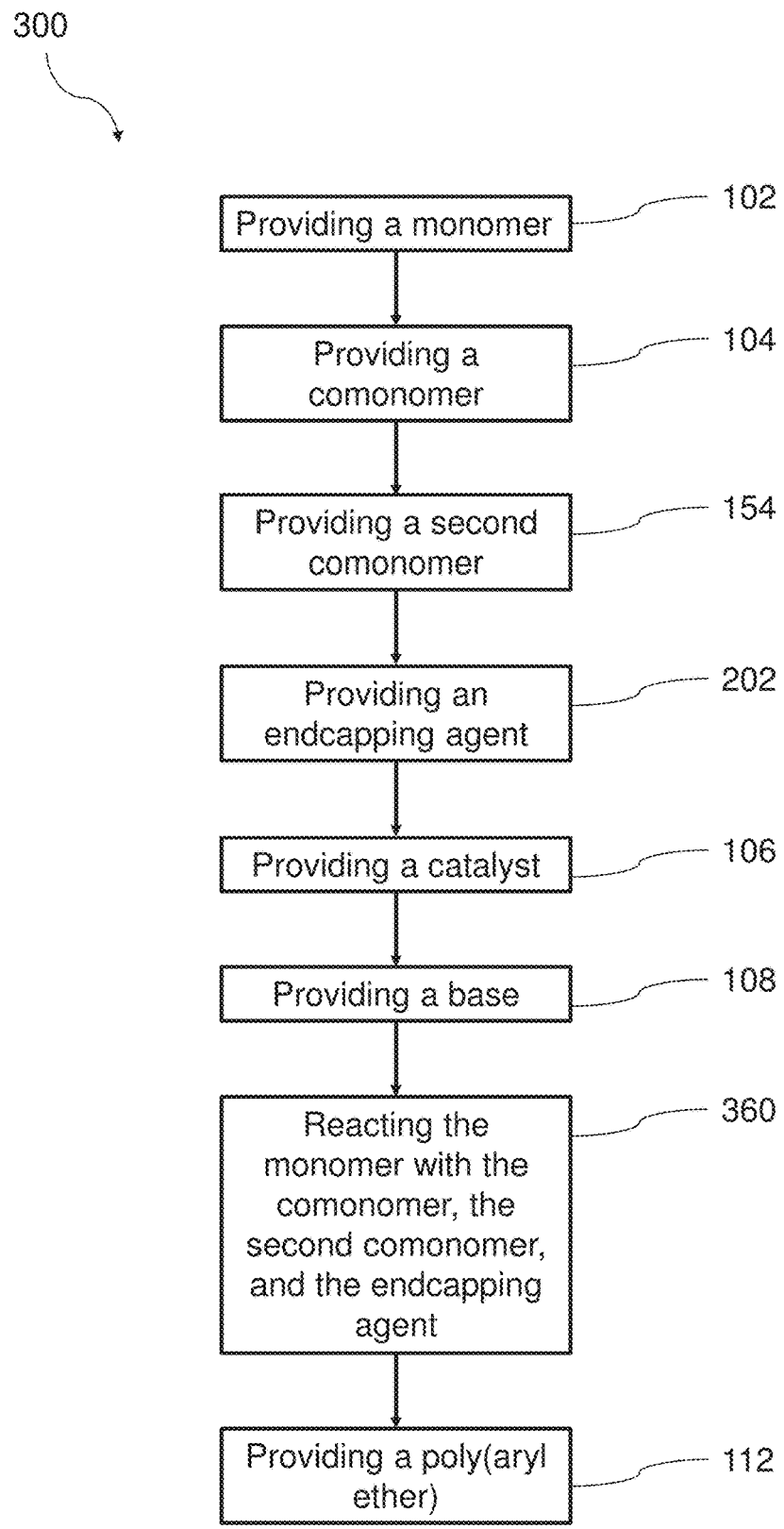
FIG. 1E shows, according to some embodiments, a method of producing a poly(aryl ether) comprising a second comonomer and an endcapping agent.

FIG. 1E shows, according to some embodiments, a method of producing (e.g., synthesizing) a poly(aryl ether) comprising a second comonomer and an endcapping agent. In certain embodiments, method 300 of producing the poly(aryl ether) may comprise step 360 of reacting the monomer with the comonomer (e.g., first comonomer), second comonomer, and the endcapping agent, and step 112 of providing the poly(aryl ether). As explained herein, the catalyst may comprise the endcapping agent, in some embodiments, and therefore steps 202 and 106 in FIG. 1E may be combined. As a result of reacting the monomer with the comonomer (e.g., first comonomer), second comonomer, and the endcapping agent, the poly(aryl ether) may, in some embodiments, be of the formula [(—Ar"—O—Ar—O—Ar"—O—)$_n$EC], [EC(—Ar'—O—Ar—O—Ar"—O—)$_n$], [EC(—Ar'—O—Ar—O—Ar"—O—)$_n$EC], [(—O—Ar"—O—Ar—O—Ar'—)$_n$EC], [EC(—O—Ar"—O—Ar—O—Ar'—)$_n$], or [EC(—O—Ar"—O—Ar—O—Ar'—)$_n$EC], wherein n is greater than 1 (e.g., greater than 1 and less than or equal to 1,000) and EC is the capping agent. In some such embodiments, Ar, Ar', and/or Ar" may comprise at least one aryl group and/or heteroaryl group, any of which may be optionally substituted, as explained above with respect to the monomer of the formula (X)$_x$—Ar—(OH)$_y$, the comonomer (e.g., first comonomer) of the formula (X)$_x$—Ar'—(OH)$_y$, and the second comonomer of the formula (X)$_x$—Ar"—(OH)$_y$. In some embodiments, Ar, Ar', and/or Ar" may comprise at least one cyclic group and/or heterocyclic group, any of which may be optionally substituted, as explained above with respect to the monomer of the formula (X)$_x$—Ar—(OH)$_y$, the comonomer (e.g., first comonomer) of the formula (X)$_x$—Ar'—(OH)$_y$, and the second comonomer of the formula (X)$_x$—Ar"—(OH)$_y$.

According to certain embodiments, n in the formula [(—Ar—O—Ar'—O—)$_n$EC], [EC(—Ar—O—Ar'—O—)$_n$], [EC—O—Ar'(—Ar—O—Ar'—O—)$_n$EC], [(—Ar'—O—Ar—O—)$_n$EC], [EC(—Ar'—O—Ar—O—)$_n$], [EC(—Ar'—O—Ar—O)$_n$—Ar'—EC], [EC(—Ar—O—Ar'—O—)$_n$Ar-EC], [EC(—Ar'—O—Ar—O—)$_n$EC], [(—Ar'—O—Ar—O—Ar"—O—)$_n$EC], [EC(—Ar'—O—Ar—O—Ar"—O—)$_n$], [EC(—Ar'—O—Ar—O—Ar"—O—)$_n$EC], [(—O—Ar"—O—Ar—O—Ar'—)$_n$EC], [EC(—O—Ar"—O—Ar—O—Ar'—)$_n$], or [EC(—O—Ar"—O—Ar—O—Ar'—)$_n$EC], may have any of a variety of suitable values. In some embodiments, for example, n is greater than 1, greater than or equal to 5, greater than or equal to 10, greater than or equal to 50, greater than or equal to 100, greater than or equal to 250, greater than or equal to 500, or greater than or equal to 750. In certain embodiments, n is less than or equal to 1,000, less than or equal to 750, less than or equal to 500, less than or equal to 250, less than or equal to 100, less than or equal to 50, less than or equal to 10, or less than or equal to 5. Combinations of the above recited ranges are also possible (e.g., n is between greater than 1 and less than or equal to 1,000, n in the formula is between greater than or equal to 100 and less than or equal to 500). Other ranges are also possible.

The poly(aryl ether) may have any of a variety of suitable molecular weights (e.g., number-average molecular weights). In certain embodiments, for example, the poly(aryl ether) has a number-average molecular weight greater than or equal to 400 g/mol, greater than or equal to 1,000 g/mol, greater than or equal to 5,000 g/mol, greater than or equal to 10,000 g/mol, greater than or equal to 50,000 g/mol, greater than or equal to 100,000 g/mol, greater than or equal to 500,000 g/mol, greater than or equal to 1,000,000 g/mol, or greater than or equal to 1,500,000 g/mol. In some embodiments, the poly(aryl ether) has a number-average molecular weight less than or equal to 2,000,000 g/mol, less than or equal to 1,500,000 g/mol, less than or equal to 1,000,000 g/mol, less than or equal to 500,000 g/mol, less than or equal to 100,000 g/mol, less than or equal to 50,000 g/mol, less than or equal to 10,000 g/mol, less than or equal to 5,000 g/mol, or less than or equal to 1,000 g/mol. Combination of the above recited ranges are also possible (e.g., the poly(aryl ether) has a number-average molecular weight between greater than or equal to 400 g/mol and less than or equal to 2,000,000 g/mol, the poly(aryl ether) has a number-average molecular weight between greater than or equal to 50,000 g/mol and less than or equal to 100,000 g/mol). Other ranges are also possible. The molecular weight (e.g., the number-average molecular weight) of the poly(aryl ether) (e.g., soluble poly(aryl ether)) may be determined as an absolute value or relative to standard materials by end group analysis, light scattering, solution viscosity, or gel permeation chromatography. In some embodiments, and as explained herein in greater detail, the poly(aryl ether)s can be branched, hyperbranched, or crosslinked to provide gels, semi-solids, or solids with higher molecular weights (e.g., greater than 2,000,000 g/mol).

According to certain embodiments, the poly(aryl ether) may be porous. As used herein, the term porous is given its ordinary meaning in the art and generally refers to a material containing void space(s) (e.g., pores) not occupied by the main framework of atoms that make up the structure of the solid. The porous poly(aryl ether) may comprise open pores and/or closed pores, in some embodiments. In certain embodiments, the pores of the poly(aryl ether) are accessible and are permeable to fluids (e.g., gases and/or liquids). The porous poly(aryl ether) may be microporous (e.g., containing a plurality of pores with an average characteristic dimension less than 2 nm), mesoporous (e.g., containing a plurality of pores with an average characteristic dimension between greater than or equal to 2 nm and less than 50 nm), or macroporous (e.g., containing a plurality of pores with an average characteristic dimension greater than or equal to 50 nm). As explained in further detail herein, a porous poly(aryl ether) may advantageously be useful for certain applications, such as, for example, selective filtration, separation, and/or absorption of fluids (e.g., gases and/or liquids).

In some embodiments, the void space(s) in the poly(aryl ether) may be intrinsic and defined by the molecular structure of the poly(aryl ether) that prevents a dense packing of polymer chains. In certain embodiments, the void space(s) may be introduced by processing of the poly(aryl ether). For example, in certain embodiments, the poly(aryl ether) may be processed thermally, chemically, or photochemically to introduce one or more void spaces. In some embodiments, the poly(aryl ether) may comprise a first portion of void spaces that are intrinsic as defined by the molecular structure of the poly(aryl ether) and a second portion of void spaces that are introduced by processing the poly(aryl ether). According to certain embodiments, the porosity or free volume of the poly(aryl ether) may be tunable, in some embodiments, depending on the choice of monomer and/or comonomer (and/or second comonomer) employed during production of the poly(aryl ether). In some such embodiments, the resulting poly(aryl ether) may be produced so that the material is suitable for filtration, separation, and/or absorption of target molecules.

In some embodiments, the porosity of the poly(aryl ether) may be quantified by the Brunauer-Emmett-Teller (BET) surface area of the poly(aryl ether). The poly(aryl ether) may have any of a variety of suitable BET surface areas. In some embodiments, for example, the poly(aryl ether) has a BET surface area greater than or equal to 200 $m^2/g$, greater than or equal to 400 $m^2/g$, greater than or equal to 600 $m^2/g$, or greater than or equal to 800 $m^2/g$. In certain embodiments, the poly(aryl ether) has a BET surface area less than or equal to 1000 $m^2/g$, less than or equal to 800 $m^2/g$, less than or equal to 600 $m^2/g$, or less than or equal to 400 $m^2/g$. Combinations of the above recited ranges are also possible (e.g., the poly(aryl ether) has a BET surface area between greater than or equal to 200 $m^2/g$ and less than or equal to 1000 $m^2/g$, the poly(aryl ether) has a BET surface area between greater than or equal to 600 $m^2/g$ and less than or equal to 800 $m^2/g$). Other ranges are also possible. In some embodiments, the BET analysis of the poly(aryl ether) may be performed at 77K, and the poly(aryl ether) is degassed at 120° C. for 5 hours prior to analysis.

In some embodiments, the void space(s) of the poly(aryl ether) may be transient, and hence defined to one skilled in the art as free volume elements, still enabling transport and/or separation of molecules, ions, and the like, but without having measurable BET surface areas.

The poly(aryl ether) may be permeable to fluids (e.g., gases and/or liquids). For example, in some embodiments, the poly(aryl ether) may be permeable to $H_2$ and may have any of a variety of suitable $H_2$ gas permeabilities. In certain embodiments, the poly(aryl ether) has a $H_2$ gas permeability at 35° C. and 1 bar greater than or equal to 100 barrer, greater than or equal to 1,000 barrer, greater than or equal to 2,000 barrer, greater than or equal to 3,000 barrer, greater than or equal to 4,000 barrer, greater than or equal to 5,000 barrer, greater than or equal to 6,000 barrer, greater than or equal to 7,000 barrer, greater than or equal to 8,000 barrer, or greater than or equal to 9,000 barrer. In some embodiments, the poly(aryl ether) has a $H_2$ gas permeability at 35° C. and 1 bar less than or equal to 10,000 barrer, less than or equal to 9,000 barrer, less than or equal to 8,000 barrer, less than or equal to 7,000 barrer, less than or equal to 6,000 barrer, less than or equal to 5,000 barrer, less than or equal to 4,000 barrer, less than or equal to 3,000 barrer, less than or equal to 2,000 barrer, or less than or equal to 1,000 barrer. Combinations of the above recited ranges are also possible (e.g., the poly(aryl ether) has a $H_2$ gas permeability at 35° C. and 1 bar between greater than or equal to 100 barrer and less than or equal to 10,000 barrer, the poly(aryl ether) has a $H_2$ gas permeability at 35° C. and 1 bar between greater than or equal to 4,000 barrer and less than or equal to 6,000 barrer). Other ranges are also possible. In certain embodiments, the $H_2$ gas permeability of the poly(aryl ether) is determined by measuring the molar flux of $H_2$ gas through a film of the poly(aryl ether) of known thickness and surface area with a known pressure on one side of the film and a vacuum on the other side of the film. As would generally be understood by a person of ordinary skill in the art, the poly(aryl ether) may be permeable to other fluids (e.g., gases and/or liquids) in addition to $H_2$, as explained herein in greater detail.

According to certain embodiments, the poly(aryl ether) may be relatively stiff or have a relatively high modulus (e.g., as compared to other poly(aryl ether)s prepared by conventional methods. The stiffness (or modulus) of the poly(aryl ether) may quantified, in some embodiments, by the glass transition temperature of the poly(aryl ether). The poly(aryl ether) may have any of a variety of suitable glass transition temperatures. In some embodiments, for example, the poly(aryl ether) has a glass transition temperature greater than or equal to 50° C., greater than or equal to 100° C., greater than or equal to 150° C., greater than or equal to 200° C., greater than or equal to 250° C., greater than or equal to 300° C., or greater than or equal to 350° C. In some embodiments, the poly(aryl ether) has a glass transition temperature less than or equal to 400° C., less than or equal to 350° C., less than or equal to 300° C., less than or equal to 250° C., less than or equal to 200° C., less than or equal to 150° C., or less than or equal to 100° C. Combinations of the above recited ranges are also possible (e.g., the poly(aryl ether) has a glass transition temperature between greater than or equal to 50° C. and less than or equal to 400° C., the poly(aryl ether) has a glass transition temperature between greater than or equal to 150° C. and less than or equal to 300° C.). Other ranges are also possible. The glass transition temperature of the poly(aryl ether) may be determined by dynamical mechanical analysis and/or differential scanning calorimetry.

Figure 2:
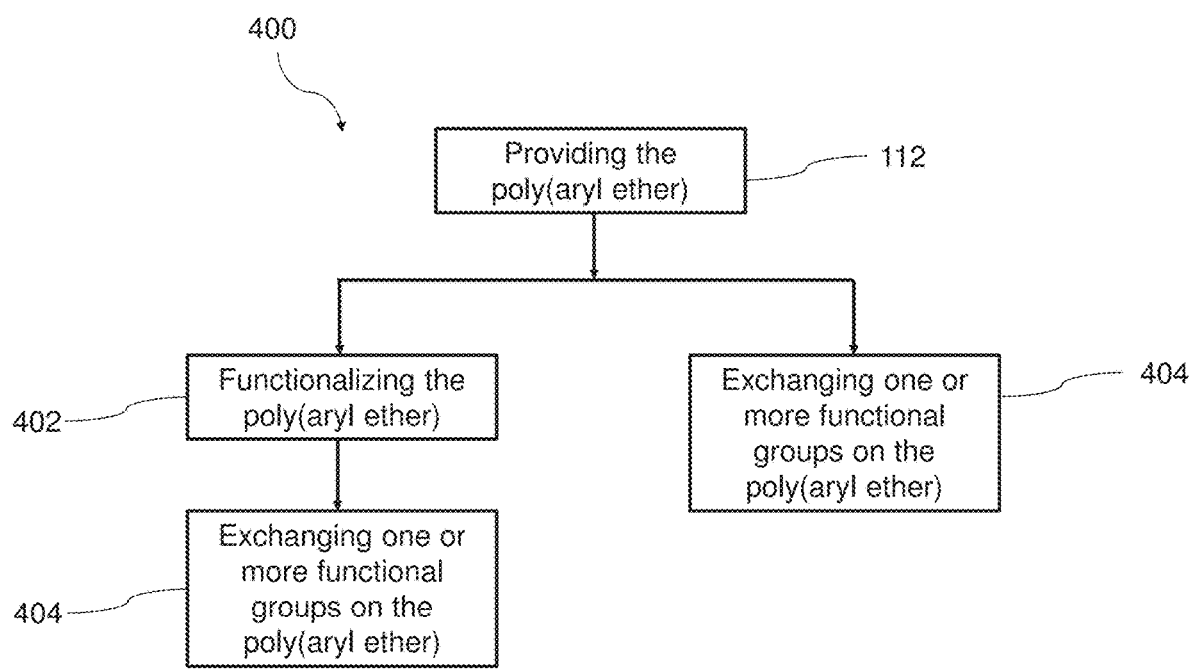
FIG. 2 shows, according to some embodiments, a method of functionalizing a poly(aryl ether) and/or exchanging one or more functional groups on a poly(aryl ether)

FIG. 2 shows, according to some embodiments, a method of functionalizing a poly(aryl ether) and/or exchanging one or more functional groups on the poly(aryl ether). According to certain embodiments, method 400 may comprise step 112 of providing the poly(aryl ether) (see, for example FIGS. 1A-1E) followed by step 402 of functionalizing the poly (aryl ether). The poly(aryl ether) may be functionalized by any of a variety of suitable mechanisms. In some embodiments, for example, at least on aryl, heteroaryl, cyclic, heterocyclic group, and/or endcapping group of the poly (aryl ether) is functionalized by halogenation, sulfonation, nitration, acylation, nitrene addition, carbene addition, radical addition, and/or chloromethylation. Methods of functionalizing the poly(aryl ether) by at least one of the mechanisms above would be known to a person of ordinary skill in the art. After functionalizing the poly(aryl ether), method 400 may comprise step 404 of exchanging one or functional groups on the poly(aryl ether). Methods of exchanging one or more functional groups would be known to a person of ordinary skill in the art.

In some embodiments, the poly(aryl ether) may comprise existing functional groups, and method 400 may comprise exchanging one or more the functional groups on the poly (aryl ether). Referring to FIG. 2, method 400 may, in some embodiments, comprise step 112 of providing the poly(aryl ether) (e.g., a functionalized poly(aryl ether)), followed by step 404 of exchanging one or more functional groups on the poly(aryl ether). As explained herein, for example, one or more aryl, heteroaryl, cyclic, heterocyclic group, and/or endcapping groups of the poly(aryl ether) may be substituted with one or more functional groups (e.g., an aliphatic group, a nitrile group, an amine group, and/or an aldehyde group). In some such embodiments, the one or more existing functional groups may be exchanged with one or more other functional groups.

According to certain embodiments, the poly(aryl ether) may be associated with one or more polymers (e.g., copolymers). In some embodiments, for example, the poly(aryl ether) may be bound to a copolymer by one or more bonding interactions (e.g., covalent bonds, non-covalent bonds, ionic bonds, hydrogen bonds, electrostatic forces, Van der Waals forces, etc.). The poly(aryl ether) associated with one or more copolymers may, in some embodiments, be a branched polymer structure and/or a hyperbranched polymer structure.

As used herein, the term "branched polymer" is given its ordinary meaning in the art and generally refers to a polymer having one or more secondary polymer chains associated with (e.g., bonded to) a primary backbone. The terms "primary" in primary backbone and "secondary" in secondary polymer chain are not intended to imply that the primary backbone is more important (e.g., more dominating in defining function) or longer than the one or more secondary polymer chains. In some embodiments, the backbone of the one or more secondary polymer chains may also be branched to contain one or more tertiary polymer chains. One or more branches on the branched polymer structure may form a loop, in some embodiments. In certain embodiments, the poly(aryl ether) may be or comprise the primary backbone of the branched polymer. In other embodiments, the poly(aryl ether) may be or comprise one or more secondary polymer chains associated with the primary backbone.

As used herein, the term "hyperbranched polymer" is given its ordinary meaning in the art and generally refers to a dendritic polymer having a high branching density with the potential of branching in each repeating unit. In certain embodiments, the hyperbranched polymer is prepared in a one-pot synthesis, therefore limiting the control on molar mass and branching accuracy.

The poly(aryl ether) associated with one or more polymers (e.g., copolymers), such as a branched polymer or hyperbranched polymer, may advantageously have unique properties, including, but not limited to, a three-dimensional architecture; high modulus; high thermal stability; high chemical stability; optical clarity; catalytic activity; luminescence; intramolecular cavities, cages, and/or pores; resistance to plasticization, and/or resistance to physical aging. The properties of the poly(aryl ether) associated with one or more polymers may be tunable, according to certain embodiments, depending on the choice of copolymer.

In some embodiments, the poly(aryl ether) is associated with one or more particles (e.g., microparticles, nanoparticles). For example, in certain embodiments, the poly(aryl ether) may be bound to a particle (e.g., a nanoparticle) by one or more bonding interactions (e.g., covalent bonds, non-covalent bonds, ionic bonds, hydrogen bonds, electrostatic forces, Van der Waals forces, etc.). The poly(aryl ether) bound to the particle may be a polymer-nanoparticle composite, in some embodiments.

The poly(aryl ether) associated with one or more particles (e.g., nanoparticles) may advantageously impart the composite with one or more enhanced properties, including, but not limited to, desirable thermomechanical, dielectric, conductive, magnetic, catalytic, transport, and/or optical properties; enhanced permeability; enhanced selectivity; resistance to plasticization; and resistance to physical aging. The properties of the poly(aryl ether) associated with one or more particles may be tunable, in some embodiments, depending on the choice of particle.

The particle (e.g., nanoparticle) may comprise any of a variety of suitable materials, including, for example, a metal, a polymer, a ceramic, a quantum dot, a zeolite, a metal-organic framework (MOF), and/or the like. The particle may have any of a variety of suitable shapes and/or sizes. In certain embodiments, for example, the particle may be a nanoparticle having a longest average characteristic dimension (e.g., an average diameter) between greater than or equal to 1 nm and less than 1000 nm. In some embodiments, the particle may be a microparticles having a longest average characteristic dimension (e.g., an average diameter) between greater than or equal to 1000 nm and less than or equal to 100,000 nm. The particle may be a sphere (e.g., nanosphere), a tube (e.g., a nanotube), a wire (e.g., a nanowire), a rod (e.g., a nanorod), a fiber (e.g., a nanofiber) and the like.

According to some embodiments, the poly(aryl ether) is associated with a substrate. In certain embodiments, for example, the poly(aryl ether) may be bound to a substrate via one or more bonding interactions (e.g., covalent bonds, non-covalent bonds, ionic bonds, hydrogen bonds, electrostatic forces, Van der Waals forces, etc.). The poly(aryl ether) may be a polymer brush structure, in some embodiments, in which one terminal end of the poly(aryl ether) is tethered and/or grafted to a surface of the substrate. In some embodiments, the poly(aryl ether) is coated on the surface. For example, in certain aspects, the poly(aryl ether) may be deposited on the surface (e.g., by chemical vapor deposition). Associating the poly(aryl ether) to a substrate may advantageously tailor the surface properties of the substrate, including the hydrophobicity/hydrophilicity and/or biocompatibility of the substrate. Other advantages of associating a poly(aryl ether) with one or more substrates, such as for use in filtering and/or separation of fluids, are explained in greater detail herein.

The substrate may comprise any of a variety of materials, including, for example, a metal, silica, a ceramic, a polymer, a magnetic particle, an alloy, a metal oxide, and/or the like. In some embodiments, the substrate is porous. Non-limiting examples of substrate materials include, but are not limited to, a stir bar, a reaction vessel, and/or tubing (e.g., plastic tubing).

According to certain embodiments, the poly(aryl ether) may be a separation membrane. As used herein, the term "separation membrane" is given its ordinary meaning in the art and generally refers to a selective semi-permeable barrier that allows for passage of at least a first species at a faster rate than that of at least a second species, wherein the first and second species can be different species or the same species of different size and/or property. The separation membrane, in some embodiments, may be a gaseous separation membrane or a liquid separation membrane. In certain embodiments, the separation membrane may be an ion exchange membrane. The ion exchange membrane may be configured, in some embodiments, to separate certain ions through the membrane while blocking other ions or neutral molecules from passing through the membrane. According to certain embodiments, for example, the ion exchange membrane may be a proton exchange membrane that is configured to separate (e.g., conduct) protons through the membrane while blocking electrons from passing through the membrane. The separation membrane may be incorporated into a battery (e.g., a metal-sulfur battery, a lithium-ion battery, etc.), in some embodiments.

Figure 3A:
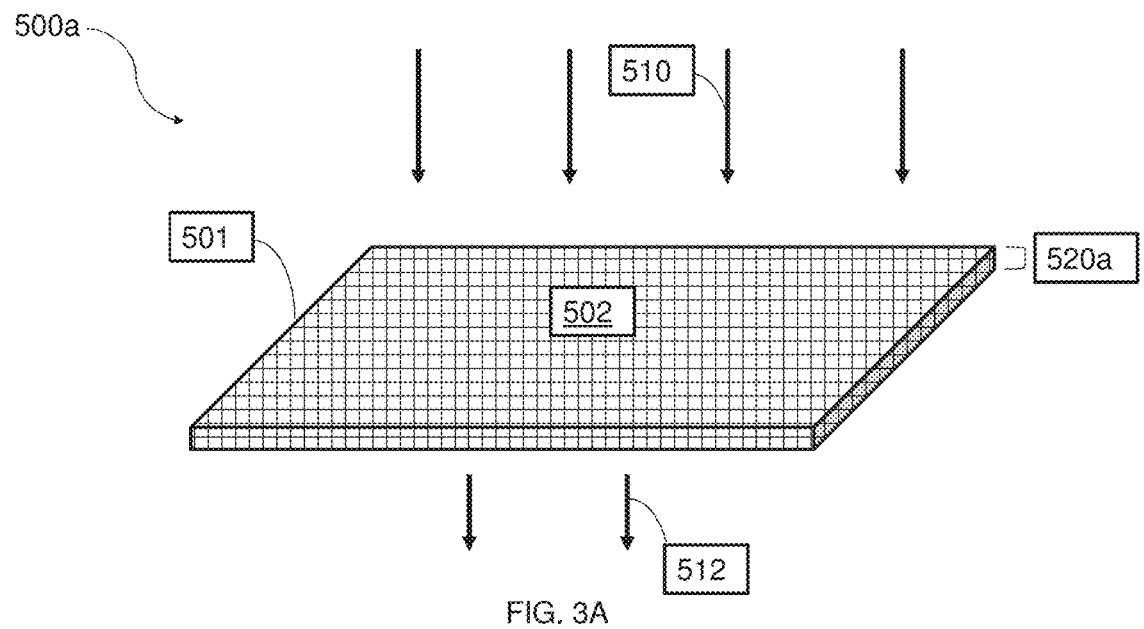
FIG. 3A shows, according to some embodiments, a separation membrane comprising a poly(aryl ether)

In certain embodiments, the separation membrane comprises a poly(aryl ether). FIG. 3A shows, according to some embodiments, separation membrane 500a comprising poly (aryl ether) 502 (e.g., a layer or film of a poly(aryl ether)).

Separation membrane 500a may have any of a variety of suitable shapes, sizes, and/or thicknesses. In certain embodiments, separation membrane 500a may be a thin film having an average thickness 520a greater than or equal to 10 nm, greater than or equal to 100 nm, greater than or equal to 500 nm, greater than or equal to 1 micrometer, greater than or equal to 2 micrometers, or greater than or equal to 5 micrometers. In some embodiments, separation membrane 500a may have an average thickness 520a less than or equal to 10 micrometers, less than or equal to 5 micrometers, less than or equal to 2 micrometers, less than or equal to 1 micrometer, less than or equal to 500 nm, or less than or equal to 100 nm. Combinations of the above recited ranges are also possible (e.g., the separation membrane has an average thickness greater than or equal to 10 nm and less than or equal to 10 micrometers).

Figure 3B:
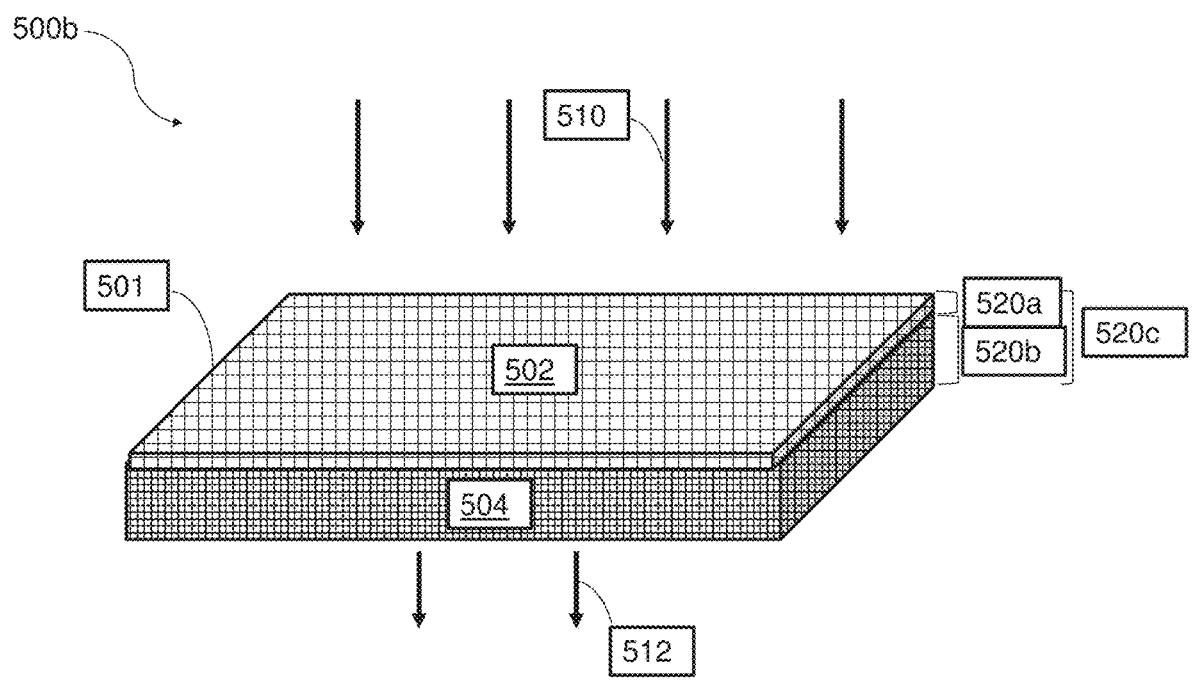
FIG. 3B shows, according to some embodiments, a poly(aryl ether) associated with a substrate to provide a separation membrane.

In certain embodiments, the poly(aryl ether) may be associated with a substrate to provide a separation membrane. FIG. 3B shows, for example, poly(aryl ether) 502 associated with substrate 504 to provide separation membrane 500b. Referring to FIG. 3B, poly(aryl ether) 502 may be bound (e.g., chemically bound) to substrate 504, tethered and/or grafted to substrate 504, and/or coated (e.g., deposited) onto substrate 504. As explained herein, the substrate may be porous, and the substrate may have the substantially the same porosity as poly(aryl ether). In other embodiments, the substrate may have a different porosity compared to the poly(aryl ether). In some such embodiments, the poly(aryl ether) may have a first, larger porosity and the substrate may have a second, smaller porosity.

Separation membrane 500b may have any of a variety of suitable shapes, sizes, and/or thicknesses. In some embodiments, for example, poly(aryl ether) 502 may have first average thickness 520a and substrate 504 may have second average thickness 520b, thereby providing separation membrane 500b with total average thickness 520c. First average thickness 520a may be any of the average thicknesses mentioned above (e.g., less than or equal to 10 micrometers). Second average thickness 520b may, for example, be between greater than or equal to 1 micrometer and less than or equal to 1000 micrometers.

According to some embodiments, a method of separating a target substance from a mixture of substances is described herein. Referring, for example, to FIGS. 3A and 3B, the method may comprise exposing mixture of substances 510 to surface 501a of separation membrane 500a comprising poly(aryl ether) 502 or surface 501b or separation membrane 500b comprising poly(aryl ether) 502 associated with substrate 504. In certain embodiments, the method comprises separating target substance 512 from mixture of substances 510 using separation membrane 500a or 500b. The porosity of the poly(aryl ether) and/or the separation membrane may be specifically tailored to allow for one or more target substances to pass through the separation membrane while blocking other fluids from passing through the separation membrane. In some embodiments, for example, the structure of the monomer, comonomer, and/or second monomer may be chosen to provide a poly(aryl ether) with a certain porosity that allows for the separation of one or more target species from the mixture of substances. In certain non-limiting embodiments, poly(aryl ether) 502 of separation membrane 500a and/or 500b may be associated with one or more metals that facilitate the separation of target substance 512 from mixture of substances 510. Method of associating one or more metals with a poly(aryl ether) are explained in greater detail herein.

The mixture of substances may, in some embodiments, comprise one or more gases. In some embodiments, for example, the one or more gases comprise carbon dioxide, dihydrogen sulfide, ethylene, propylene, butylene, acetylene, dioxygen, carbon monoxide, nitrogen dioxide, hydrogen, helium, argon, ethane, propane, butane, methane, and/or combinations thereof. Other gases are also possible.

Any of a variety of suitable target gases may be separated from the mixture of substances (e.g., mixture of gases). In some non-limiting embodiments, for example, oxygen and/or nitrogen are separated from air, carbon dioxide is separated from methane, helium is separated from methane, dihydrogen sulfide is separated from methane, ethylene is separated from ethane and/or methane, propylene is separated from propane, and/or methane is separated from higher hydrocarbons.

According to certain embodiments, the mixture of substances may comprise one or more liquids. For example, in certain embodiments, the one or more liquids comprise oil, water, and/or ethanol, and/or combinations thereof. Other liquids are also possible.

Any of a variety of suitable target liquids may be separated from the mixture of substances (e.g., mixture of liquids). In some non-limiting embodiments, for example, ethanol is separated from water and/or a water insoluble organic phase (e.g., oil) is separated from water.

In some embodiments, the mixture of substances comprises one or more ions (e.g., protons).

Figure 4A:
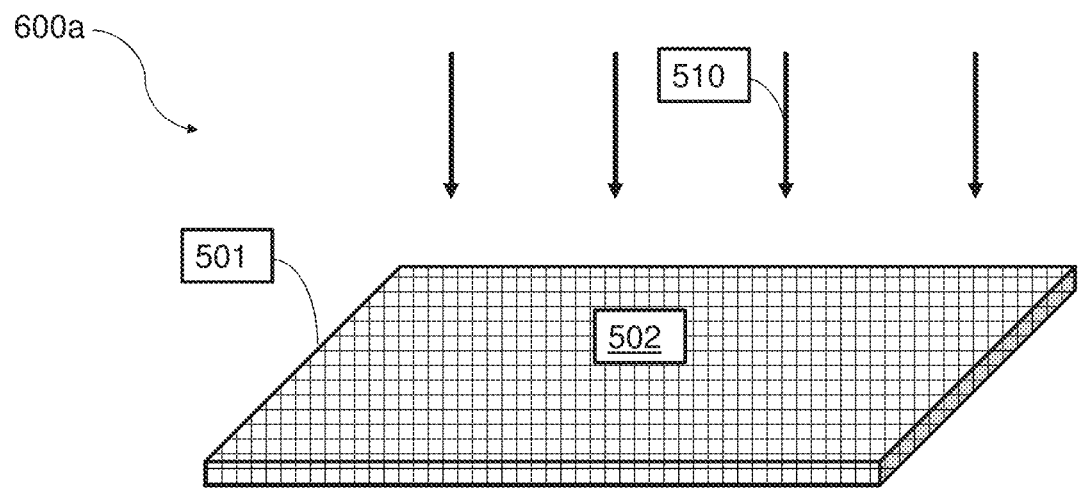
FIG. 4A shows, according to some embodiments, an adsorbent comprising a poly(aryl ether)

In some embodiments, the poly(aryl ether) may be an adsorbent. The adsorbent may, in certain embodiments, be a gas adsorbent or a liquid adsorbent that is configured to adsorb any of the aforementioned gases and/or liquids described above with respect to the separation membrane. The adsorbent may, in some embodiments, comprise a poly(aryl ether). FIG. 4A shows, according to some embodiments, adsorbent 600a comprising poly(aryl ether) 502 (e.g., a layer or film of a poly(aryl ether)). The adsorbent may have any of a variety of suitable shapers and/or sizes.

Figure 4B:
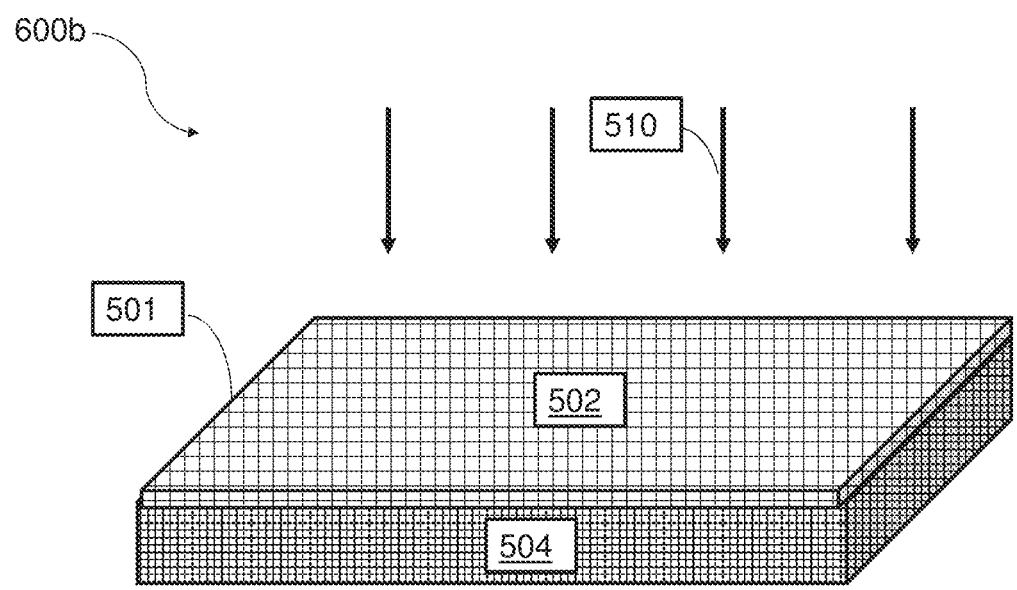
FIG. 4B shows, according to some embodiments, a poly(aryl ether) associated with a substrate to provide an adsorbent.

In certain embodiments, the poly(aryl ether) may be associated with a substrate to provide an absorbent. FIG. 4B shows, according to some embodiments, poly(aryl ether) 502 associated with substrate 504 to provide absorbent 600b. Referring to FIG. 4B, poly(aryl ether) 502 may be bound (e.g., chemically bound) to substrate 504, tethered and/or grafted to substrate 504, and/or coated (e.g., deposited) onto substrate 504.

According to certain embodiments, a method of adsorbing a target substance from a mixture of substances is described herein. Referring, for example, to FIGS. 4A and 4B, the method may comprise exposing mixture of substances 510 to surface 501 of adsorbent 600a comprising poly(aryl ether) 502 or adsorbent 600b comprising poly(aryl ether) 502 associated with substrate 504. In some embodiments, the method comprises adsorbing at least one target substance from mixture of substances 510 using adsorbent 600a or adsorbent 600b. One or more of the target substances may be adsorbed into one or more cavities, cages, and/or pores, of poly(aryl ether) 502, in some embodiments. Accordingly, the structure of the poly(aryl ether) may be advantageously tailored to absorb certain target substances that are capable of diffusing into the one or more cavities, cages, and/or pores of poly(aryl ether) 502. In some embodiments, adsorbent 600a and/or 600b may be configured to absorb substantially all substances from mixture of substances 510. In other embodiments, absorbent 600a and/or 600b may be configured to absorb one or more target substances from mixture of substances 510.

The mixture of substances may, in some embodiments, comprise any of the aforementioned gases and/or liquids described herein with respect to the separation membrane. In some embodiments, for example, the one or more gases comprise carbon dioxide, dihydrogen sulfide, ethylene, propylene, butylene, acetylene, dioxygen, carbon monoxide, nitrogen dioxide, hydrogen, helium, argon, ethane, propane, butane, methane, and/or combinations thereof, and the one or more liquids comprise oil, water, and/or ethanol, and/or combinations thereof.

Figure 42A:
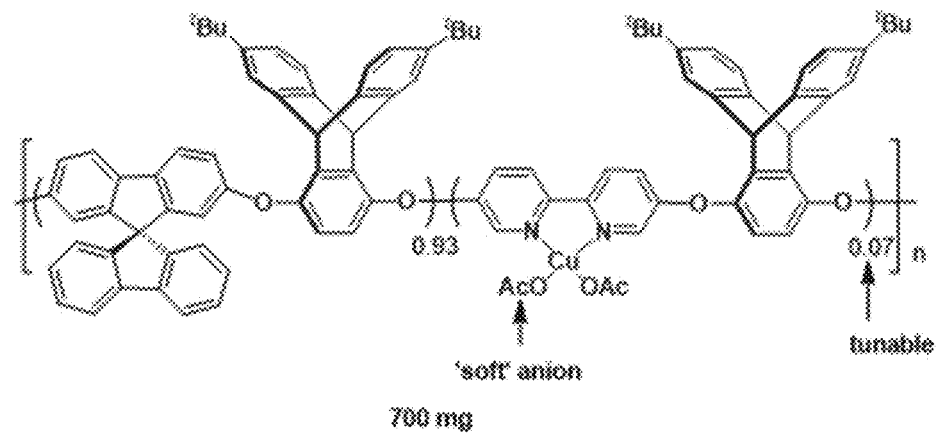
FIG. 42A shows, according to some embodiments, a poly(aryl ether) bound to a metal for absorbing an alkene.
Figure 42B:
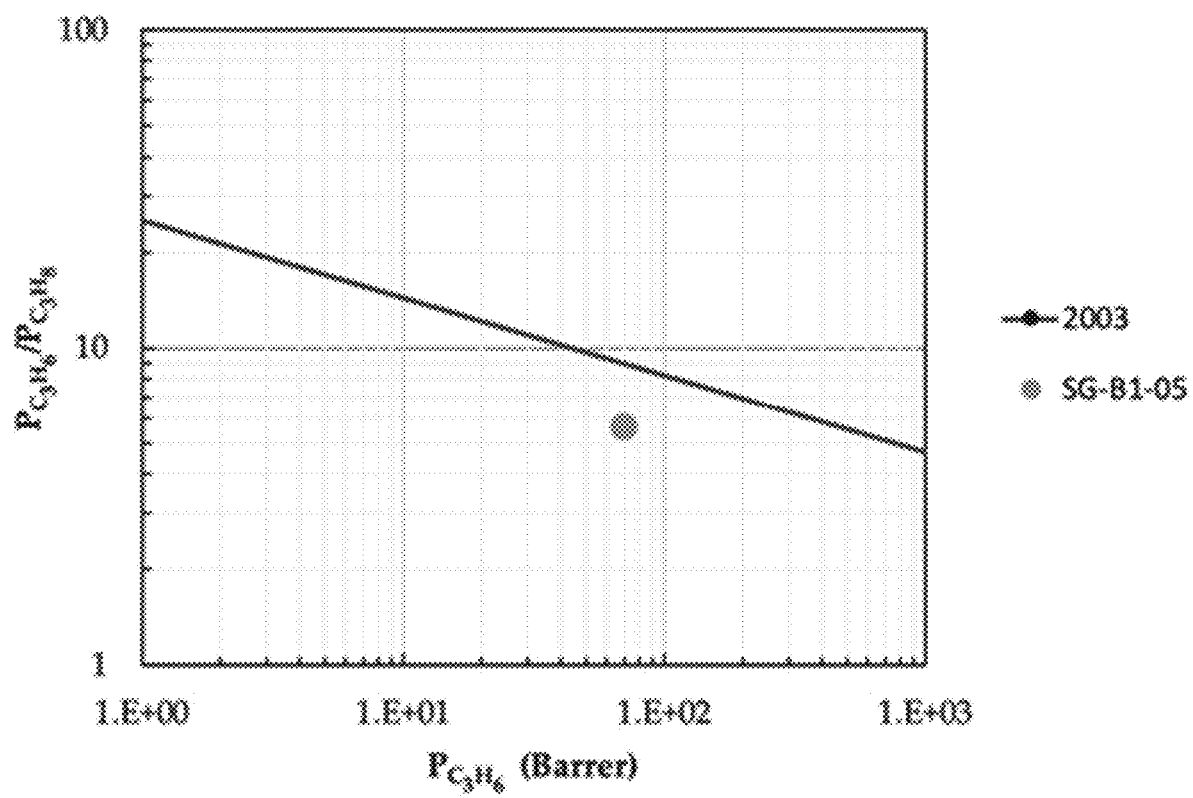
FIG. 42B shows, according to some embodiments, propene permeability and propene/propane selectivity for the poly(aryl ether) shown in FIG. 42A.

In certain non-limiting embodiments, the poly(aryl ether) may be used to adsorb carbon dioxide In certain non-limiting embodiments, poly(aryl ether) 502 of adsorbent 600a and/or 600b may be associated with one or more metals that facilitate the adsorption of at least one target substance from mixture of substances 510. Method of associating one or more metals with a poly(aryl ether) are explained in greater detail herein. In some embodiments, for example, poly(aryl ether) 602 may be associated with a metal that is configured to adsorb an alkane and/or an alkene. In certain non-limiting embodiments, a poly(aryl ether) with a structure as shown in FIG. 42A may be used to adsorb propene (e.g., from a mixture of propene and propane), as shown in FIG. 42B.

According to certain embodiments, a method of sequestering metals is described herein. In some embodiments, for example, the method may comprise exposing a composition comprising a poly(aryl ether) to one or more metals. The composition may, in some embodiments be a separation membrane (e.g., separation membrane 500a and/or 500b in FIGS. 3A and 3B, respectively). In other embodiments, the composition may be an adsorbent (e.g., adsorbent 600a and/or adsorbent 600b in FIGS. 4A and 4B, respectively). Referring, for example, to FIGS. 3A and 4A, separation membrane 500a and/or adsorbent 600a may be exposed to mixture of substances 610 comprising one or more metals. The one or more metals may be dissolved in solution, in some embodiments.

In some embodiments, the method comprises sequestering at least a portion of the one or more metals. The poly(aryl ether) may be associated with the one or more sequestered metals as a result of exposing the composition comprising the poly(aryl ether) to the one or more metals. According to certain embodiments, each metal may be associated with the poly(aryl ether) through at least two bonding interactions between each metal and at least one aryl group and/or heteroaryl group. For example, in some embodiments, each of the at least two bonding interactions is between each metal and a functional group comprising a Lewis basic donor atom. Exemplary metals and/or functional groups are explained herein in greater detail. In some embodiments, at least one of the at least two bonding interactions is a covalent interaction and/or an ionic interaction. As would be known to a person of ordinary skill in the art, the association of one or more metals may be confirmed by comparing the optical spectrum of the poly (aryl ether) associated with the one or more metals to the optical spectrum of the poly(aryl ether) prior to the association.

The composition comprising a poly(aryl ether) may be used to associate any of a variety of suitable metals. In some embodiments, for example, the composition may be configured to associate one or more toxic metals, including, but not limited to, cadmium, lead, mercury, arsenic, and/or combinations thereof. In certain embodiments, the composition may be configured to associate one or more transition metals (e.g., copper, silver, gold, nickel, cobalt, and/or combinations thereof). In some aspects, the one or more metals comprise one or more main group elements. A composition configured to associate one or more toxic metals, transition metals, and/or main group elements may advantageously be used in clean water technology applications.

According to certain embodiments, the composition comprising a poly(aryl ether) may be used to associate one or more luminescent metals (e.g., europium, copper, platinum, palladium, iridium, terbium, and/or combinations thereof). In some such embodiments, the composition may be advantageously used in systems comprising emissive displays, fluorescent lamps, and/or light-emitting diodes (LEDs). In certain embodiments, the composition comprising a poly (aryl ether) associated with one or more luminescent metals may be used in sensing applications.

The poly(aryl ether) may comprise any of a variety of suitable functional groups that are capable of associating one or more metals. In some embodiments, for example, the poly(aryl ether) comprises one or more functional groups comprising an ether, nitrile, thioether, phosphine, phosphate, sulfate, nitrate, borate, amine, alcohol, thiolate, sulfonate, imine, amide, and/or carboxylate. In some embodiments, for example, the functional group comprises pyridine, bipyridyl, thiazole, triazine, triazole, 1,3,4-oxadiazole, quinoline, indole, and/or parazine.

According to certain embodiments, the composition comprising a poly(aryl ether) associated with one or more metals may be a catalytic composition, wherein the poly(aryl ether) is a support and the one or more metals is catalytic.

According to certain embodiments, a method of photocatalysis is described herein. The poly(aryl ether) may, for example, comprise a chromophore that is capable of photocatalysis. As explained herein, the poly(aryl ether) may comprise a monomer, comonomer (e.g., first comonomer), and a second comonomer, thereby providing a poly(aryl ether) with the formula [(—Ar'—O—Ar—O—Ar"—O—)$_n$] or [(—Ar"—O—Ar—O—Ar'—O—)$_n$]. In some such embodiments, the Ar" may comprise a chromophore capable of photocatalysis. The chromophore may, in some embodiments, be activated to create a species that is highly reducing, highly oxidizing, or both. The chromophore may be activated by any of a variety of suitable mechanisms, including, but not limited to, exposing the chromophore to light of an appropriate wavelength.

In some embodiments, the method comprises exposing the activated photoredox catalyst to a substrate reagent and catalyzing a reaction of the substrate reagent. In certain embodiments, for example, the reaction of the substrate reagent is reduction of the substrate reagent. In other embodiments, the reaction of the substrate reagent is oxidation of the substrate reagent. In yet another embodiments, the reaction of the substrate reagent is a reaction between the substrate reagent and an external reactant. Non-limiting examples of photocatalytic reactivity include, but are not limited to, oxidation of sulfides to sulfoxides, dehalogenation, halogenation, arylation, and/or hydrogen-atom transfer.

According to some embodiments, the photocatalytic poly(aryl ether) may be recovered after the catalytic reaction and reused in subsequent catalysis.

The following examples are intended to illustrate certain embodiments of the present invention, but do not exemplify the full scope of the invention.

EXAMPLE 1

Poly(aryl ether)s (PAEs) are a class of polymeric materials that have a number of uses based on their high stability, high glass transition temperatures, chemical resistance, and ability to undergo aggressive post-polymerization functionalization. A number of commercial products are based on PAEs, which make use of their ability to interface with organic solvents, endure high compressive loads, and maintain mechanical properties at elevated temperatures. PAEs are limited in scope as a result of the limitations in their synthesis. An expanded scope of PAE structures will expand the range of properties and applications displayed by these materials. In addition, an expanded scope of PAEs can be used as catalyst supports, photocatalysts, adsorbents, gas and liquid separation membranes, ion exchange membranes, high temperature structural materials, optical elements, and chemical sensors.

A new synthetic method to prepare poly(aryl ether)s has been developed that does not require aryl fluorides or electron withdrawing groups in the backbone. The method uses transition metal catalyzed reactions between Ar—OH and Ar—X (X=Cl, Br, I) to create new C—O bonds, which has allowed for many new types of poly(aryl ether) materials to be produced. The scope of PAE structures that can be produced is greatly expanded by this method. Aryl-bromides and aryl-chlorides are more readily synthesized than aryl-fluorides and are generally purchased at lower costs. The new synthetic method therefore does not require electron withdrawing groups and can offer an economically attractive alternative in the production of PAEs. The structural diversity of the expanded monomer scope can enable new materials to include materials that promote even higher temperature stability, new functionality, and intrinsic free volume. In some embodiments a monomer can contain C—F bonds that do not react under the metal catalyzed conditions of the polymerization and the polymer will have substantially the same number of C—F groups as the constituent monomers. In embodiments wherein a PAE is created by a S$_N$Ar reaction, however, the Ar—F bonds will be changed to Ar—O bonds and the number of C—F bonds in the polymer will be less than the number of C—F bonds in the constituent monomers.

Figure 5:
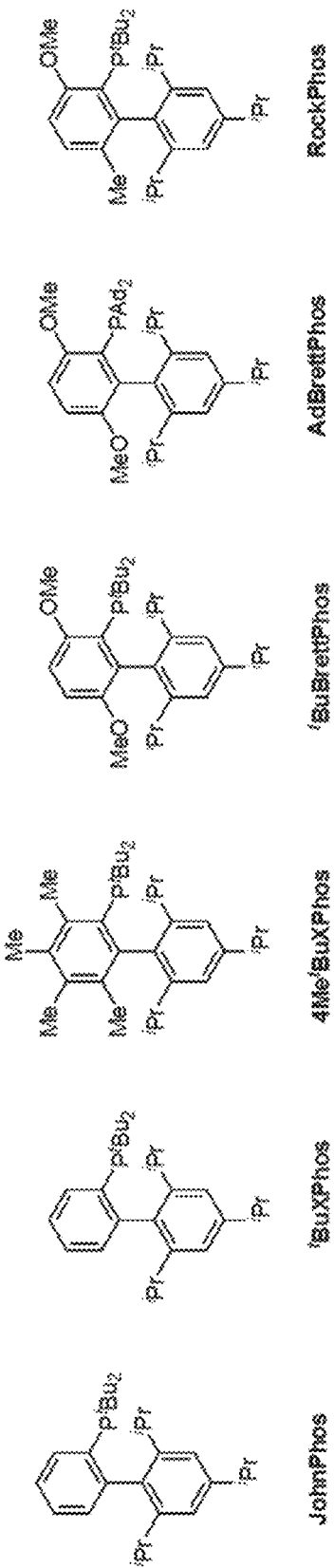
FIG. 5 shows, according to some embodiments, examples of catalyst phosphine ligands.

A central aspect of this disclosure is the use of catalytic methods using transition metal catalysts to produce new Ar—O—Ar' linkages from Ar—OH and Ar'—X (X=Cl, Br, I) groups. Conventional S$_N$Ar reactions can be orders of magnitude faster for aryl-fluorides (Ar—F) than the other aryl-halides. In contrast, however, the transition metal catalyzed reactions described herein reactions are faster for aryl-bromides, -chlorides, and -iodides, than they are for aryl-fluorides. A non-limiting embodiment uses a palladium catalyst to carry out the reaction. One skilled in the art will recognize that other transition metal catalysts are also capable of catalyzing coupling reactions and could in some cases be used in place of palladium. These reactions are also facilitated by other elements such as activating ligands that enhance the rate and yield of the catalytic reactions. Non-limiting examples of ligands include phosphine ligands such as those shown in FIG. 5.

One skilled in the art will recognize that the specific reactants used in producing a polymer will be optimally paired to a specific catalytic system (metal, ligand, solvent and other reagents). The conversion of Ar—OH and Ar'—X groups to create Ar—O—Ar' requires a formal loss of HX. In these reactions, acidic HX is not actually generated, but rather a base is added to produce a halide salt. Non-limiting examples of the base can be sterically hindered amines such as 1,8-diazabicyclo[5.4.0]undec-7-ene, carbonates such as K$_2$CO$_3$, bicarbonate such as NaHCO$_3$, phosphates such as K$_3$PO$_4$ or HK$_2$PO$_4$, and/or sterically bulky alkoxides such as potassium t-butoxide. In the case of the ionic bases, the counter cations can be selected from a broad number of different metal cations. In addition, organic cations such as ammonium ions can be used.

Examples of the use of a metal catalyzed polymerization of aryl-chloride and aryl-bromide monomers to produce polymers that can be converted to well-known engineering thermoplastics (e.g., polyetheretherketone (PEEK)) are shown in FIG. 6. As shown, different phosphine ligands were found to produce the optimal (e.g., highest) molecular weights for the different monomers. The use of aryl-chloride monomers under S$_N$Ar conditions resulted in chain termination reactions to reductively transform the Ar—Cl groups into Ar—H groups (Percec, V.; Clough, R. S.; Rinald, P. L.; Litman, V. E., "Termination by Reductive Elimination in the Polyetherification of Bis(aryl chlorides) Activated by Carbonyl Groups, with Bisphenolates" Macromolecules 1991, 24, 5889-5892). These side reactions were suppressed by the use of transition metal catalysis. The synthesis of other known polymers can be similarly achieved using metal catalyzed reactions. Advantages of these methods can include synthesis at lower temperatures, lower cost monomers, higher molecular weights, the ability to include a wide variety of comonomers, and ease of purification.

Membrane separation technologies using high free volume and intrinsically microporous polymers have attracted considerable interest as cost-effective and less energy-intensive alternatives to conventional gas separation techniques such as distillation and absorption. Soluble linear polymers having structures that promote free volume have received considerable attention and are now known as polymers of intrinsic microporosity (PIMs). A majority of PIMs have a ladder structure with rigid and contorted molecular structures that are unable to pack efficiently in the solid state, thereby creating high microporosity and free volume.

Polymer membranes are conventionally formed into flat sheet or asymmetric structures for use in spiral wound or hollow fiber membrane modules. Separation performance is controlled by the selective layer. As described herein, the PAEs are manipulated to form flat sheets for gas separations, reverse osmosis, nanofiltration, ultrafiltration, or microfiltration applications. Additionally, asymmetric hollow fiber membranes, dual-layer hollow fiber membranes, or thin film composites can be used to form a selective PAE film on top of a porous mechanical backing.

Free volume promoting monomers can be included, either in the monomer containing the Ar—OH groups or the monomers containing Ar—X groups. To obtain new high-porosity PAEs for gas separation membranes, high-rigidity non-planar (3D) monomers are combined by Pd-catalyzed C—O cross-coupling reaction. Spirobifluorene (SBF) is a common 3D-substructure in fluorescent semiconductive organic materials, which can block the efficient packing between polymer chains and increase free volume.

FIG. 7 shows the synthesis of various poly(aryl ether)s. The reaction conditions and parameters in FIG. 7 are as follows: A (0.5 mmol); B (0.5 mmol); [(cinnamyl)PdCl]$_2$; (1 mol %, Pd/Ligand=⅓); K$_3$PO$_4$ (3.0 equiv); Tol/DME (0.6/ 0.3 mL); 140° C.; 20 h; a) Mn=number-average molar mass; Đ=polydispersity index; Mn and Đ were measured by THF GPC; b) Isolated yield; and c) No Pd and ligand.

To synthesize spirobifluorene-containing poly(arylene ether)s, the reaction of commercially available 2,7-dibromo-9,9'-spirobifluorene A1 and a model bisphenol B1 was investigated. During the optimization of the model reaction, it was found that the reaction of A1 and B1 afforded the corresponding polymer C1 with high Mn in the presence of Pd/$^t$BuBrettPhos as a catalytic system. BET analysis is often used to evaluate porosity and the surface area of C1 was found to be 37 m$^2$/g (FIG. 7, Entry 1). This low, but significant, BET surface area suggested that a planar comonomer was insufficient to produce high porosity in a spirobifluorene PAE. As a result, polymers were targeted using the rigid bisphenols, spirobi[indene]-6,6'-diol B2 and $^t$Bu triptycene hydroquinone B3 (FIG. 7, Entries 2 and 3). Notably, the reaction of A1 and B3 afforded a high-porosity polymer (C3, SBF-TBTrip-I) which has high Mn and a narrow molecular weight distribution expected for a well-behaved step-growth polymerization. The dependence on the specific aryl halide monomer and the phosphine ligands was also investigated. It was found that the aryl chloride monomers also produce polymer C3 with similar Mn as from the reaction using the corresponding aryl bromide monomer (FIG. 7, Entry 4). The ability to use either class of electrophile allows for a much broader range of monomers. In some embodiments, the use of biaryl(dialkyl)phosphine ligands was key to the success of the reaction, and $^t$BuBrettPhos was optimal for the polycondensation reaction of aryl bromides (FIG. 7, Entry 3). In contrast, catalysts derived from $^t$BuXPhos performed better for aryl chlorides (FIG. 7, Entry 4). A reaction using the less hindered JohnPhos ligand resulted in a significantly lower molecular weight polymer (FIG. 7, Entry 6). Notably, a control reaction revealed that the reaction in the absence of Pd catalyst and ligand does not occur (FIG. 7, Entry 7). This finding confirmed that the background S$_N$Ar reactions of aryl bromide A1 and aryl chloride A2 are negligible. The collective results of FIG. 7 demonstrated that Pd-catalyzed C—O coupling polycondensation reactions are a valuable method for the synthesis of this series of diverse and porous poly(arylene ether)s.

Figure 8:
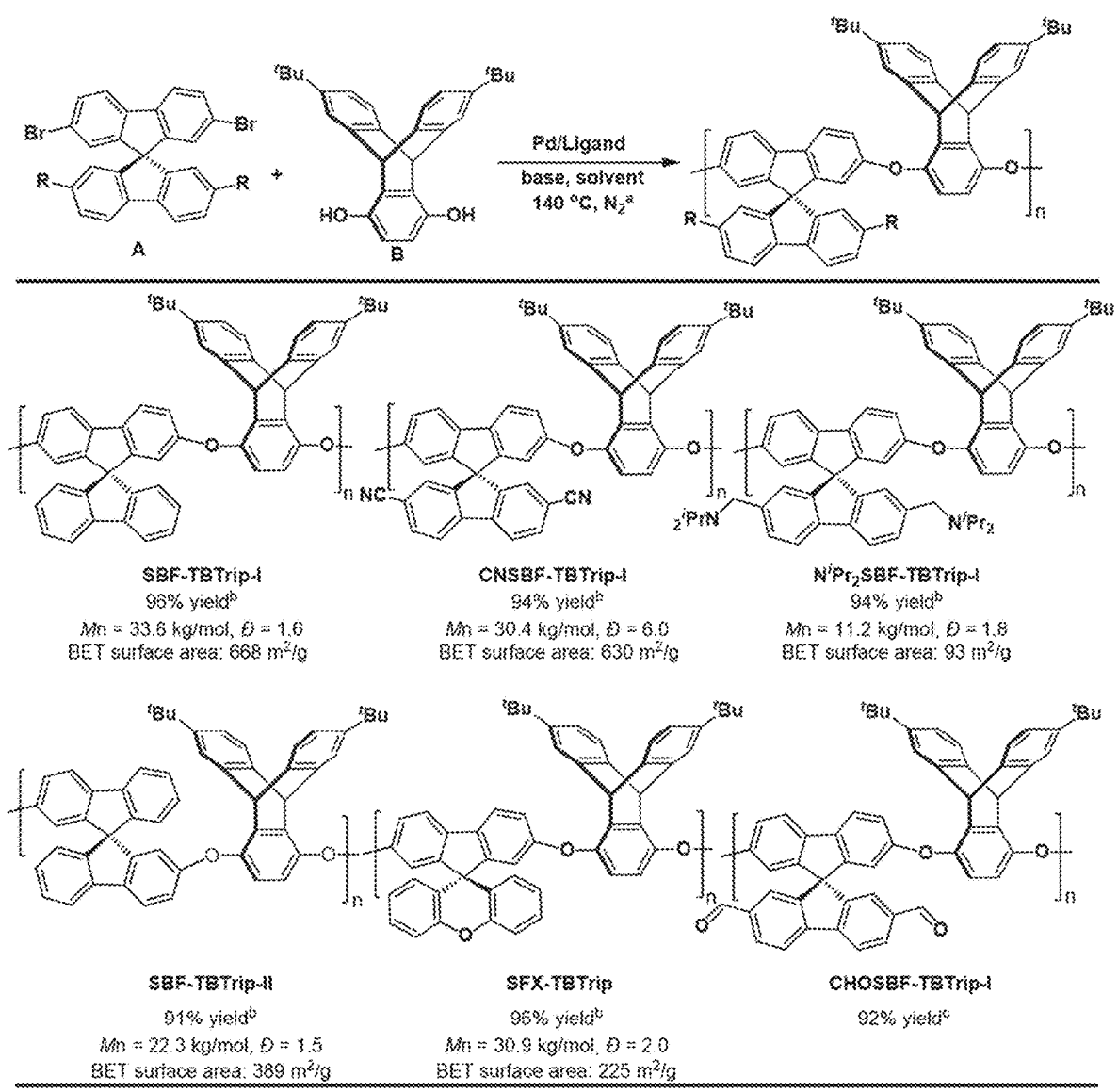
FIG. 8 shows, according to some embodiments, the synthesis of various SBF-TBTrip polymers.

Pd-catalyzed C—O coupling polycondensations are highly functional-group-tolerant and enable the convenient tuning of the porosity and physical properties of the polymers. To produce higher-performance gas separation membranes, several functional groups and/or cross-linking units were incorporated into the polymer backbone. SBF-TBTrip-I displayed the largest BET surface area, and the scope of SBF dibromide monomers that can be incorporated with this polycondensation protocol was investigated (FIG. 8). The reaction conditions and parameters in FIG. 8 are as follows: a) A (1.0 mmol); B (1.0 mmol); [(cinnamyl)PdCl]$_2$ (1 mol %); $^t$BuBrettPhos (6 mol %); K$_3$PO$_4$ (3.0 equiv); Tol/DME (1.2/0.6 mL); 140° C.; 20-72 h; Mn=number-average molar mass; Đ=polydispersity index; Mn and Đ were measured by THF GPC; b) Isolated yield; and c) Insoluble.

CO$_2$-philic CN and NR$_2$ groups promoted CO$_2$ permeability and permselectivity as a result of reversible attractive interactions between CO$_2$ and these groups. Moreover, certain amines facilitated transport with CO$_2$, resulting in higher combinations of permeability and selectivity than can be obtained through solution-diffusion transport. To obtain gas separation membranes with CO$_2$ affinity, CNSBF-TBTrip-I and N$^i$PrSBF-TBTrip-I were prepared under optimized reaction conditions. CNSBF-TBTrip-I was obtained with high Mn and a BET surface area of 630 m$^2$/g. However, the polycondensation reaction of the amine-functionalized monomer afforded N$^i$Pr-SBF-TBTrip-I with considerably lower Mn and BET surface area. It is possible that the bulky tertiary amine groups inhibit the polycondensation reaction. These flexible side groups may also result in denser polymer chain packing and reduced free volume in films. In addition, two more analogues of 2,7-dibromo-9,9'-spirobifluorene A1 were also used to provide SBF-TBTrip-II and SFX-TBTrip. However, both were found to have a lower BET surface area than SBF-TBTrip-I. Finally, the reaction of an aldehyde-functionalized monomer also reacted efficiently under the standard reaction conditions to afford product CHOSBF-TBTrip-I. The aldehyde groups were targeted for access to other functional groups through post-polymerization modification.

Figure 9:
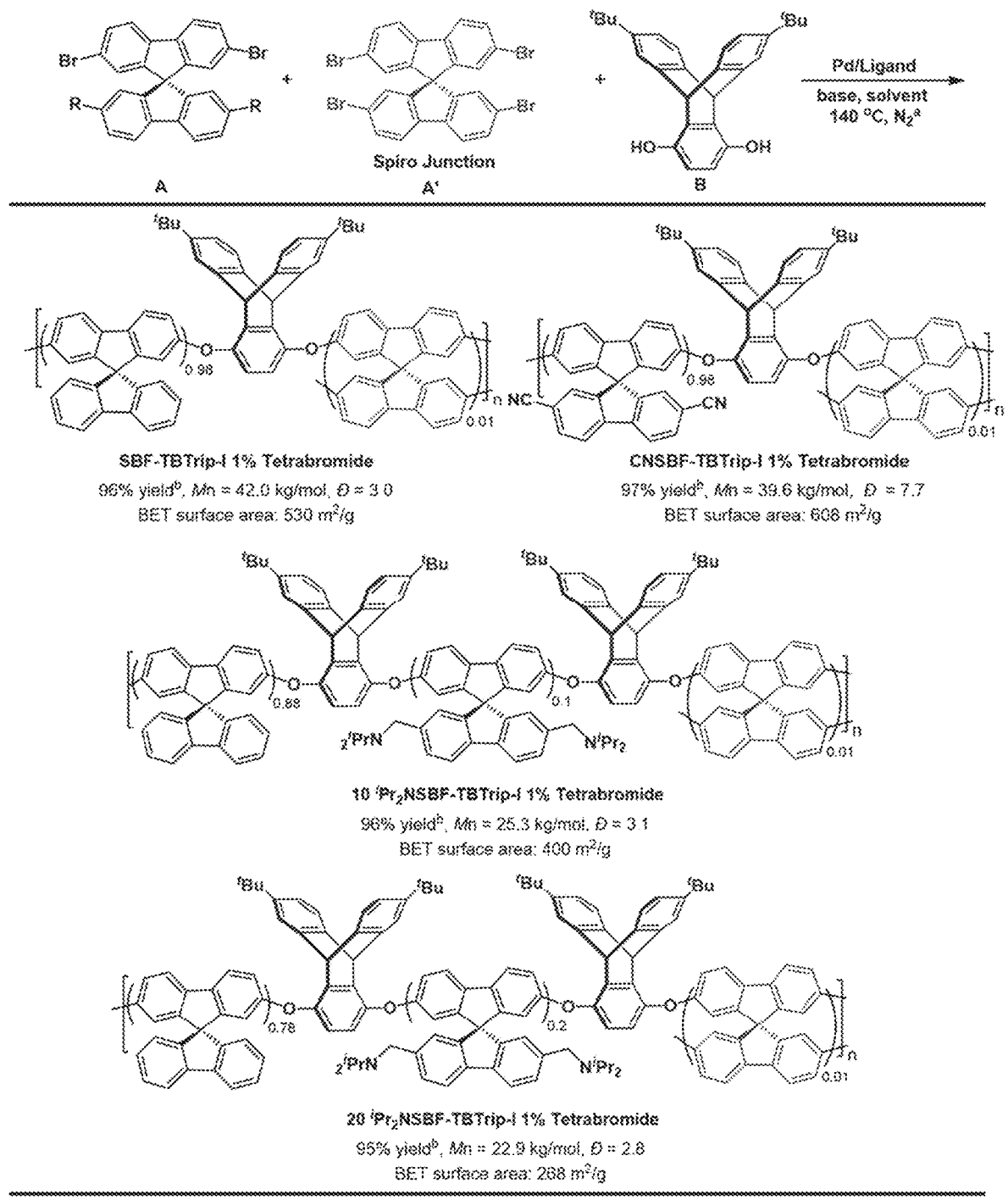
FIG. 9 shows, according to some embodiments, the synthesis of various SBF-TBTrip polymers comprising a second comonomer.

The introduction of the cross-linking (branching) groups represents another strategy to adjust the free volume and porosity of the polymers. Additionally, cross-linking (branching) can be used to restrict polymer chain mobility in the solid state, reducing unwanted effects such as plasticization and physical aging. To this end, 2,2',7,7'-tetrabromo-9,9'-spirobifluorene (A') was used as a cross-linking spiro junction comonomer in the polycondensation reaction (FIG. 9). The reaction conditions and parameters in FIG. 9 are as follows: a. A (0.5 mmol); B (0.5 mmol); [(cinnamyl)PdCl]$_2$ (1 mol %); $^t$BuBrettPhos (6 mol %); K$_3$PO$_4$ (3.0 equiv); Tol/DME (0.6/0.3 mL); 140° C.; 20-72 h; Mn=number-average molar mass; Đ=polydispersity index; Mn and Đ were measured by THF GPC; and b) Isolated yield.

Using 1 mol% A' as a comonomer, SBF-TBTrip-I 1% Tetrabromide and CNSBF-TBTrip-I 1% Tetrabromide were prepared. These copolymers had, as anticipated, a higher Mn and broader molecular weight distribution than the strictly linear polymers. Although the BET surface area of these two copolymers was slightly reduced, the chain branching can potentially restrict chain mobility and suppress the plasticization phenomenon and physical aging phenomena. These properties are important for use in gas separation membrane applications wherein long-term morphological stability is needed. Amine-functionalized copolymers are readily accessed using the Pd-catalyzed method. The incorporation of 10% and 20% amine monomers resulted in 10 $^i$Pr$_2$NSBF-TBTrip-I 1% Tetrabromide and 20 $^i$Pr$_2$NSBF-TBTrip-I 1% Tetrabromide, respectively. It was envisioned that the amine-functionalized polymers will have increased physical or chemical affinity for $CO_2$ and could thus be used for $CO_2$-selective gas separation membranes. Additionally, it was envisioned that amine and related functional groups could be used to improve compatibility of PAEs with other materials, such as polymers, inorganic nanoparticles, and metal-organic nanoparticles, through physical interactions or covalent crosslinking.

One skilled in the art will recognize that there are many commercial or readily available monomers that contain hydroxyl (OH) groups attached to aromatic rings (Ar—OH) that are competent monomers for this metal catalyzed synthesis of PAEs. Similarly, there are many commercial or readily available monomers that contain chlorine, bromine, or iodine atoms attached to aromatic rings (Ar—X where X=Cl, Br, or I). The aromatic rings can be as simple as a benzene but can also be extended polycyclic aromatic ring structures, three dimensional structures, structures interrupted by saturated structures. Monomers need to be difunctional so that they can be incorporated into a polymer. Alternating linear copolymers can be produced in the metal catalyzed coupling of a monomer containing two Ar—OH groups is paired with a monomer that contains two Ar—X groups. Depending upon the conditions or if one monomer is in excess relative to the others, the chain ends of the polymers can be Ar—X, Ar—OH, mixtures of Ar—X and Ar—OH groups, or Ar—M. The M in the Ar—M represents the metal that was used to catalytically produce the new C—O linkages of the Ar—O—Ar units. The nature of the M can vary with conditions and these species can be reactive and give rise to different end groups including hydroxyl groups Ar—OH, or hydrogen terminated polymers with Ar—H end groups. Alternatively, a linear homopolymer can be produced from a monomer that contains one Ar—OH group and one Ar—X group or alternatively an Ar—M group. In the latter example, polymers are produced that have one end containing a Ar—X group and the other an Ar—OH group. To illustrate this embodiment, a generic Ar group, which is a group that has a portion of its structure that is an aromatic ring, is connected with ether linkages to produce a PAE and such a polymer or oligomer will have the structure X—(Ar—O—)$_n$Ar—OH at the end of the polymerization, wherein n is an integer that is more than one. Polymers are mixtures of molecules with different lengths and n often indicates an average degree of polymerization of a segment or the entire polymeric material. The designation of a material as a polymer or an oligomer can be subjective and can depend on the context, the size of the monomers, and even the mechanical properties of the material. In general, for n values less than 10 materials are sometimes called oligomers. It is not unusual for oligomer and polymer to be used to describe the same material when n is relatively small. The upper value of n is determined by the efficiency of the polymerization and in many cases its value will be less than 100. In exceptional cases wherein the polymerization is extremely efficient it can be more than 100, but it will be very rare that n is larger than 1000. The distribution of the molecular weights will be determined by the statistics of the polymerization and the homogeneity of the reaction solution. If the polymerization proceeds by a step growth polymerization, then the polymerization will have a polydispersity index around 2. Higher values represent heterogeneity in the polymerization reaction solution, branching, or cros slinking, and lower values can indicate the removal of polymers of lower and/or higher molecular weights as part of the purification or a change in mechanism to be a chain growth polymerization.

In some embodiments it may be desirable to create shorter polymers or oligomers. In the cases of linear alternating polymers or oligomers an excess of one monomer will ensure that the ends have a predominance of one type of functional group. For example, if a polymerization is conducted such that there is more of a monomer containing two Ar—OH groups relative to the monomer containing two Ar—X groups, then some fraction of the resultant material will have a structure with Ar—OH groups in each chain end. The length of each chain will depend upon the amount of the excess of one monomer relative to the other. Increasing the excess of the monomer containing two Ar—OH groups relative to the monomer containing two Ar—X groups will result in a lower molecular weight. Similarly, polymers or oligomers can be made to have end groups that can be predominately Ar—X groups if a monomer having two Ar—X groups is used in excess relative to a monomer having two Ar—OH groups. The chain length will be controlled again by the amount of the excess of one monomer over the other and the farther these ratios are from a one to one ratio, the shorter the chain lengths.

Polymers or oligomers having a one type of chain end produced by adding an excess of one type of monomer can be useful to produce additional materials. For example, if a polymer or oligomer with the structure HO—(Ar—O)$_n$Ar—OH is produced it can be used as a macromonomer to make a PAE if paired with a monomer containing two Ar—Br groups. The HO—(Ar—O)$_n$Ar—OH macromonomer can also be used to produce a polyester to create polymers with a structure (O—(Ar—O)$_n$Ar—O$_2$C—R–CO$_2$Ar)$_x$. Similarly macromonomers X—(Ar—O)$_n$Ar—X can be polymerized with other monomers containing Ar—OH groups, including small molecules and other macromonomers. Ar—X groups can be used in other metal coupling schemes including those used to produce new carbon-carbon, carbon-nitrogen, carbon-sulfur, carbon-silicon, and carbon-phosphorous bonds. These reactions can add functionality to create new materials or can be used to incorporate the —(Ar—O)$_n$Ar— units into other polymers. In some embodiments, reactions through the endgroups can be used to create block polymer structures. In other embodiments, reactions through the endgroups can be used to create star polymers or hyperbranched polymers.

The HO—(Ar—O)$_n$Ar—OH and X—(Ar—O)$_n$Ar—X materials can be isolated and subjected to separate reactions or alternatively generated in situ. For example, if a polymerization or oligomerization is first conducted with an excess of one monomer, after the monomers are substantially consumed then a second reactive element can be added that adds to the ends of the chains. This second reactive element can produce an end functional group or be an additional complementary monomer that extends chain length. The composition can be changed incrementally in this way or be changed continuously throughout the polymerization/oligomerization.

Figure 10:
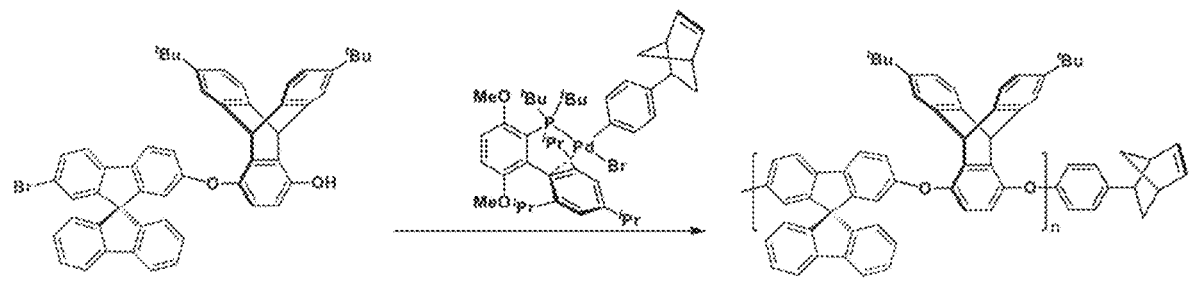
FIG. 10 shows, according to some embodiments, the synthesis of a poly(aryl ether) comprising an endcapping agent.

The case of monomers that contain both an Ar—OH and Ar—X group can allow for a single point of attachment. This can be achieved by adding a specific endcapping agent to a polymerization that adds to either the Ar—X or Ar—OH chain end. These modified ends can create functionality that can be used to provide function. Additionally, these materials can be graphed on to existing polymers to create what are known as graft brush polymers. An alternative method is to initiate a polymerization with a functional group. In this case, the catalytic metal that initiates the polymerization must be prefunctionalized. An example of this is shown in FIG. 10, wherein a palladium group is used to polymerize a monomer containing both an Ar—OH and Ar—Br group. The resulting polymer has an end group containing a functional norbornene group.

Figure 11:
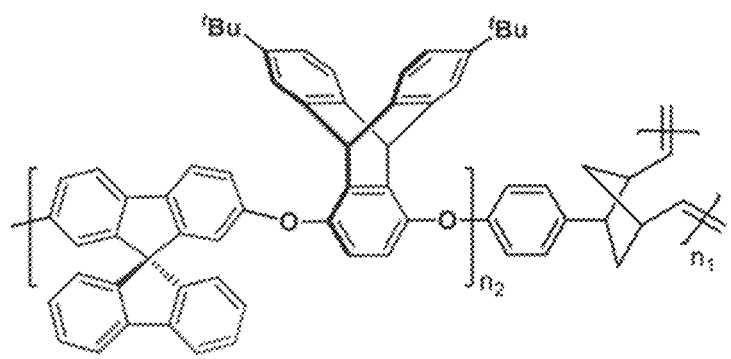
FIG. 11 shows, according to some embodiments, an example of a ring opening metathesis polymerization (ROMP) brush polymer.

A norbornene end group can be used in a variety of reactions including Diels Alder reactions. However, the product shown in FIG. 10 can be transformed into a brush polymer by a process known as ring opening metathesis polymerization (ROMP), as shown in FIG. 11. The ROMP process is attractive as it is a living polymerization and allows for other complex block polymer architectures to be produced. Additionally, other copolymers can be produced by the ROMP method.

There are many functional monomers that can be incorporated in the metal catalyzed polymerizations to produce PAEs. In some embodiments, monomers capable of binding to transition metals can be incorporated. One approach to these materials is to incorporate monomers that have nitrogen heterocycles that are known to bind to transition metals. Molecular constructions that bind to metals are often referred to as ligands. Nitrogen heterocycles that are well-known ligands include materials that contain pyridine, bipyridyl, thiazole, triazine, triazole, oxazole, 1,3,4-oxadiazole, quinoline, indole, or parazine structures. The nitrogen atoms in these ligands typically have a hybridization that will be known to one skilled in the art to have what is known as $sp^2$ hybridization. Other nitrogen atoms can also be added that have $sp^{+3}$ hybridization, that are also capable of binding metal ions. Other ligands can be based on phosphorous in either a +3 or +5 oxidation state. In the +3 oxidation state the phosphorous atom is generally in direct contact with the metal center with binding and the most common +5 phosphorous compounds have a P=O group and in this case, it is the oxygen atom that is in direct contact with a metal center with binding. Other neutral ligands can be based on sulfur or oxygen groups and in Ar—O—Ar groups can interact with metal ions by an interaction of the lone electron pairs on the oxygen with the metal center. Other ways to bind to metals use ionic ligands. Metal ions tend to be cationic and anions such as thiolates, sulfonates, and carboxylates, and can behave as ligands and bind to metal ions. Cationic groups can also be used to bind metals but in this case the metal complexes are typically anionic as a result of other ionic ligands, such as chlorides or cyanides, being bound around the metal center. In this case, an interaction of binding of a metal complex can be considered as an ionic association. Cationic metal centers can also undergo ionic interactions wherein the complementary anion does not directly interact with the metal center.

Ligands and ionic groups can be used to bind different functionality into PAEs. Examples include ionic transition metal complexes that have a single metal center, polynuclear metal complexes that have more than one metal center, as well as other reactive metal oxide clusters. There are many properties that can be induced in PAEs by these methods.

Metal ions such as $Eu^{+3}$ can be incorporated into PAEs that produce luminescent properties. Other non-limiting examples phosphorescent metal complexes can also be incorporated based on metals including platinum, palladium, iridium, terbium. Emissive compounds can be used for labeling of materials and can also be useful in sensing technologies. PAEs with intrinsic free volume can be useful in allowing gas or liquid molecules to diffuse into the polymer matrix and interact with the metal centers.

PAE materials can also behave as catalyst supports. The catalytic elements can be isolated mononuclear metal complexes, metal nanoparticles, or multinuclear metal complexes, or other catalytic metal containing complexes. Possible catalytic processes include, but are not limited to, electrocatalysis, photocatalysis, thermal catalysis, hydrogenation, oxidation, coupling, dehydration, hydration, acid catalysis, and base catalysis.

Porous PAE materials can be used to restrict the size of metal nanoparticles and prevent ripening, which is a process wherein one nanoparticle grows in size over time by transfer of material from another particle. The rigid nature of the PAE serves to create a physical space that restricts the size of the particles. The physical structure of the PAE also prevents nanoparticles from interacting and fusing together. The ability to prevent this process of ripening is important to maintain high activity of the nanoparticles under a variety of conditions (e.g., heat, solvent exposure, etc.) that will be realized in certain applications. The nanoparticles can be purely metallic elements, mixtures of metallic elements, mixtures of metals and oxides, or mixtures of organic molecules and metals. The nanoparticles may have any of a variety of suitable sizes (e.g., less than or equal to 10 nm, less than or equal to 5 nm).

The PAE supported catalysis can be used to give a signal as a result of an interaction with a gas of choice and behave as a chemical sensor. Other applications include the use as a protective coating that deactivates harmful chemicals. PAE supported catalysts can also be used in continuous processes in flow reactions of as reusable catalysts that can be added to reactions and isolated for reuse afterward. In some embodiments the PAE catalyst compositions could be employed as a coating that allows for other vapors of gases to diffuse into or through it. In some embodiments the PAE catalyst system can be in particles that are organized such that solutions or gases flow through them, or the particles can also be dispersed in a solution. Non-limiting applications include protection technologies that can be used in filters or even clothing that protects people or animals from harmful chemicals. These chemicals can include chemical warfare agents, toxic organic chemicals, oxides of nitrogen, carbon monoxide, dihydrogen sulfide, or ammonia. The PAE catalyst compositions in other embodiments can be used in chemical production to effect transformations in either continuous or batch processes. It is possible that the PAE can present a chiral environment around the catalytic material and affect and entioselective transformation. In yet other applications the PAE catalyst compositions can be used in conjunction with light to give a photocatalytic system. One embodiment of a photocatalytic system is the use of photo-oxidation processes to cause the oxidation of organic compounds. Such methods could be used in coatings that effectively degrade absorbed organic materials as a self-cleaning process or can be dispersed to for environmental chemical or oil spill remediation. A non-limiting catalytic system to produce a photo-oxidation system would be to have a PAE with $TiO_2$ nanoparticles.

Figure 12:
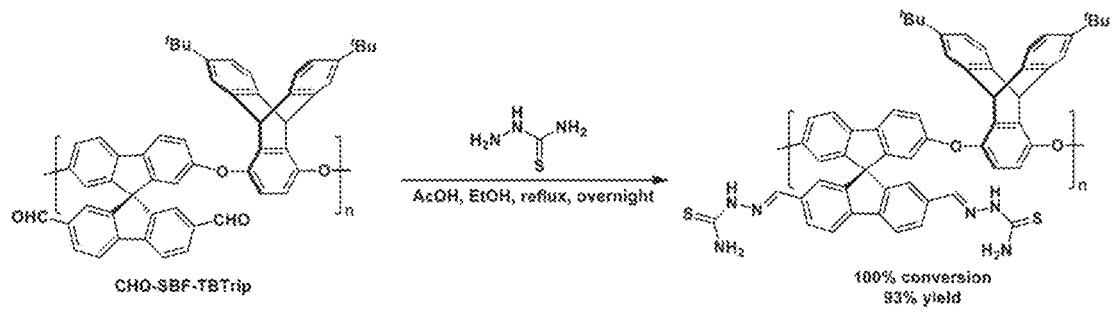
FIG. 12 shows, according to some embodiments, an example of the synthesis of a poly(aryl ether) for the binding of metals.

PAE systems containing ionic species or ligand elements can also be used to absorb metals or main group elements or other toxic elements from the environment. Such materials can be used to absorb toxic elements or their complexes and non-limiting examples of the toxic elements are $Cd^{+2}$, $Pb^{+2}$, $Hg^+$, $Hg^{+2}$, $As^{+3}$, or $As^{+5}$. In some embodiments the PAE can include elements that report on the presence of the toxic species as part of the absorption process. An example of a PAE material for the binding of $Hg^{+2}$ is shown in FIG. 12. The sensing polymer makes use of post polymerization of the aldehyde containing porous polymer. This system produces a change in in its emission signal and is capable detecting mercury ion at concentrations below 7 parts per trillion in water with response times of seconds.

Figure 13:
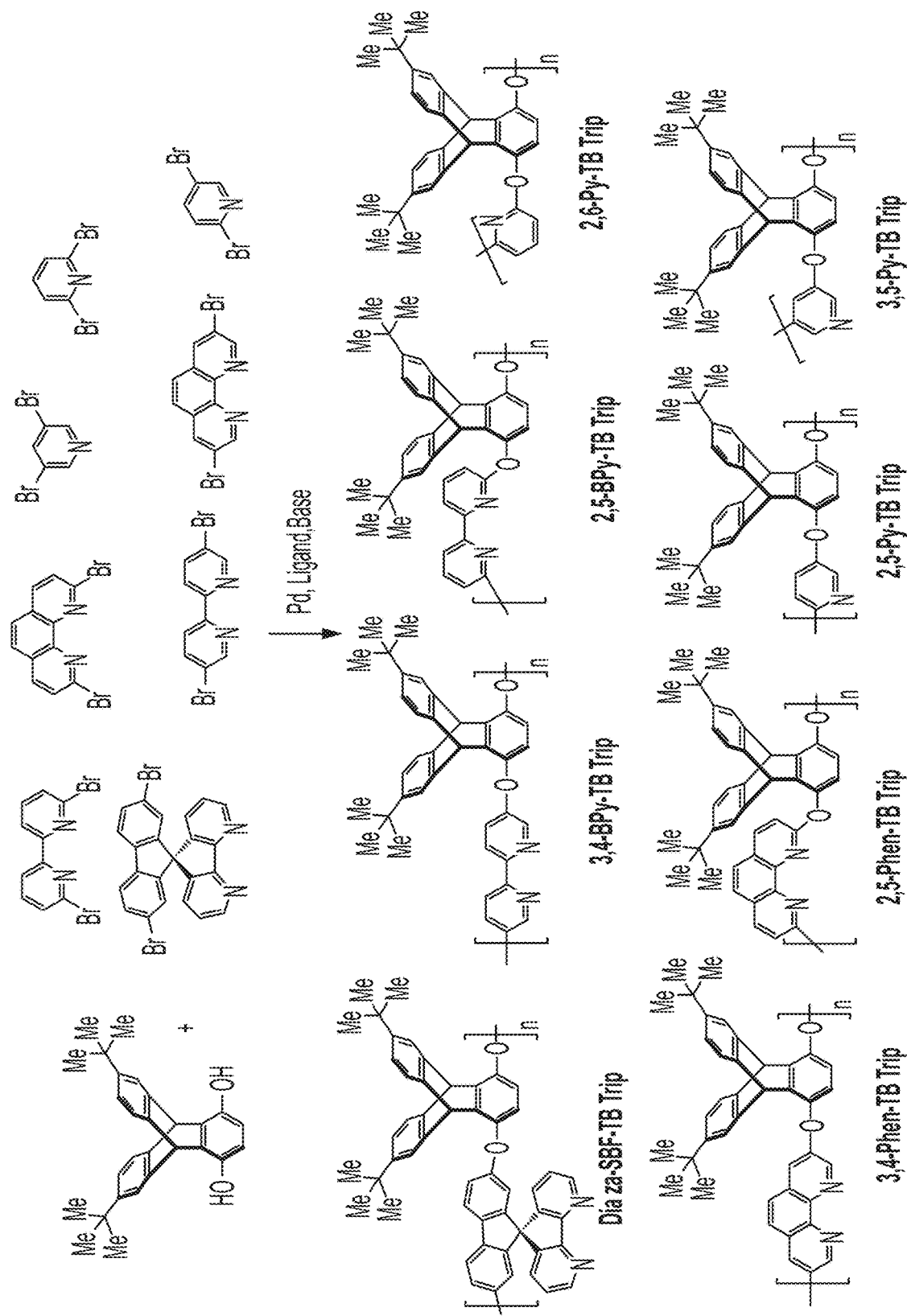
FIG. 13 shows, according to some embodiments, various examples monomers that can be incorporated into a poly(aryl ether) that are capable of binding metals.
Figure 14:
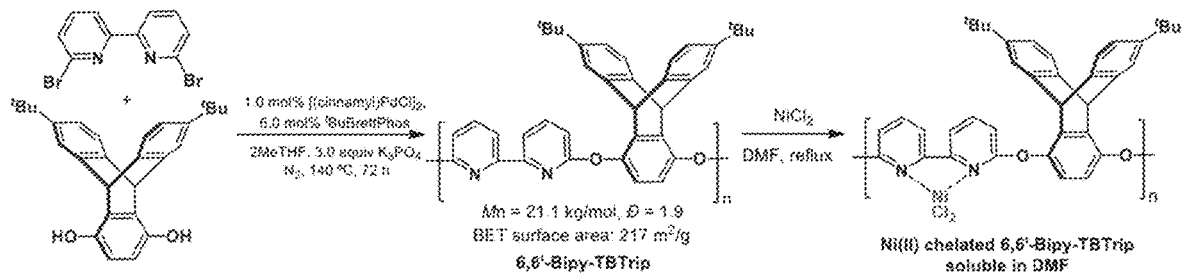
FIG. 14 shows, according to some embodiments, an example of the synthesis of a poly(aryl ether) bound to a metal.
Figure 15:
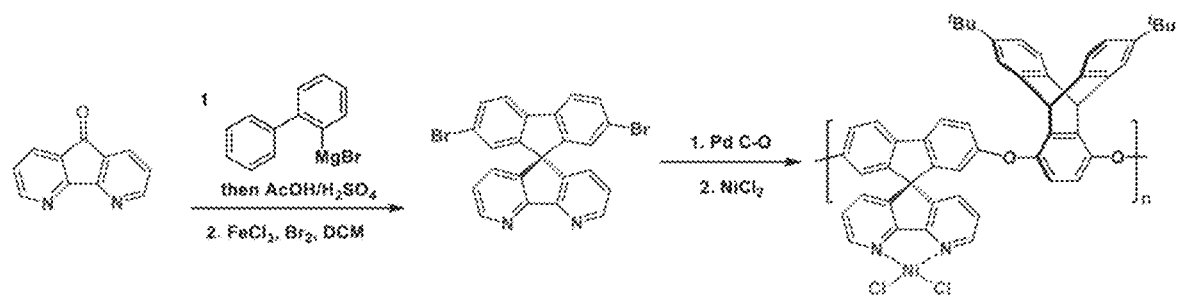
FIG. 15 shows, according to some embodiments, an example of the synthesis of a free volume promoting poly(aryl ether) bound to a metal.

There are many possible ligand monomers that can be incorporated into PAEs. Non-limiting examples are shown in FIG. 13. In this case the ligand monomers are paired with a monomer having a 3D structure that promotes free volume and a structure with intrinsic porosity. In the example shown the ligand monomers contain two Ar—X groups and the porosity generating monomer contains two Ar—OH groups to produce a linear polymer. In some embodiments the alternating polymer structures shown in FIG. 13 are the desired products, and in other embodiments the ligand monomers could be used as comonomers in linear of branched polymers. One skilled in the art will understand that FIG. 13 only represents a subset of the different types of metal binding monomers that can be added to the PAE structures by the methods disclosed here. One skilled in the art will recognize that PAE that lack clearly defined metal binding sites can be functionalized with metal ions. It is also possible that metals can bind to the aromatic rings, ethers, nitriles, thioethers, phosphines, phosphates, amines, alcohols, or other groups within the polymer structure. The ligand monomers are compatible with the polymerization conditions and the porosity generating monomer is effective in producing free volume as demonstrated in FIG. 14. In this non-limiting embodiment, the metal functionalized polymer remains soluble in a common organic solvent. In other embodiments the metal functionalization could cause the PAE to produce particles and become insoluble. Metal functionalization can be used in some embodiments to produce structure within polymer particles and films by a combination of enforcing specific geometries of the polymer backbone and also by causing metal bridges, which act as crosslinks between polymer chains. It is also possible that PAE compositions having metals or other species including electrostatic complexes can produce what is known as a gel state, wherein the polymer chains are solvated by a solvent, but a network structure forms that produces a macroscopic or nanoscopic soft film or particle. Gel materials can provide for greater interaction with liquid surroundings and can produce a material that will readily deform with stress. In other non-limiting embodiments, PAE compositions can be doped with acids, such as phosphoric acid, sulfonic acids, or derivatives thereof, to produce proton conducting membranes with high thermal and mechanical stability. One skilled in the art will understand that phosphoric acid is only one possible dopant to increase proton conductivity It is possible to create ligand monomers that have a 3D structure and also produce free volume in PAE films or particles. A non-limiting example of a composition that can be produced as described herein is shown in FIG. 15. One skilled in the art will understand that there are many other ways to create free volume promoting metal binding monomers that can be included into PAE structures. One skilled in the art will also recognize that many different metal complexes can be produced and that the geometrical preference and the other ligands associated with the metal centers can impart useful structures and properties to the PAE solids and particles.

Metal complexes in PAEs can exhibit reversible interactions with other molecules. In some embodiments these interactions can be used to produce superior separations. A non-limiting example of an application is in the area of gas separations. In some embodiments, one type of gas molecule may interact more strongly than another with the metal centers in the PAEs. This interaction can produce in some embodiments a greater selectivity for the separation of gases. Non-limiting examples of interactions of gases that can interact with metal centers include $H_2S$, ethylene, propylene, butylene, acetylene, dioxygen, carbon monoxide, nitrogen dioxide, and methane. One skilled in the art will understand that the combination of the ligand in the polymer, the metal center and other ligands and ions can be combined to create the strongest interactions. Non-limiting examples of metal centers that can be used in this process include $Au^{+1}$, $Ag^{+1}$, $Ag^{+2}$, $Hg^{+1}$, $Hg^{+2}$, $Ni^{+2}$, $Ni^{+3}$, $Pt^{+2}$, $Pd^{+2}$, $Co^{+2}$, $Co^{+3}$, $Ir^{+1}$, $Ir^{+3}$, $Bi^{+3}$, $Pb^{+2}$, $Cu^{+1}$, $Au^{+1}$, $Cd^{2+}$, $Tl^{+3}$, $Sn^{2+}$ and $Zn^{+2}$. These metals can be combined with PAEs as salts (metal salts) wherein the metal cation is associated with an anionic species. Non-limiting examples of anions include halides, phosphates, sulfates, nitrates, borates. In the case that the PAE contains anionic functionality, metals can be included by an ion exchange method. One skilled in the art will recognize that anionic functional groups can be conjugate bases of Brønsted acids. Cationic PAEs can also be used in anion exchange reactions with anionic metal complexes. Non-limiting examples of such complexes include $CuCl_4^{-2}$ and $Fe(CN)_6^{3-}$. It is also possible that the metal salts can be converted into metal clusters can be nucleated within PAEs and that small clusters or nanoparticles can be used to bind and activate gas molecules.

In some embodiments other functional groups can be included in PAEs including Ar—$CF_3$ groups and Ar—CN groups. The Ar—CN groups can be used to access a variety of different amine containing groups that can also be used to impart other properties to the PAEs. For example, if reduced to Ar—$CH_2NH_2$ groups that bind to $CO_2$, these materials can be used to sequester, activate, or assist in separations of $CO_2$. Substituted amines can be directly polymerized and provide for selective interactions.

Figure 16:
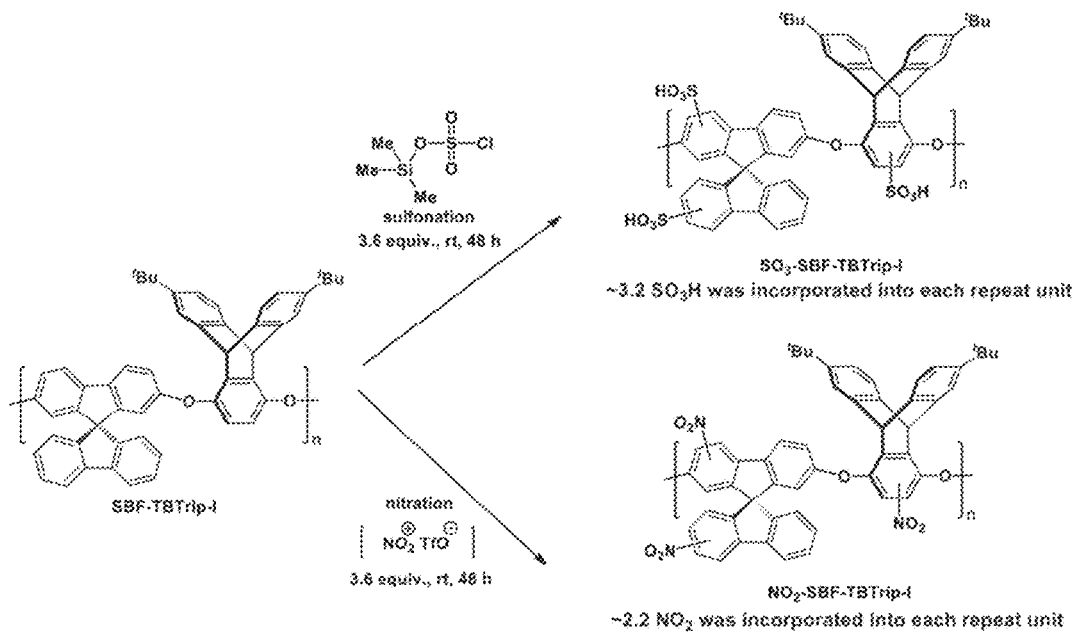
FIG. 16 shows, according to some embodiments, an example of the synthesis of functionalized poly(aryl ether)s.

In some embodiments PAEs can also be functionalized post polymerization to add different groups. This includes halogenation, sulfonation, nitration, and chloromethylation. The PAE backbone is very robust and can withstand aggressive chemical reactions. Non-limiting examples of aggressive reactions are shown in FIG. 16 wherein a porous PAE material is sulfonated or nitrated. These chemistries can be used to create materials that function as anion or cation exchange membranes for applications in fuel cells, separators in batteries, metal extraction, catalysis, water purification, or gas separations. One skilled in the art will realize that there are a number of other reactions that can be applied to PAEs post polymerization. Additionally, one skilled in the art will recognize that the polymers in FIG. 16 can have more or less functional groups than are shown and that the average number of functional groups and their locations on the polymer structure will depend on the conditions used to functionalize the PAEs. Non-limiting examples include halogenation, alkylation, and acylation in electrophilic processes. In some embodiments, perfluoroalkanes —$(CF_2)_xF$, wherein x is an integer one or more but less than 100, can be added to the PAEs. In some embodiments x is 1, in some embodiments x is 6, and in some embodiments x is 8. Functionalized PAEs can serve as intermediates to produce other materials, and in some embodiments can be further transformed into other materials by additional reactions on functional materials.

One skilled in the art will recognize that reaction chemistries can be applied to PAEs that can create different charged structures. The structures can have negative charges (a polyanion), positive charges (a polycation), or both anion and cation charges (a polyzwitterion). Polymers with many charges are referred to as polyelectrolytes. In some embodiments PAEs will be converted into polyelectrolytes that are soluble in water and can be used to assemble with other polymers and/or naturally occurring macromolecules. PAE polyelectrolytes can be used to form coacervates, which are phases that form when two complementary charged macromolecules are brought in contact such that they assemble into two separate phases. The PAE coacervates can form with both the polyelectrolytes having a PAE component or only one of the macromolecules having a structure of natural or biological origin. The particle can be highly swollen in solvent. PAE polyelectrolytes can be used to support enzymes. Zwitterionic PAEs can be have a number of uses, including creating structures that are resistant to biofouling in medical devices or water purification membranes.

Figure 17A:
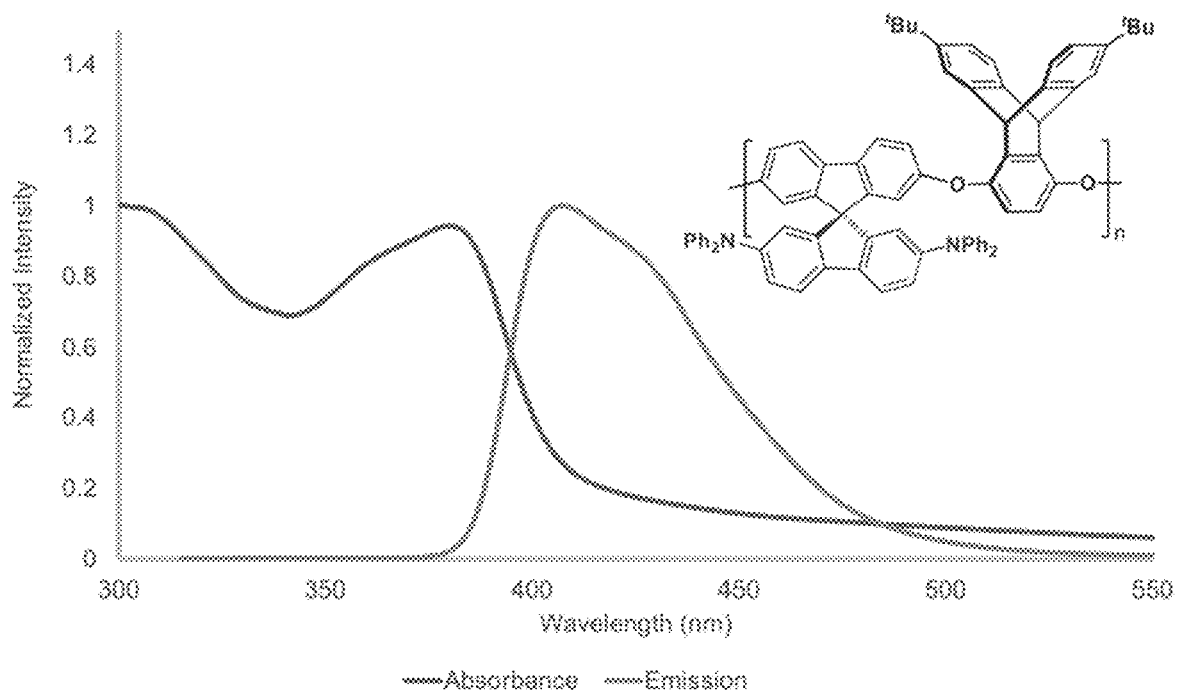
FIGS. 17A-17B show, according to some embodiments, the absorption and emission of poly(aryl ether)s.
Figure 17B:
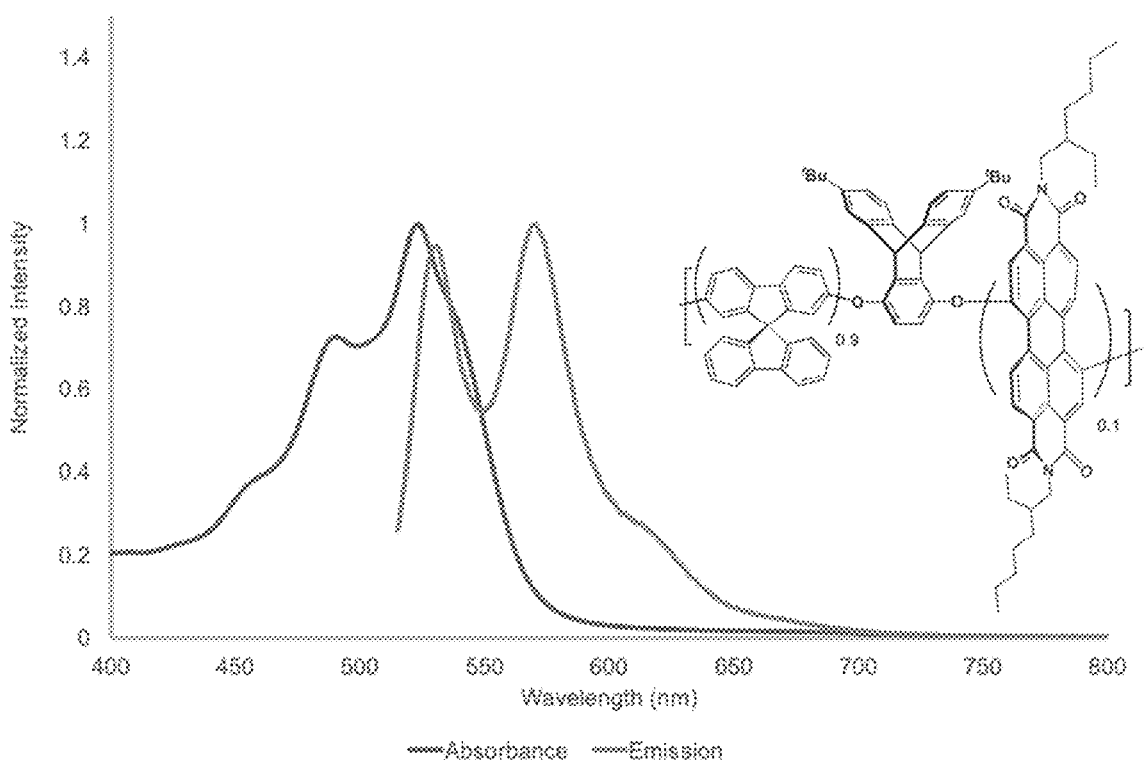
Figure 18:
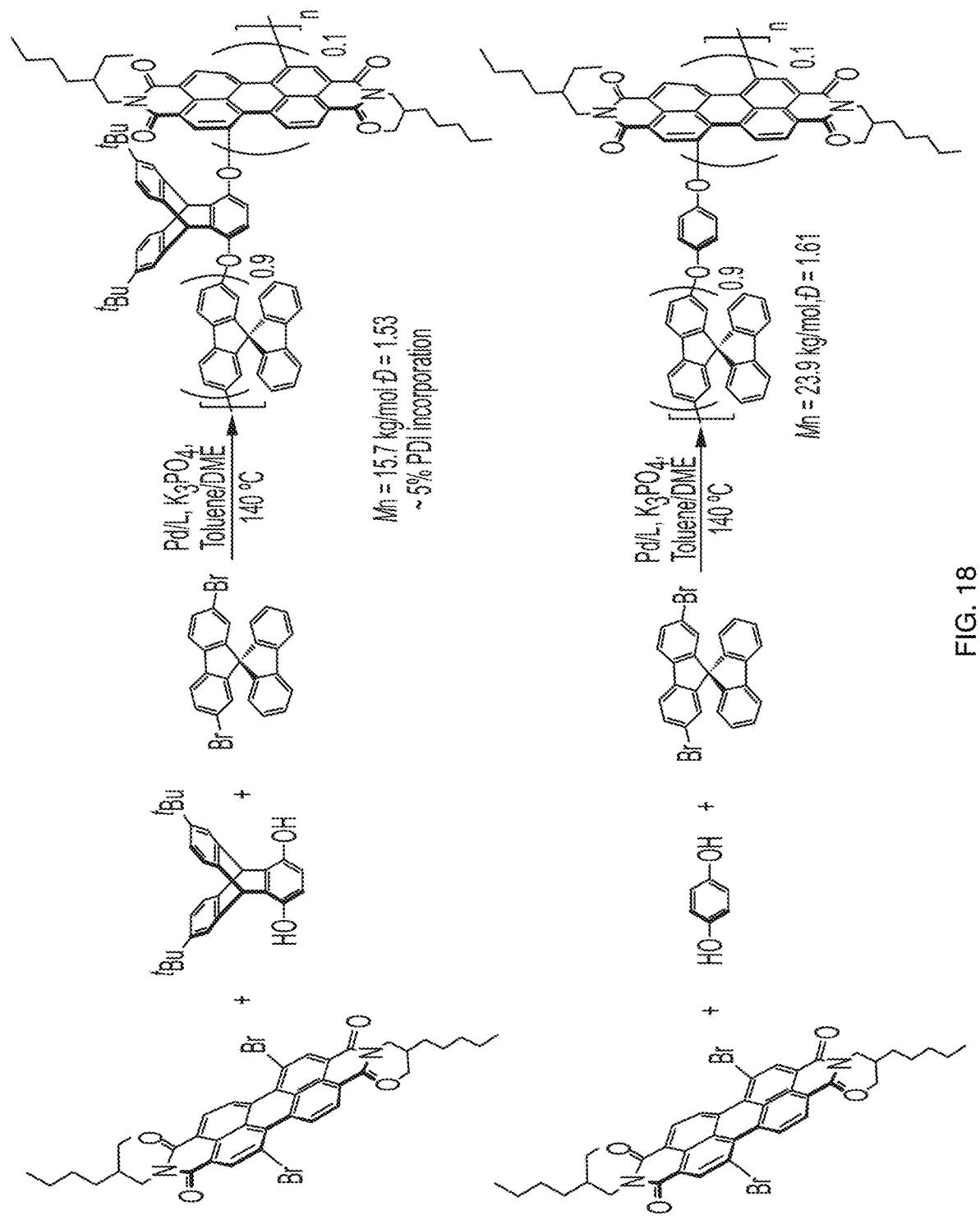
FIG. 18 shows, according to some embodiments, the synthesis of poly(aryl ether)s comprising a chromophore.

PAE polymers that have emissive elements can also be produced by this method. These materials can be used in some embodiments to create chemical sensors or to label objects. When placed in porous PAE structures, ions, gases, liquids, or solutes can diffuse into a film, gel, or particle of an emissive PAE to produce a change in the emission intensity, wavelength, or lifetime and thereby produce a senor. Non-limiting examples of such PAEs are shown in FIGS. 17A-17B. These materials are derived from 3D monomers are copolymerized with a chromophoric monomers to produce highly emissive polymers. Depending upon the structures and forms of the materials it is possible that multiple emissive states are produced. For example, in some embodiments, it is possible to get emission from end groups or polymer segments that are in a particular conformation, or polymer segments that have an aggregated structure. Non-limiting examples of the synthesis of chromophoric polymers are shown in FIG. 18. One skilled in the art, will understand that there are many monomers that can produce chromophoric elements in PAEs and that these materials can be responsive to chemical or physical stimuli to produce changes in their emission characteristics or absorption (color).

Figure 19:
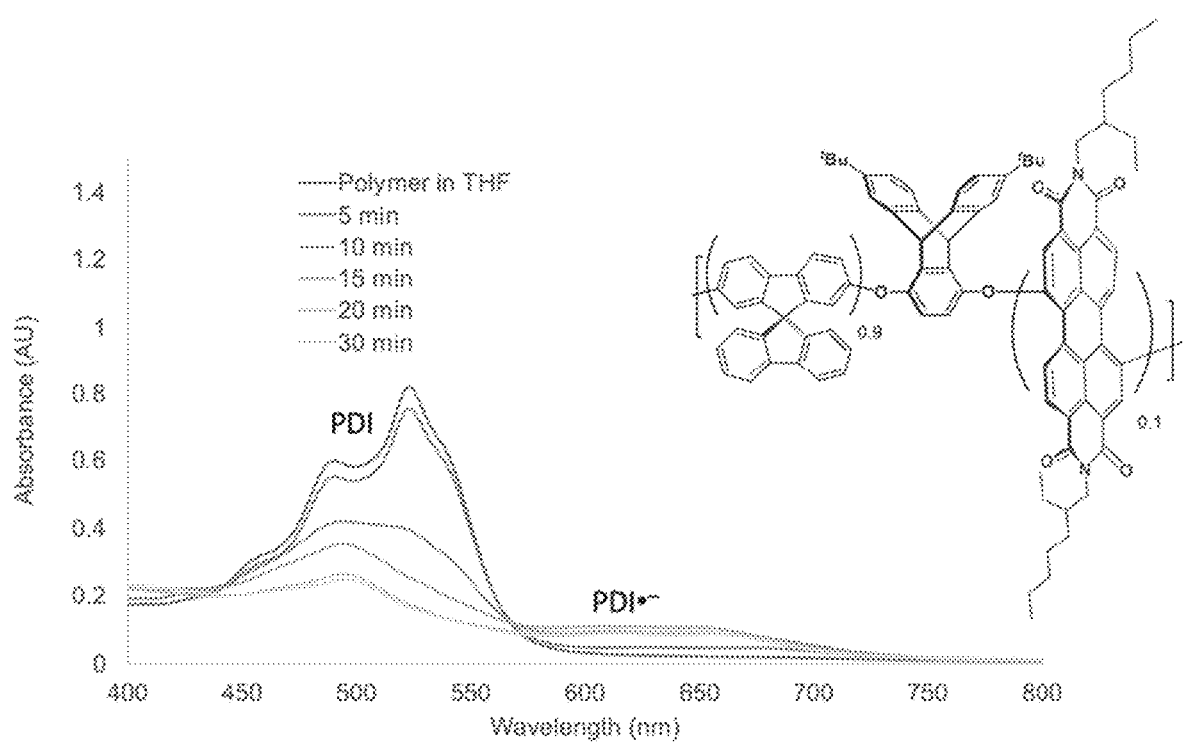
FIG. 19 shows, according to some embodiments, an absorption spectrum of a poly(aryl ether) comprising a chromophore.

FIG. 19 shows an example of the use of an emissive PAE polymer for chemical sensing. This non-limiting example shows a response to the presence of amines with the suggested mechanism of an electron transfer mechanism. The PAE was irradiated at 450 nm in the presence of excess $Et_3N$. A new absorption for the radical anion was observed and the polymers emission intensity decreased. The original polymer spectrum was recovered after exposure to $O_2$ indicating that the polymer was not degraded and that the process is reversible.

Figure 20A:
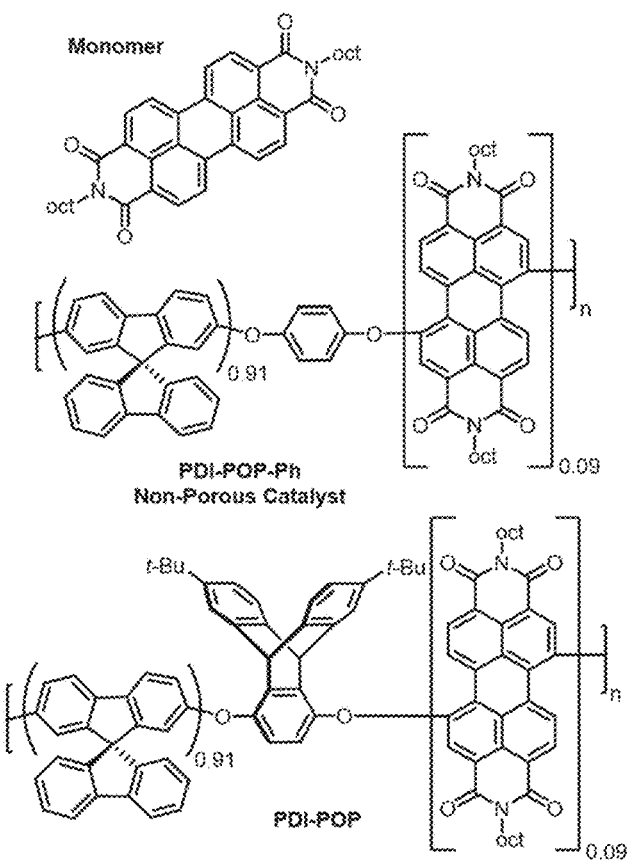
FIG. 20A shows, according to some embodiments, the structures of a monomer, a non-porous poly(aryl ether), and a porous poly(aryl ether) photoredox catalyst.
Figure 20B:
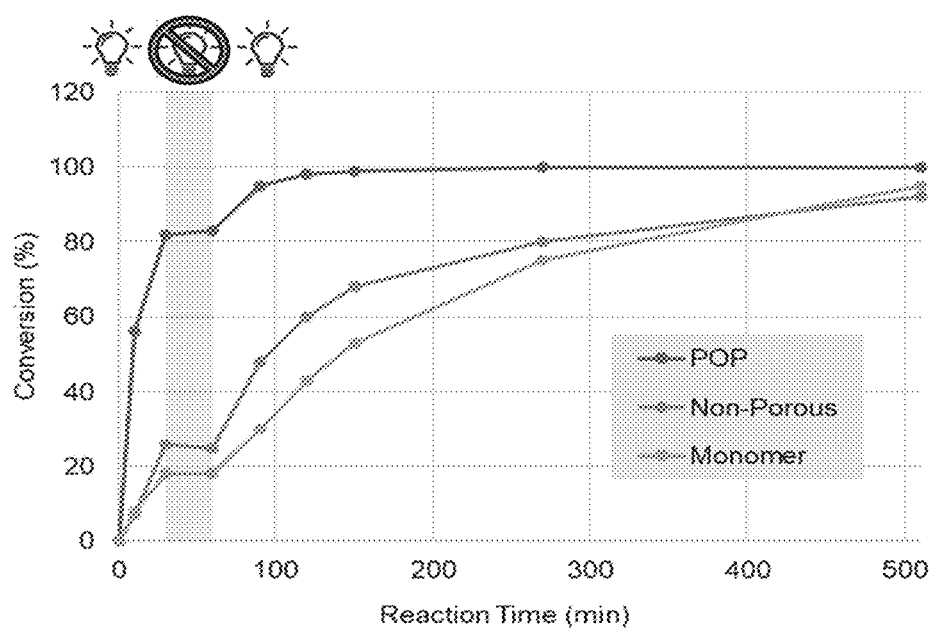
FIG. 20B shows, according to some embodiments, a comparison of oxidation kinetics using the porous poly(aryl ether) photoredox catalyst, as compared to the non-porous poly(aryl ether) and a monomer.
Figure 21:
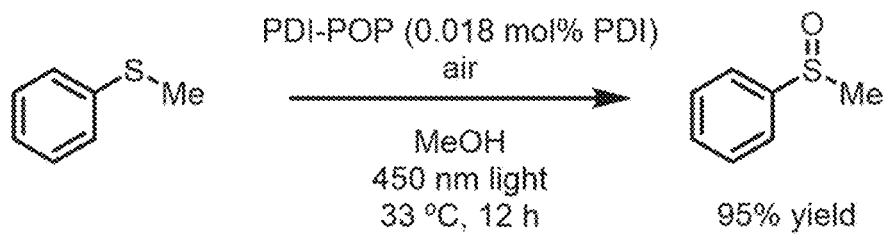
FIG. 21 shows, according to some embodiments, the photocatalytic oxidation of a sulfide to a sulfoxide using a poly(aryl ether) photoredox catalyst.

Porous PAE materials containing chromophores capable of excited state redox events can produce what is known as photo-redox catalysis. In these processes light absorbed by the chromophore creates a species that is highly reducing, highly oxidizing, or both. The material shown in FIG. 19, when excited, can display photo-oxidation, photo-reduction, and other activity, as shown in FIGS. 20A-20B, depending upon the conditions. The dark grey zone in FIG. 20B indicates 30 min during which the irradiation was paused, showing that the reaction does not proceed in the absence of light. It is important to note that the ability of this polymer to perform in these reactions is related to its porosity. Replacing of the triptycene monomer from the polymer structure with a simple phenyl linkage as in the structure shown here results in a lack of catalytic activity. The material in FIG. 20A (PDI-POP) as a dispersion or film can undergo a variety of light-dependent organic processes depending upon the conditions. For instance, photosensitization of oxygen for the aerobic oxidation of sulfides to sulfoxides can be carried out (see FIG. 21). Replacement of the triptycene unit from the polymer structure with a simple benzene linkage (PDI-POP-Ph) results in a significant decrease in catalytic activity as shown by kinetics experiments.

Figure 22:
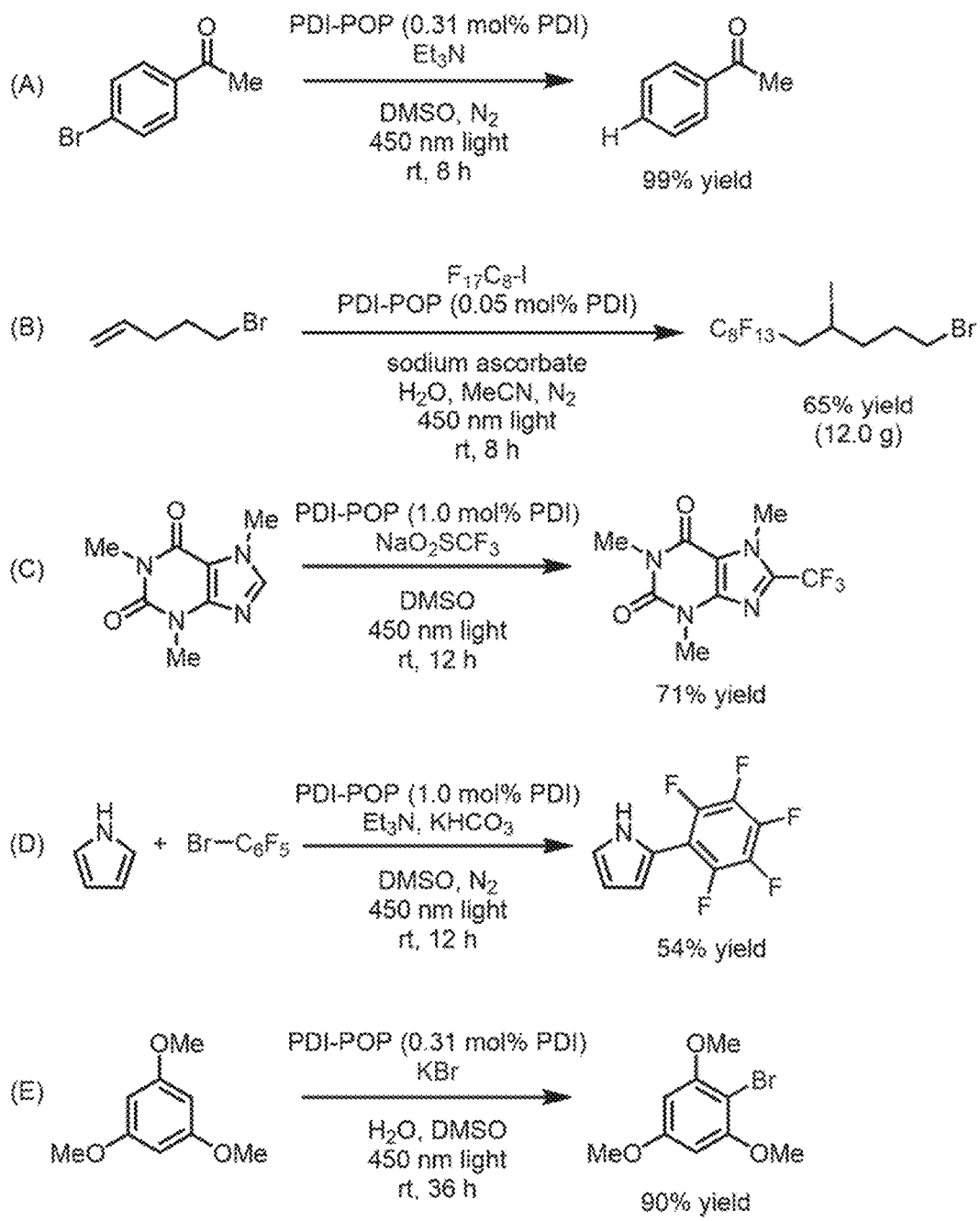
FIG. 22 shows, according to some embodiments, additional examples of photoredox catalysis using a poly(aryl ether) photoredox catalyst.

Additional examples of different modes of reactivity are displayed in FIG. 22. In the presence of triethylamine and anaerobic conditions, strongly reducing species are formed and aryl bromides can be removed photocatalytically (FIG. 22, eq. A). The addition of perfluoroalkyl radicals to olefins through photoinduced halogen-atom transfer can also be performed, and this reaction has been demonstrated on decagram scale (FIG. 22, eq. B). Using sodium trifluoromethanesulfinate (Langlois reagent), the oxidative photogeneration of radicals was successfully applied to the trifluoromethylation of caffeine (FIG. 22, eq. C). Further, perfluoroaryl radicals could be generated by reductive means as shown in the direct C—H arylation of pyrrole (FIG. 22, eq. D). Finally, reactions which involve oxidative generation of a reactive intermediate from an organic substrate can be performed using the same catalyst: the C—H halogenation of 1,3,5-trimethoxybenzene with KBr was conducted under aerobic conditions (FIG. 22, eq. E). In all of these reactions, the catalyst could be isolated by filtration of the crude mixture through Celite (diatomaceous earth), followed by washing of the Celite pad with tetrahydrofuran or dichloromethane to redissolve the polymer.

Figure 23:
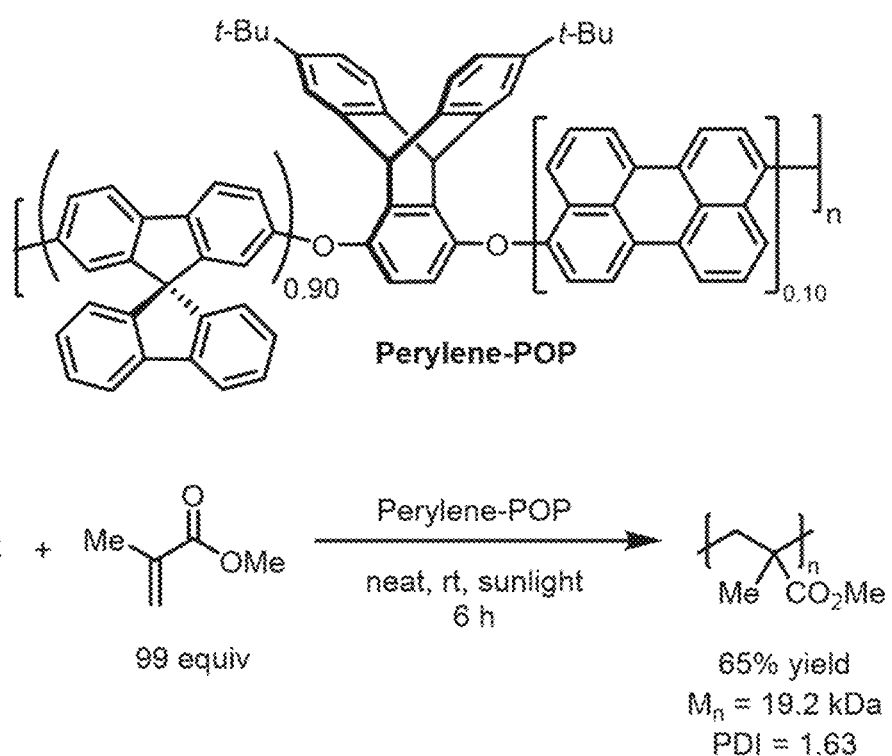
FIG. 23 shows, according to some embodiments, the structure of a perylene-containing porous poly(aryl ether) and its use in photo-catalyzed atom-transfer radical polymerization.
Figure 24A:
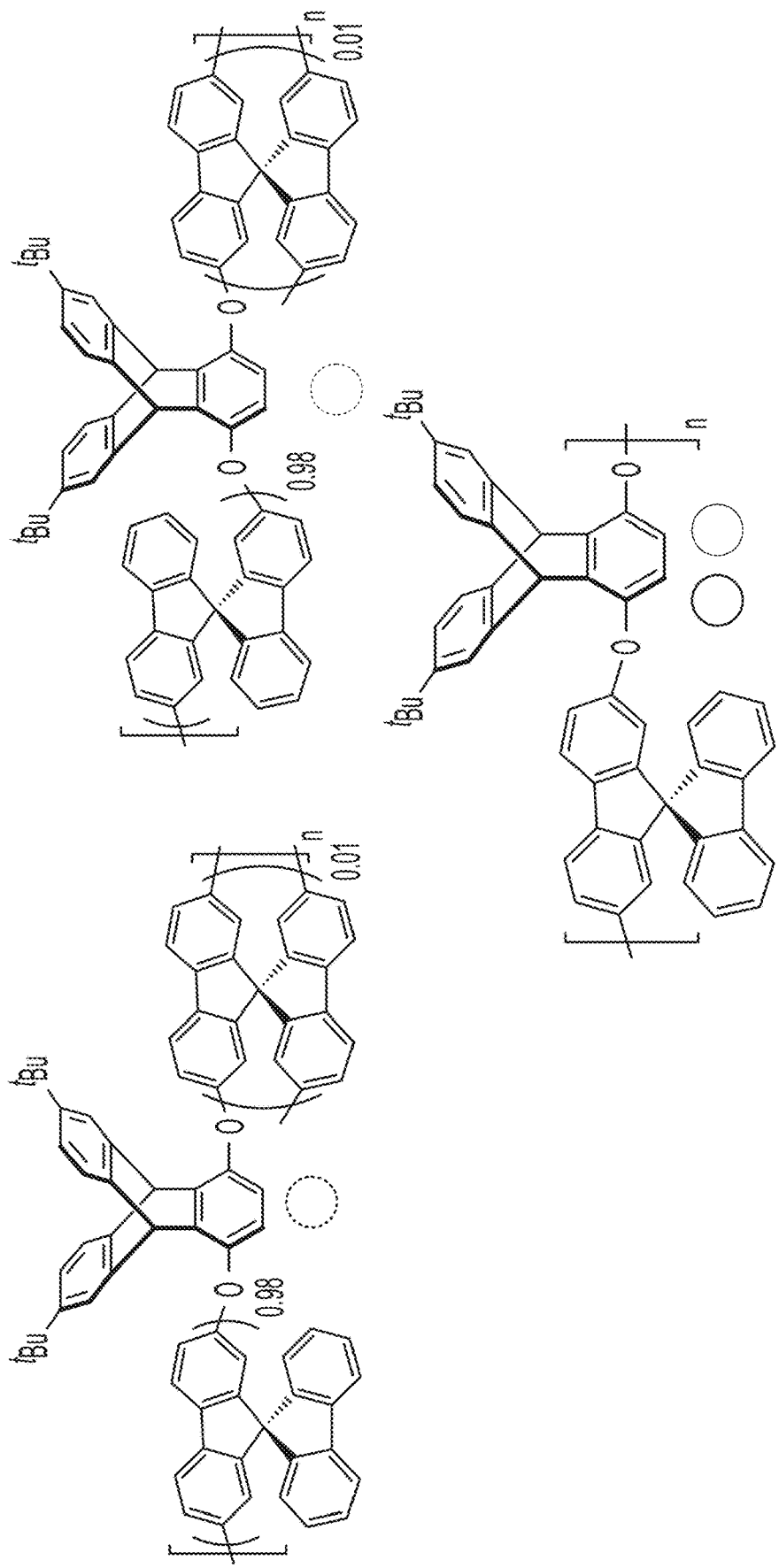
FIGS. 24A-24F show, according to some embodiments, the structures of various poly(aryl ether)s that produce porous membranes for gas separation and their performance compared to conventional membrane materials.
Figure 24B:
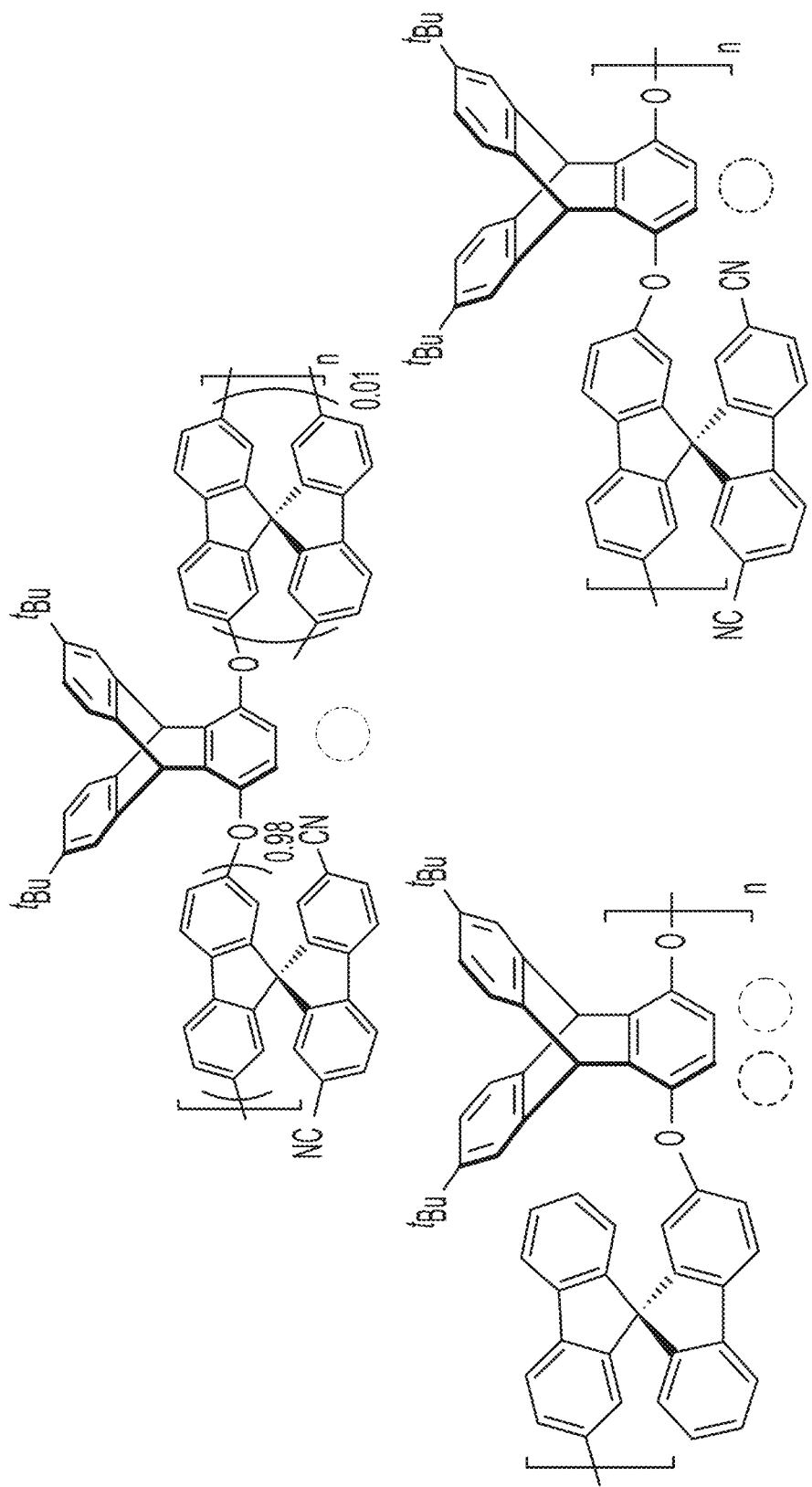
Figure 24C:
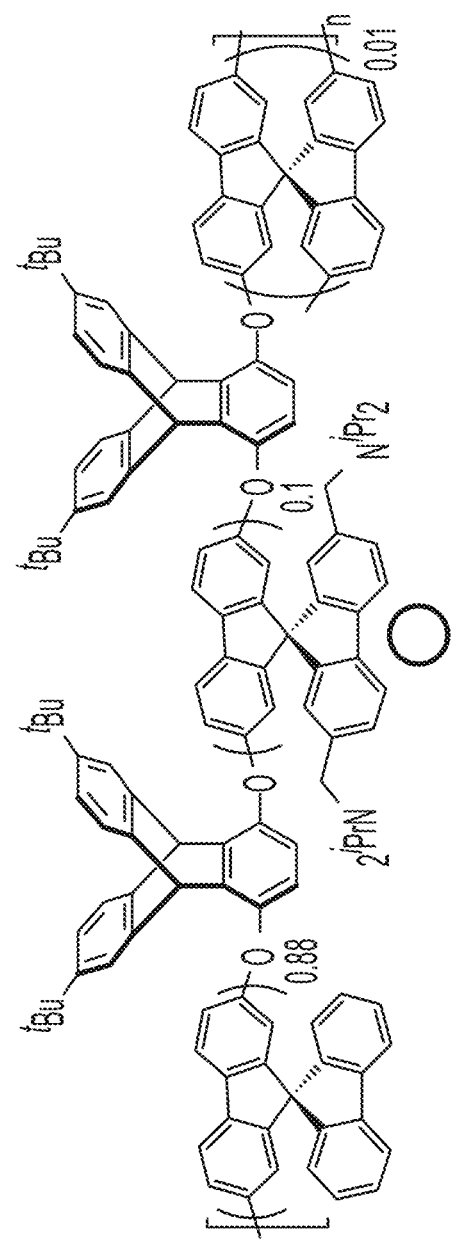
Figure 24D:
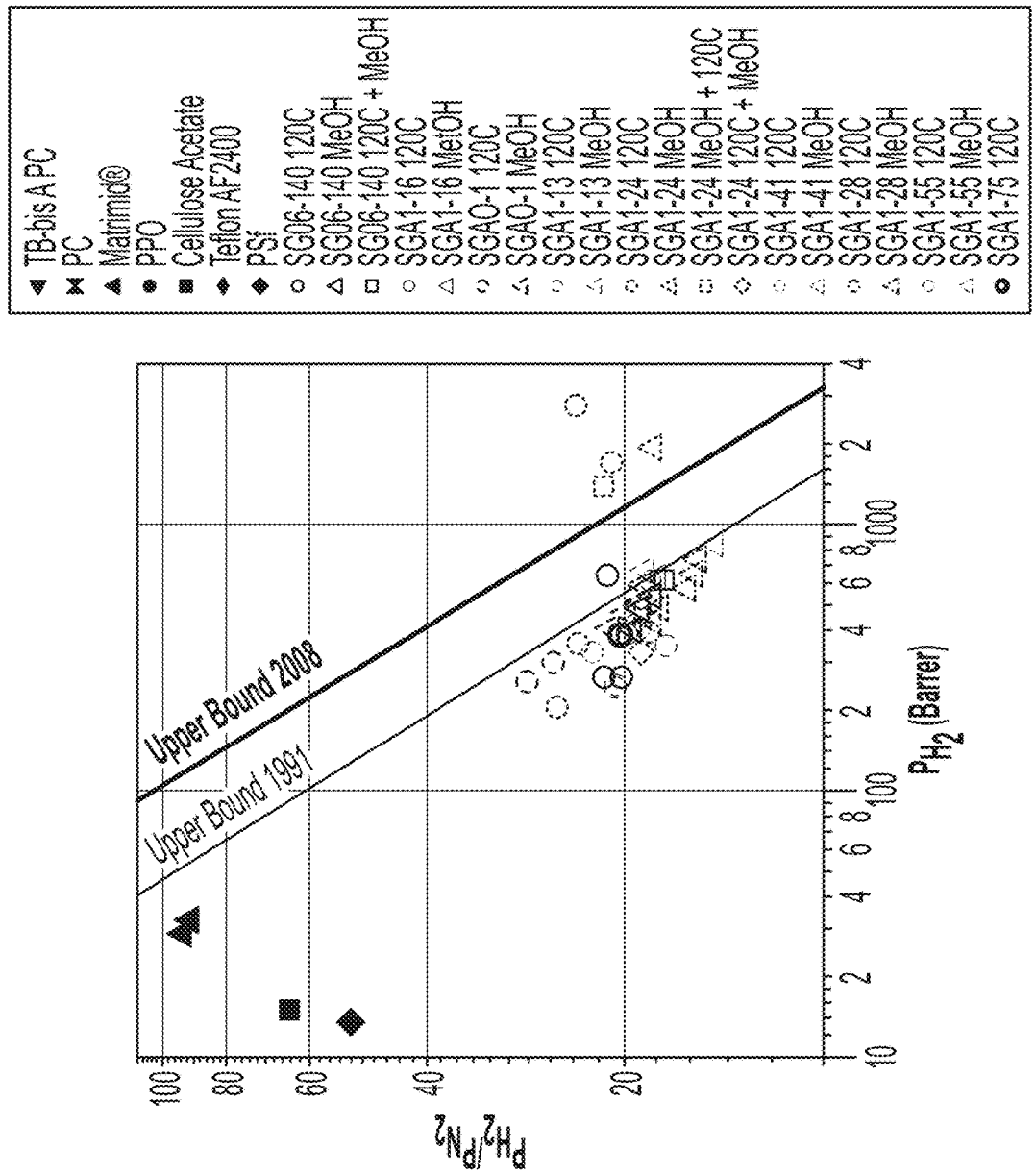
Figure 24E:
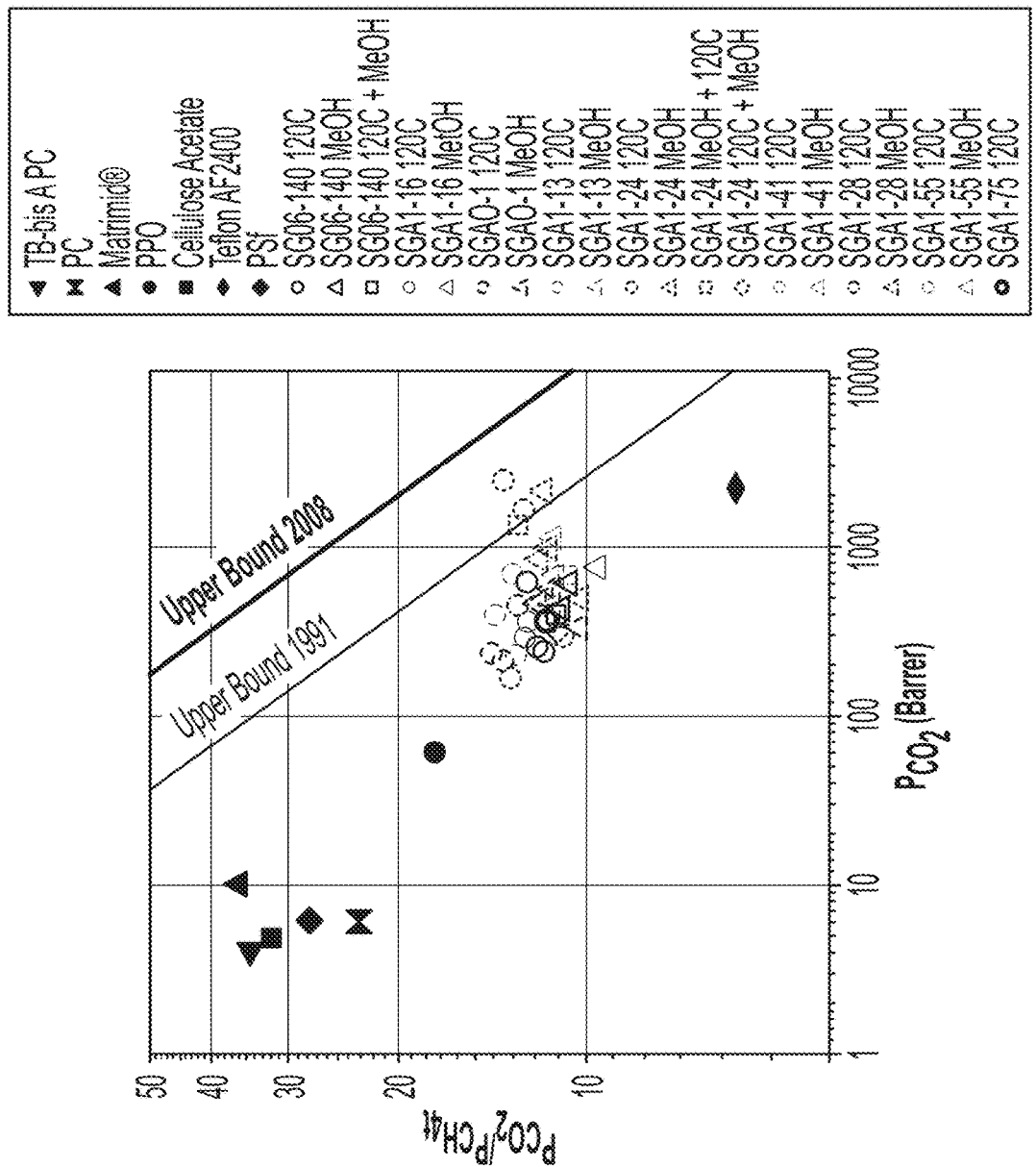
Figure 24F:
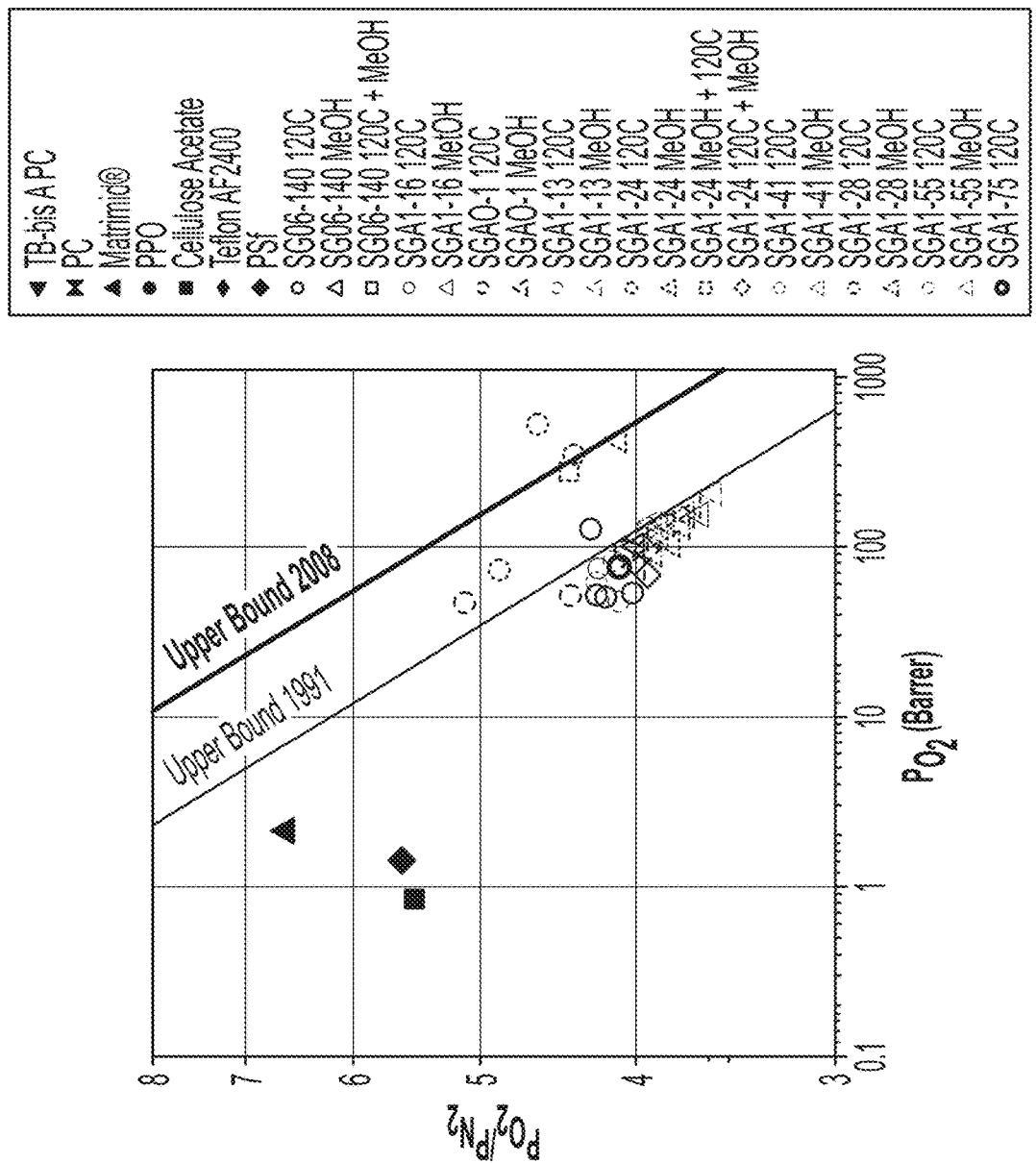

The photocatalytic moiety of the polymer can be easily altered without significant effect on its porosity and physical properties. Thus, porous PAE-based catalysts could be easily tunable with respect to absorption wavelength, oxidation/ reduction potentials, and dye structure. For instance, a polymer incorporating the more reducing perylene instead of PDI unit can be prepared (see FIG. 23). This material can be used to catalyze the atom-transfer radical polymerization (ATRP) reaction of methyl methacrylate under sunlight.

One skilled in the art will recognize that a number of different photoredox catalytic systems can be produced and that materials that do reduction as well as oxidation are possible. The exited state of the system can be either a singlet or triplet. In some embodiments, it may be advantageous to have a triplet state, which has a longer excited state lifetime. In other embodiments, a singlet state may be preferred. The porous nature of the polymer also provides the ability to make use of size exclusion in these processes. In other words, the species that undergoes the photoredox reaction with the polymer must be small enough to enter the porosity of the polymer. Too large of species may be excluded and not undergo efficient photoreaction. Such a process can give rise to selectivity with complex molecules or mixtures that have multiple molecules. The use of a polymer photoredox catalyst in a film, particle, coating, filtration material can be used to transform a material and the catalyst can be in effect reused. For example, a tubing can be coated with the photoredox polymer in a continuous process. A material can be transported through a porous membrane and transformed through a thermally activated chemical process or a photochemically activated (photoredox) process. Recycling of catalysts in these polymers has economic advantages and can reduce waist. The use of supported catalysts and catalyst in membranes can be used to create continuous processes that also provide scalability and low cost for manufacturing.

Porous photoredox systems can also be used to produce chiral products. In this case the polymer is made to be chiral by integration of a chiral monomer into the system. The examples below have chirality that stems from the incorporation of the chiral (S)-(−)-1,1'-bi(2-naphthol) group in the polymer backbone. In some embodiments, photoredox dyes can be included in the porous chiral polymers and reactions can induce chiral properties to the produces. Chiral elements can also be used with other catalytic components to affect the chiral nature of the chemical products. One skilled in the art will also recognize that chiral porous polymers can be used in selective transport and separation of chiral molecules. The generation and separation of chiral molecules is of inherent interest and can provide materials of interest for medicine, materials, and optics.

Porous PAE materials have utility in gas separations and can be tailored for a variety of applications including separations of mixtures. Non-limiting examples include olefin/paraffin, methane/$CO_2$, $H_2S$/methane, $H_2$/methane, $H_2/N_2$, and oxygen/nitrogen separations. Additionally, high free volume or intrinsically microporous PAEs can be applied to organic solvent separations, petrochemical and chemical separations, and water-based separations that are gas-gas, liquid-liquid, or gas-liquid feeds. Some non-limiting examples include separations of crude oil and derived petrochemicals, separations of biofuel and derived biochemicals, and ethanol/water separations. FIGS. 24A-24F illustrate the performance of selected PAE gas separation membranes compared to known membrane materials. The plots demonstrate the pure gas permeability and selectivity of the separation of gases by the PAEs shown, after different treatments including thermal heating to 120° C., solvent treatments by soaking in methanol, and combinations thereof.

A number of different treatments are used to prepare the membranes for use in separations. These treatments can involve soaking in methanol and then drying, soaking in methanol and then heating, or just heating. In some embodiments the PAE membranes do not require any treatment prior to use. If used as an adsorbent, PAEs can be activated by simple heating, which has advantages in re-activation of adsorbents that have lost performance after prolonged use.

Figure 25A:
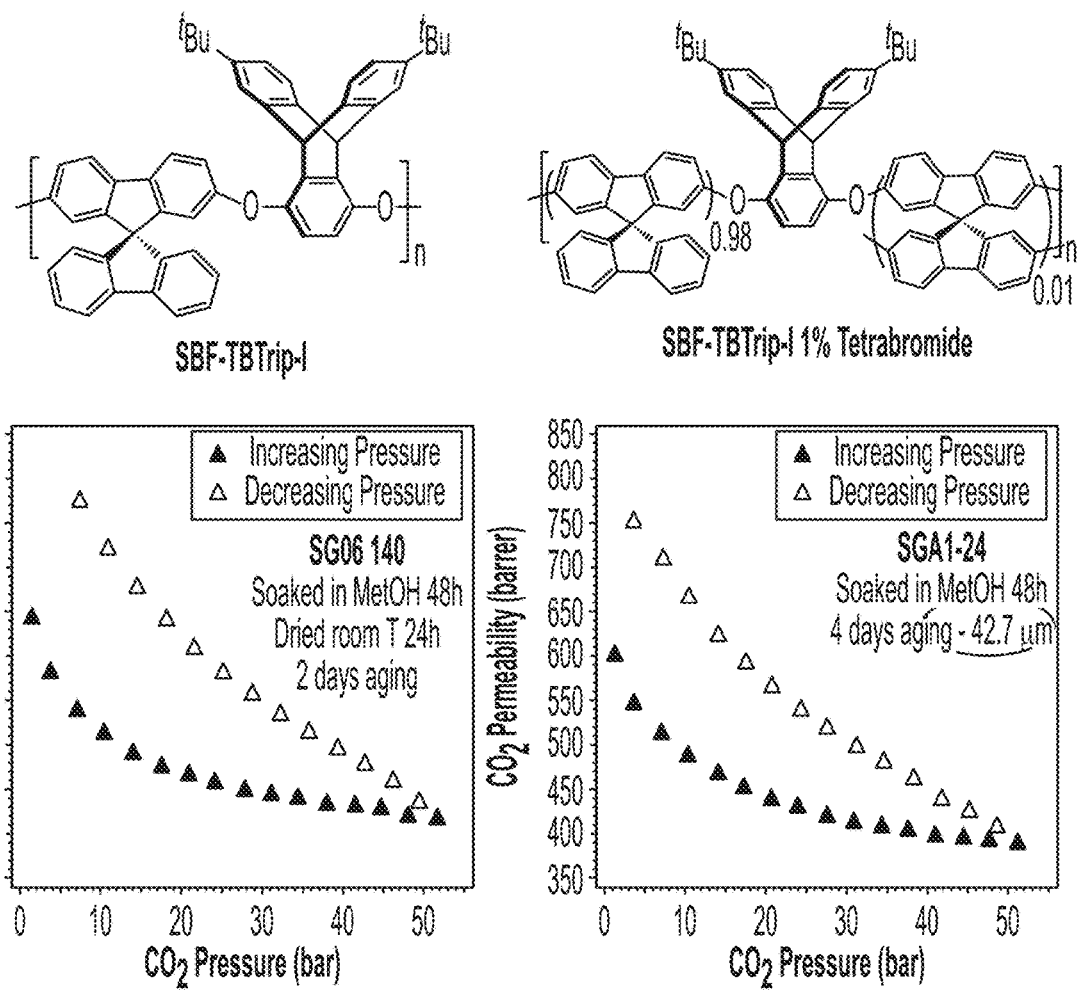
Figure 25B:
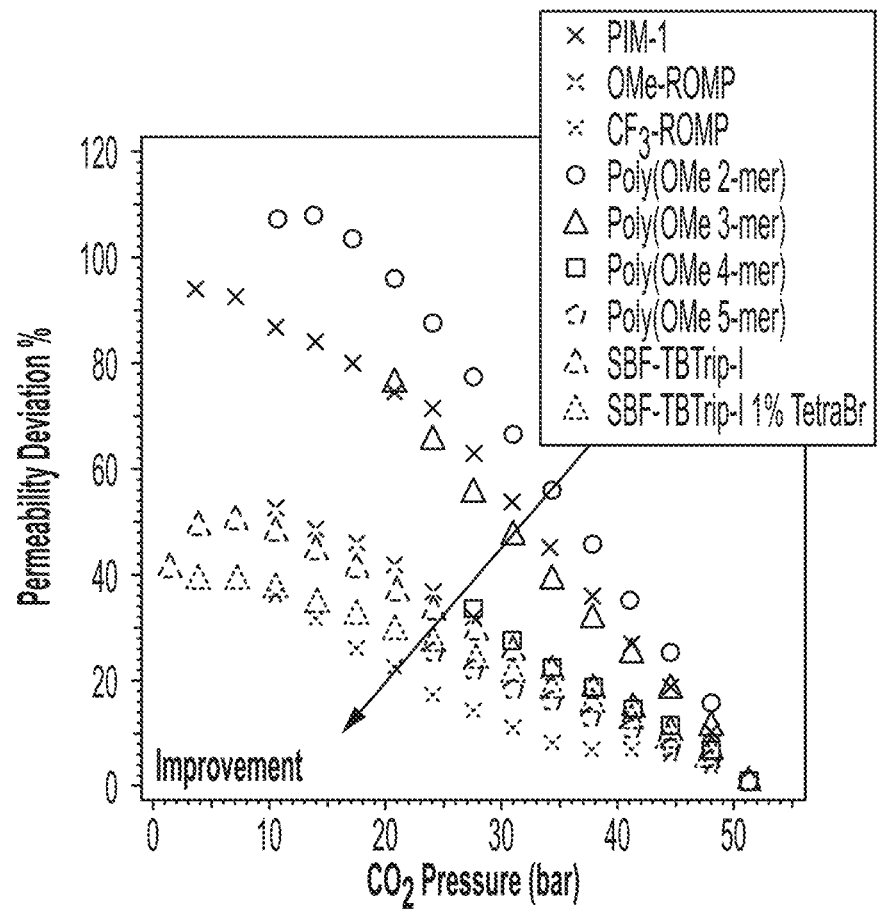

An important feature of a membrane is its resistance to plasticization. In gas separations, a resistance to plasticization is synonymous with stable separation selectivities in the presence of mixtures. One skilled in the art will also recognize that enhanced selectivities can be achieved through competitive sorption in certain cases if plasticization resistance can be maintained. Some non-limiting examples are $CO_2/CH_4$, $CO_2/N_2$, and $CO_2/H_2$ separation. In many cases, carbon dioxide will plasticize many linear polymers and this process tends to lead to degradation in their performance as gas separation membranes. As shown in FIG. 25A-25B, PAEs have more stable CO2 performance and hysteresis behavior than common linear microporous polymers, such as PIM-1, making their performance attractive for applications that require a resistance to plasticization. Additionally, the cross-linked (branched) embodiments enable enhanced resistance to plasticization. In one non-limiting embodiment, the addition of 1% of a tetrafunctional monomer increases stability to $CO_2$ permeability while maintaining a soluble polymer that can be cast via solution casting techniques.

Figure 26:
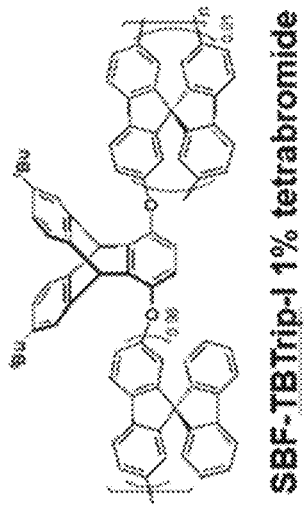
FIG. 26 shows, according to some embodiments, the permeability of various gases for a poly(aryl ether) as a function of the treatment and age of the polymer films.

The versatility of the polymers for separations is revealed by the permeability and selectivity for a variety of gases, as shown in FIG. 26.

EXAMPLE 2

The following example describes general information regarding materials and analytical methods.

Unless noted, all chemicals were obtained from commercial sources, were stored at room temperature, and were used as received. All preparative C—O bond-forming reactions were carried out under an atmosphere of nitrogen using standard Schlenk techniques. Anhydrous 2-methyl tetrahydrofuran (2-MeTHF), toluene, and Dimethoxyethane (DME) were purchased from Sigma-Aldrich in Sure-Seal™ bottles and were degassed prior to use by sparging the liquid with nitrogen gas for 10 min while submerged in a sonication bath. ᵗBuBrettPhos and other phosphine ligands, Palladium(n-cinnamyl) chloride dimer, and potassium phosphate were purchased from Sigma-Aldrich. Other reagents were either prepared according to referenced literature procedures or were purchased from chemical suppliers (Sigma-Aldrich, Ambeed, TCI America) and were used as received unless otherwise noted. Isolated compounds were purified by flash chromatography using Silicycle SiliaFlashP60 (230-400 mesh) silica gel with the aid of a Biotage Automated Flash Chromatography System.

$^1H$, $^{13}C$ spectra were recorded on a Bruker Avance-600 MHz spectrometer. $^1H$ and $^{13}C$ spectra were calibrated using residual solvent as an internal reference ($CHCl_3$: δ 7.26 ppm and δ 77.36 ppm, respectively; DMSO: 2.50 ppm and 39.52 ppm, respectively). The following abbreviations were used to explain multiplicities: s=singlet, bs=broad singlet, d=doublet, t=triplet, q=quartet, m=multiplet.

High-resolution mass spectra (HRMS) were recorded on an Agilent Technologies 6545 Q-TOF LC/MS system or JEOL AccuTOF 4G with an ionSense DART. Melting points were obtained using a Stanford Research Systems EZ-Melt melting point apparatus. All IR spectra were recorded on a Thermo Scientific Nicolet iS5 spectrometer (iD5 ATR, diamond) and are reported in terms of frequency of absorption ($cm^{-1}$).

Gel permeation chromatography (GPC): Measurements were carried out in HPLC-grade tetrahydrofuran using an Agilent 1260 Infinity system with variablewavelength diode array (254, 450 and 530 nm) and refractive index detectors, guard column (Agilent PLgel; 5 μm; 50×7.5 mm), and three analytical columns (Agilent PLgel; 5 μm; 300×7.5 mm; 105, 104, and 103 Å pore sizes). The instrument was calibrated with narrow-dispersity polystyrene standards between 1.7 and 3150 kg mol−1. All runs were performed at 1.0 mL min−1 flow rate and 35° C. Molecular weight values were calculated using ChemStation GPC Data Analysis Software (Rev. B.01.01) based on the refractive index signal.

Thermogravimetric analysis (TGA): TGA measurements were carried out under nitrogen atmosphere (Airgas, ultra-high purity grade) using a TGA 550 from TA Instruments. The ramp speed was 10° C. min⁻1, and isotherms were performed from room temperature to 800° C.

Brunauer-Emmett-Teller (BET): BET surface area of polymers was measured with $N_2$ sorption at 77 K using a Micromeritics ASAP 2020. Analysis of pore-size distributions was performed using NonLocal Density Functional Theory (NLDFT) model for carbon slit pore geometry provided by ASAP 2020.

Heavy wall cylindrical vessels were purchased from Synthware(P260001). These vessels have an internal thread for use with a 15 mm PTFE bushing as a pressure seal and a special 0-4 mm vacuum valve on a side tube.

EXAMPLE 3

The following example describes the synthesis and characterization of various poly(aryl ether)s.

An oven-dried pressure vessel (P260001 heavy wall*, with side port, 15 mL) equipped with a stir bar was sequentially charged with solid reagents, including Palladium(π-cinnamyl) chloride dimer (2.6 mg, 0.005 mmol, 0.01 equiv), $^t$BuBrettPhos (15 mg, 0.03 mmol, 0.06 equiv), tert-butriptycene hydroquinone (199 mg, 0.5 mmol, 1.0 equiv), 2,7-dibromo-9,9'-spirobifluorene (237 mg, 0.5 mmol, 1.0 equiv), $K_3PO_4$ (318 mg, 1.5 mmol, 3.0 equiv). The reaction tube was evacuated and backfilled with nitrogen from the Schlenk line (this process was repeated a total of five times), then toluene (0.6 mL) and dimethoxyethane (0.3 mL) were added successively. The reaction tube was placed into a pre-heated oil bath and the mixture was stirred at 140° C. for 20 h.

Workup I: The reaction tube was removed from the oil bath and allowed to cool to RT. Next, the tube was uncapped and the reaction solution was diluted with THF (5.0 mL) and HCl aqueous solution (1.0 M, 3 mL), and the crude material was transferred to a separatory funnel and another 5 mL THF and 10 mL brine were added. The water phase was removed and the organic phase was washed by brine (5 mL) for once. The solution containing the crude product was dried over with $Na_2SO_4$ and concentrated to ~5 mL with the aid of a rotary evaporator. Upon completion, the resulting polymer was precipitated in methanol (50 mL). The precipitation process was repeated for two times. The collected polymer was dried in a vacuum oven at 140° C. overnight before characterization.

Workup II: The reaction tube was removed from the oil bath and allowed to cool to RT. Next, the tube was uncapped and the reaction solution was diluted with THF (5.0 mL) and brine (5 mL), and the crude material was transferred to a separatory funnel and another 5 mL THF and 10 mL brine were added. The water phase was removed and the organic phase was washed by brine (5 mL) for once. The solution containing the crude product was dried over with $Na_2SO_4$ and concentrated to ~5 mL with the aid of a rotary evaporator. Upon completion, the resulting polymer was precipitated in methanol (50 mL). The precipitation process was repeated for two times. The collected polymer was dried in a vacuum oven at 140° C. overnight before characterization.

Figure 27A:
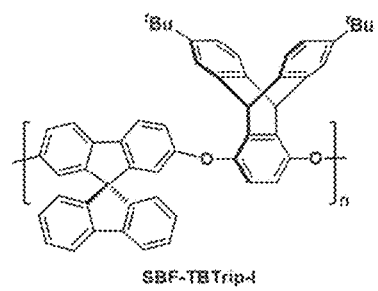
FIG. 27A shows, according to some embodiments, the structure of SBF-TBTrip-I.
Figure 27B:
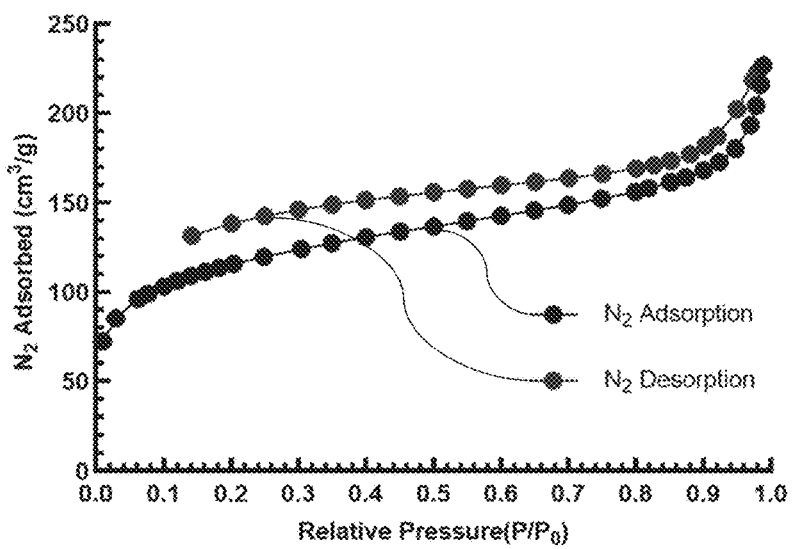
FIG. 27B shows, according to some embodiments, a $N_2$ adsorption-desorption isotherm of SBF-TBTrip-I.
Figure 27C:
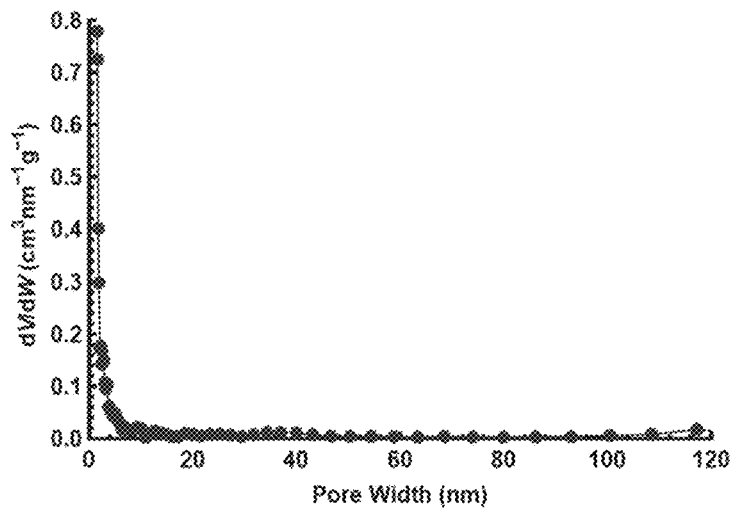
FIG. 27C shows, according to some embodiments, the pore size distribution of SBF-TBTrip-I.

SBF-TBTrip-I (see FIG. 27A): The general procedure was followed on a 1.00 mmol scale using 6,15-di-tert-butyl-9,10-dihydro-9,10-[1,2]benzenoanthracene-1,4-diol (399 mg, 1.0 mmol, 1.0 equiv), 2,7-dibromo-9,9'-spirobifluorene (474 mg, 1.0 mmol, 1.0 equiv). The reaction mixture was stirred at 140° C. for 20 h. After Workup I, the title compound was obtained as a gray powder (680 mg, 96% yield). $^1$H NMR (600 MHz, CDCl$_3$) δ 7.92-7.85 (m, 2H), 7.51 (t, J=7.8 Hz, 1H), 7.47-7.39 (m, 2H), 7.23-7.15 (m, 4H), 7.10 (dd, J=7.8, 4.1 Hz, 2H), 6.99-6.88 (m, 4H), 6.62 (d, J=8.2 Hz, 2H), 6.54 (dd, J=18.3, 8.2 Hz, 2H), 6.43 (t, J=6.2 Hz, 2H), 5.52 (d, J=17.7 Hz, 2H), 1.22 (s, 18H). $^{13}$C NMR (151 MHz, CDCl$_3$) δ 158.0, 151.0, 148.8, 148.7, 148.2, 147.3, 144.8, 142.1, 142.0, 139.3, 136.2, 128.1, 124.2, 123.4, 121.8, 121.5, 120.4, 120.2, 117.6, 116.6, 114.7, 66.1, 47.9, 34.7, 31.6. IR (neat, cm$^{-1}$) 3065, 3038, 2961, 2904, 2868, 1606, 1582, 1477, 1458, 1415, 1260, 1219, 1141, 1107, 996, 865, 812, 748, 637. Molecular weight values were calculated using ChemStation GPC Data Analysis Software (Rev. B.01.01) based on the refractive index signal. Mn=33.6 kg/mol, Mw=54.0 kg/mol, PDI=1.6. The porosity of the polymer powder was measured using nitrogen adsorption isotherm at 77 K with a saturation pressure of $P_0$=1 bar (see FIG. 27B). BET surface area was calculated based on a p/po range from 0.06 to 0.20 for the adsorption measurement. SBF-TBTrip-I has a Brunauer-Emmett-Teller (BET) internal surface area of 407 $m^2g^{-1}$. Pore-size distributions were analyzed using NLDFT based on the adsorption part of isotherm and carbon slit pore geometry (see FIG. 27C).

Figure 28A:
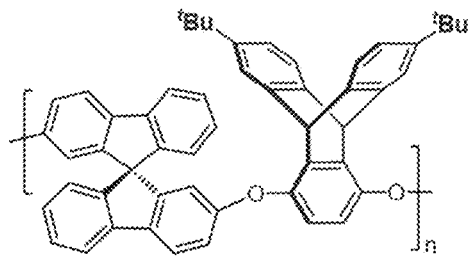
FIG. 28A shows, according to some embodiments, the structure of SBF-TBTrip-II.
Figure 28B:
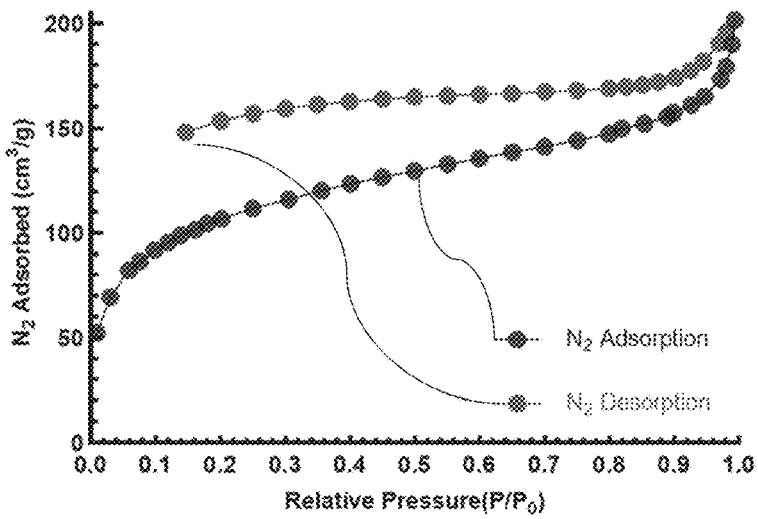
FIG. 28B shows, according to some embodiments, a $N_2$ adsorption-desorption isotherm of SBF-TBTrip-II.
Figure 28C:
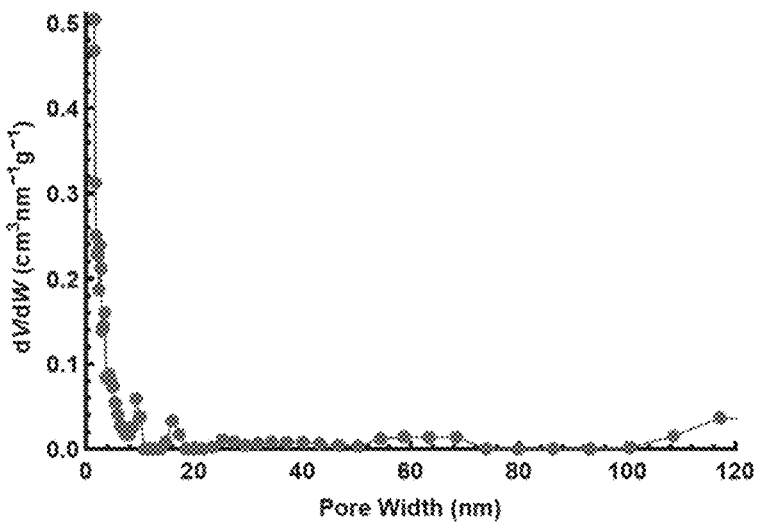
FIG. 28C shows, according to some embodiments, the pore size distribution of SBF-TBTrip-II.

SBF-TBTrip-II (see FIG. 28A): The general procedure was followed on a 1.00 mmol scale using 6,15-di-tert-butyl-9,10-dihydro-9,10-[1,2]benzenoanthracene-1,4-diol (399 mg, 1.0 mmol, 1.0 equiv), 2,2'-dibromo-9,9'-spirobifluorene (474 mg, 1.0 mmol, 1.0 equiv). The reaction mixture was stirred at 140° C. for 72 h. After Workup I, the title compound was obtained as a gray powder (672 mg, 91% yield). $^1$H NMR (500 MHz, CDCl$_3$) δ 7.80-7.70 (m, 2H), 7.66-7.57 (m, 2H), 7.42-7.30 (m, 2H), 7.20-7.03 (m, 6H), 6.99-6.88 (m, 2H), 6.79 (ddd, J=35.4, 20.1, 8.9 Hz, 4H), 6.60-6.43 (m, 4H), 5.57 (d, J=21.3 Hz, 2H), 1.25-1.15 (m, 18H). $^{13}$C NMR (126 MHz, CDCl$_3$) δ 158.7, 151.0, 148.9, 148.2, 147.3, 144.7, 142.0, 141.5, 139.6, 136.6, 128.0, 127.3, 124.2, 123.5, 121.9, 121.5, 120.9, 119.8, 117.9, 116.5, 114.7, 66.1, 48.0, 34.7, 31.6. IR (neat, cm$^{-1}$) 3064, 2961, 2903, 2867, 1611, 1580, 1474, 1447, 1262, 1219, 1130, 1105, 996, 842, 825, 750. Molecular weight values were calculated using ChemStation GPC Data Analysis Software (Rev. B.01.01) based on the refractive index signal. Mn=22.3 kg/mol, Mw=34.0 kg/mol, PDI=1.5. The porosity of the polymer powder was measured using nitrogen adsorption isotherm at 77 K with a saturation pressure of $P_0$=1 bar (see FIG. 28B). BET surface area was calculated based on a p/po range from 0.06 to 0.20 for the adsorption measurement. SBF-TBTrip-II has a Brunauer-Emmett-Teller (BET) internal surface area of 387 $m^2g^{-1}$. Pore-size distributions were analyzed using NLDFT based on the adsorption part of isotherm and carbon slit pore geometry (see FIG. 28C).

Figure 29A:
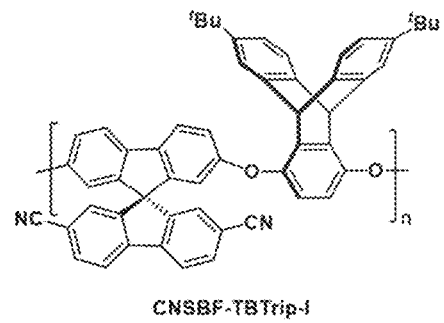
FIG. 29A shows, according to some embodiments, the structure of CNSBF-TBTrip-I.
Figure 29B:
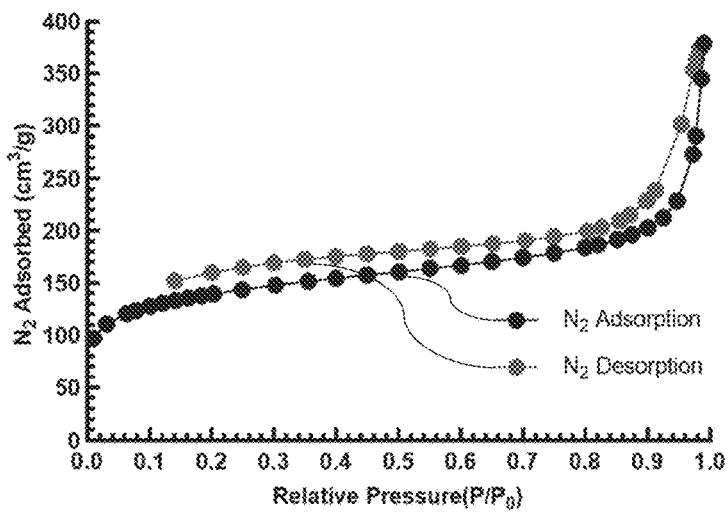
FIG. 29B shows, according to some embodiments, a $N_2$ adsorption-desorption isotherm of CNSBF-TBTrip-I.
Figure 29C:
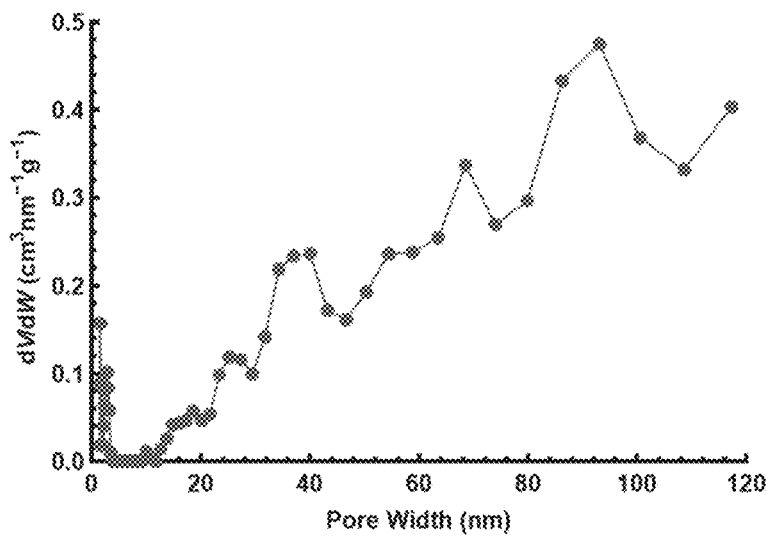
FIG. 29C shows, according to some embodiments, the pore size distribution of CNSBF-TBTrip-I.

CNSBF-TBTrip-I (See FIG. 29A): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), 2',7'-dibromo-9,9'-spirobifluorene-2,7-dicarbonitrile (262 mg, 0.5 mmol, 1.0 equiv). The reaction mixture was stirred at 140° C. for 20 h. After Workup I, the title compound as a gray powder (372 mg, 94% yield). $^1$H NMR (600 MHz, CDCl$_3$) δ 7.99 (dd, J=8.6, 5.3 Hz, 2H), 7.86-7.72 (m, 2H), 7.58 (d, J=8.5 Hz, 1H), 7.35-7.29 (m, 2H), 7.27-7.23 (m, 2H), 7.23-7.17 (m, 2H), 6.98 (d, J=7.8 Hz, 2H), 6.70-6.63 (m, 2H), 6.46 (d, J=13.4 Hz, 4H), 5.63 (d, J=9.2 Hz, 2H), 1.24 (s, 18H). $^{13}$C NMR (151 MHz, CDCl$_3$) δ 158.2, 150.3, 148.4, 147.5, 147.1, 144.7, 144.1, 141.9, 139.5, 136.2, 132.8, 128.5, 123.5, 122.1, 122.0, 121.6, 121.0, 118.7, 117.7, 117.6, 114.1, 113.0, 65.6, 47.8, 34.8, 31.7. IR (neat, cm$^{-1}$) 2960, 2904, 2868, 2228, 1607, 1583, 1477, 1459, 1437, 1413, 1261, 1218, 1141, 1106, 996, 820, 754. Molecular weight values were calculated using ChemStation GPC Data Analysis Software (Rev. B.01.01) based on the refractive index signal. Mn=27.5 kg/mol, Mw=51.7 kg/mol, PDI=1.9. The porosity of the polymer powder was measured using nitrogen adsorption isotherm at 77 K with a saturation pressure of $P_0$=1 bar (see FIG. 29B). BET surface area was calculated based on a p/po range from 0.06 to 0.20 for the adsorption measurement. CNSBF-TBTrip-I has a Brunauer-Emmett-Teller (BET) internal surface area of 485 $m^2g^{-1}$. Pore-size distributions were analyzed using NLDFT based on the adsorption part of isotherm and carbon slit pore geometry (see FIG. 29C).

Figure 30A:
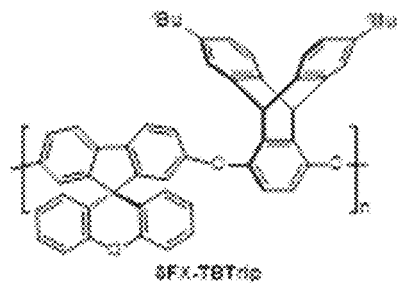
FIG. 30A shows, according to some embodiments, the structure of SFX-TBTrip.
Figure 30B:
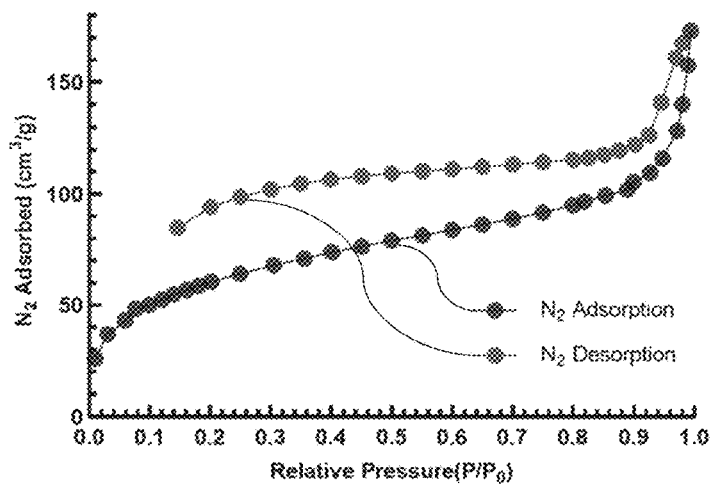
FIG. 30B shows, according to some embodiments, a $N_2$ adsorption-desorption isotherm of SFX-TBTrip.
Figure 30C:
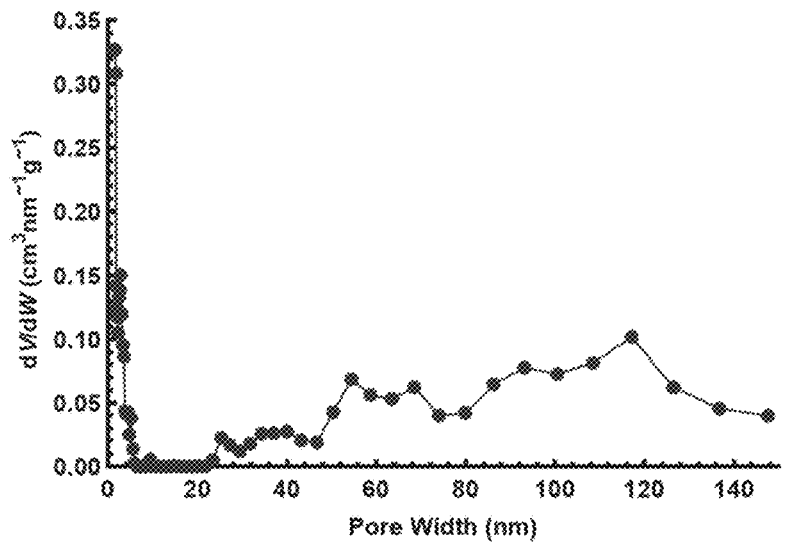
FIG. 30C shows, according to some embodiments, the pore size distribution of SFX-TBTrip.

SFX-TBTrip (see FIG. 30A): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), 2,7-dibromospirofluorene-9,9'-xanthene (245 mg, 0.5 mmol, 1.0 equiv). The reaction mixture was stirred at 140° C. for 20 h. After Workup I, the title compound as a gray powder (350 mg, 96% yield). $^1$H NMR (600 MHz, CDCl$_3$) δ 7.49 (t, J=8.4 Hz, 2H), 7.32-7.23 (m, 4H), 7.19 (d, J=21.1 Hz, 2H), 7.11 (dd, J=7.8, 4.5 Hz, 2H), 7.07-7.00 (m, 2H), 6.98-6.83 (m, 4H), 6.73-6.41 (m, 4H), 5.56 (d, J=19.2 Hz, 2H), 1.23 (s, 18H). $^{13}$C NMR (151 MHz, CDCl$_3$) δ 158.6, 157.1, 151.5, 148.2, 147.4, 144.8, 142.0, 139.5, 134.1, 128.5, 128.1, 124.9, 123.5, 121.8, 121.5, 120.3, 117.8, 117.3, 117.1, 116.9, 116.2, 54.5, 47.9, 34.7, 31.6. IR (neat, cm$^{-1}$) 3034, 3008, 2962, 2904, 2868, 1602, 1575, 1477, 1458, 1443, 1288, 1260, 1245, 1219, 1129, 1102, 996, 882, 820, 752, 640. Molecular weight values were calculated using ChemStation GPC Data Analysis Software (Rev.B.01.01) based on the refractive index signal. Mn=30.0 kg/mol, Mw=60.7 kg/mol, PDI=2.0. The porosity of the polymer powder was measured using nitrogen adsorption isotherm at 77 K with a saturation pressure of P$_0$=1 bar (see FIG. 30B). BET surface area was calculated based on a p/po range from 0.06 to 0.20 for the adsorption measurement. SFX-TBTrip has a Brunauer-Emmett-Teller (BET) internal surface area of 225 m$^2$g$^{-1}$. Pore-size distributions were analyzed using NLDFT based on the adsorption part of isotherm and carbon slit pore geometry (see FIG. 30C).

Figure 31:
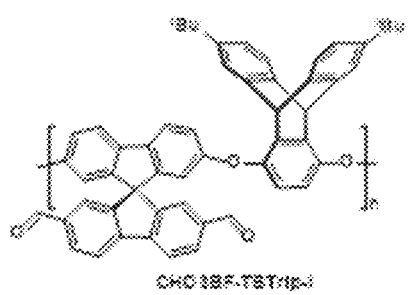
FIG. 31 shows, according to some embodiments, the structure of CHOSBF-TBTrip-I.

CHOSBF-TBTrip-I (see FIG. 31): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), 2',7'-dibromo-9,9'-spirobi[fluorene]-2,7-dicarbaldehyde (265 mg, 0.5 mmol, 1.0 equiv). The reaction mixture was stirred at 150° C. for 16 h. After Workup I, the title compound as a brown powder (380 mg, 92% yield). $^1$H NMR (600 MHz, CDCl$_3$, soluble part of the product) $^1$H NMR (600 MHz, CDCl$_3$) δ 10.09-9.79 (m, 2H), 8.16-7.83 (m, 4H), 7.66-7.22 (m, 6H), 7.14 (d, J=7.2 Hz, 2H), 6.94 (d, J=7.7 Hz, 2H), 6.65-6.32 (m, 6H), 5.58 (d, J=10.4 Hz, 2H), 1.23 (s, 18H).

Figure 32A:
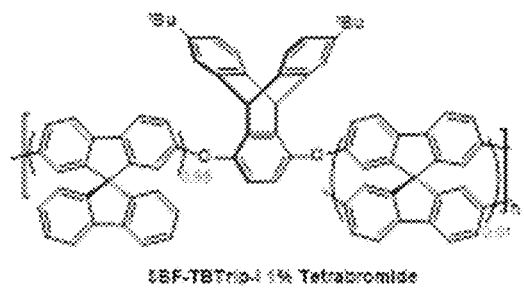
FIG. 32A shows, according to some embodiments, the structure of SBF-TBTrip-I 1% tetrabromide.
Figure 32B:
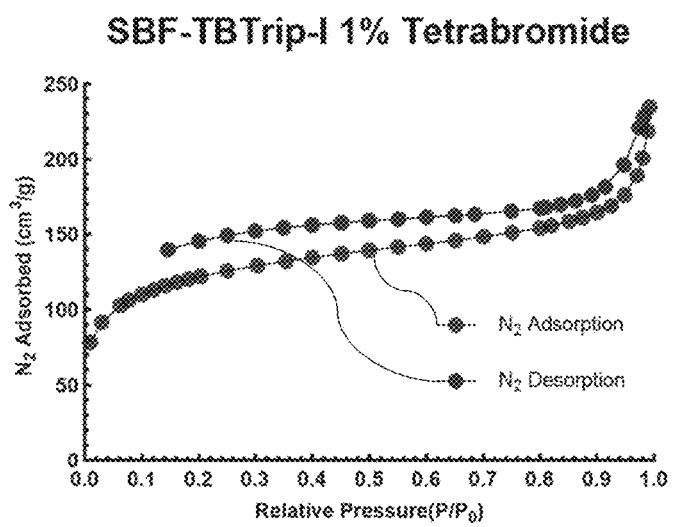
FIG. 32B shows, according to some embodiments, a $N_2$ adsorption-desorption isotherm of SBF-TBTrip-I 1% tetrabromide.
Figure 32C:
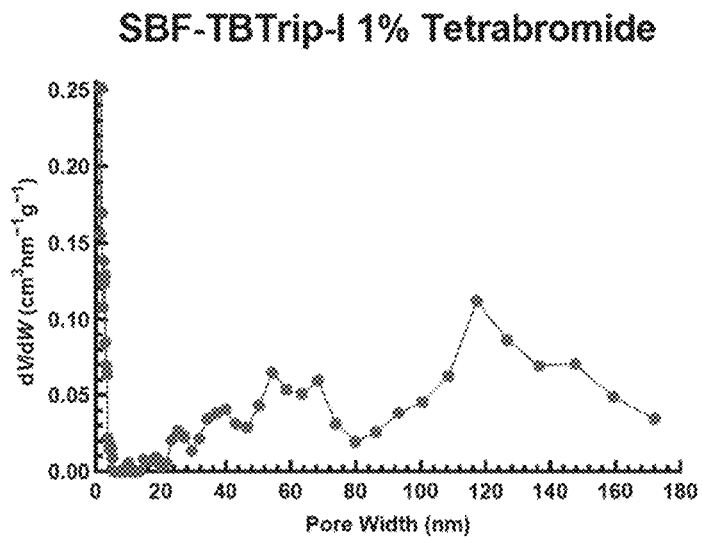
FIG. 32C shows, according to some embodiments, the pore size distribution of SBF-TBTrip-I 1% tetrabromide.

SBF-TBTrip-I 1% tetrabromide (see FIG. 32A): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), 2,2'-dibromo-9,9'-spirobifluorene (232 mg, 0.48 mmol, 0.98 equiv), 2,2',7,7'-tetrabromo-9,9'-spirobifluorene (3.2 mg, 0.005 mmol, 0.01 equiv). The reaction mixture was stirred at 140° C. for 20 h. After Workup I, the title compound as a gray powder (340 mg, 96% yield). $^1$H NMR (600 MHz, CDCl$_3$) δ 7.92-7.85 (m, 2H), 7.51 (t, J=7.8 Hz, 1H), 7.47-7.39 (m, 2H), 7.23-7.15 (m, 4H), 7.10 (dd, J=7.8, 4.1 Hz, 2H), 6.99-6.88 (m, 4H), 6.62 (d, J=8.2 Hz, 2H), 6.54 (dd, J=18.3, 8.2 Hz, 2H), 6.43 (t, J=6.2 Hz, 2H), 5.52 (d, J=17.7 Hz, 2H), 1.22 (s, 18H). $^{13}$C NMR (151 MHz, CDCl$_3$) δ 158.0, 151.0, 148.8, 148.7, 148.2, 147.3, 144.8, 142.1, 142.0, 139.3, 136.2, 128.1, 124.2, 123.4, 121.8, 121.5, 120.4, 120.2, 117.6, 116.6, 114.7, 66.1, 47.9, 34.7, 31.6. IR (neat, cm$^{-1}$) 3065, 3037, 3011, 2961, 2904, 2868, 1606, 1582, 1477, 1458, 1435, 1260, 1220, 1182, 1107, 996, 924, 865, 827, 812, 745, 637. Molecular weight values were calculated using ChemStation GPC Data Analysis Software (Rev.B.01.01) based on the refractive index signal. Mn=42.0 kg/mol, Mw=124.0 kg/mol, PDI=3.0. The porosity of the polymer powder was measured using nitrogen adsorption isotherm at 77 K with a saturation pressure of P$_0$=1 bar (see FIG. 32B). BET surface area was calculated based on a p/po range from 0.06 to 0.20 for the adsorption measurement. SBF-TBTrip-I 1% tetrabromide has a Brunauer-Emmett-Teller (BET) internal surface area of 428 m$^2$g$^{-1}$. Pore-size distributions were analyzed using NLDFT based on the adsorption part of isotherm and carbon slit pore geometry (see FIG. 32C).

Figure 33A:
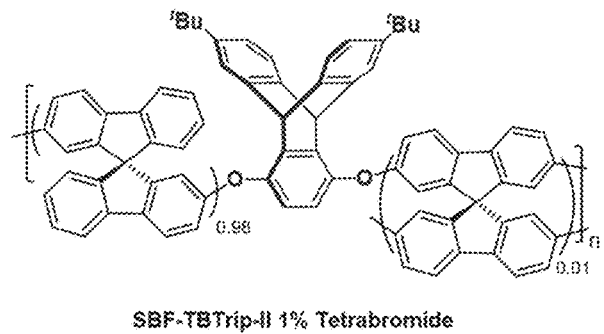
FIG. 33A shows, according to some embodiments, the structure of SBF-TBTrip-II 1% tetrabromide.
Figure 33B:
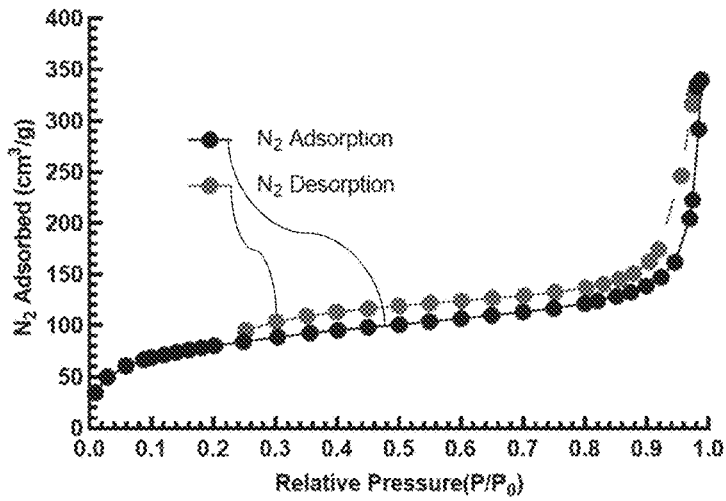
FIG. 33B shows, according to some embodiments, a $N_2$ adsorption-desorption isotherm of SBF-TBTrip-II 1% tetrabromide.
Figure 33C:
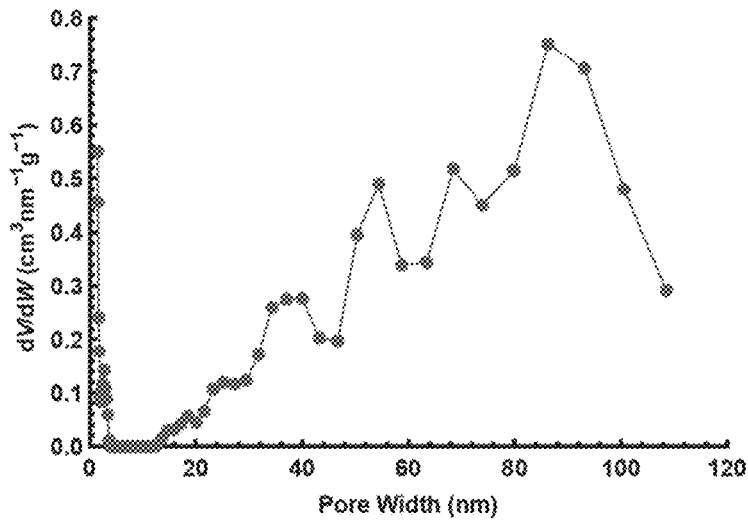
FIG. 33C shows, according to some embodiments, the pore size distribution of SBF-TBTrip-II 1% tetrabromide.

SBF-TBTrip-II 1% tetrabromide (see FIG. 33A): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), 2,2'-dibromo-9,9'-spirobifluorene (232 mg, 0.48 mmol, 0.98 equiv), 2,2',7,7'-tetrabromo-9,9'-spirobifluorene (3.2 mg, 0.005 mmol, 0.01 equiv). The reaction mixture was stirred at 140° C. for 42 h. After Workup I, the title compound as a gray powder (348 mg, 92% yield). $^1$H NMR (500 MHz, CDCl$_3$) δ 7.80-7.70 (m, 2H), 7.66-7.57 (m, 2H), 7.42-7.30 (m, 2H), 7.20-7.03 (m, 6H), 6.99-6.88 (m, 2H), 6.79 (ddd, J=35.4, 20.1, 8.9 Hz, 4H), 6.60-6.43 (m, 4H), 5.57 (d, J=21.3 Hz, 2H), 1.25-1.15 (m, 18H). IR (neat, cm$^{-1}$) 3010, 2960, 2903, 2867, 1610, 1580, 1473, 1447, 1424, 1261, 1219, 1194, 1140, 995, 841, 750, 642. Molecular weight values were calculated using ChemStation GPC Data Analysis Software (Rev.B.01.01) based on the refractive index signal. Mn=24.9 kg/mol, Mw=60.5 kg/mol, PDI=2.6. The porosity of the polymer powder was measured using nitrogen adsorption isotherm at 77 K with a saturation pressure of P$_0$=1 bar (see FIG. 33B). BET surface area was calculated based on a p/po range from 0.06 to 0.20 for the adsorption measurement. SBF-TBTrip-II 1% tetrabromide has a Brunauer-Emmett-Teller (BET) internal surface area of 291 m$^2$g$^{-1}$. Pore-size distributions were analyzed using NLDFT based on the adsorption part of isotherm and carbon slit pore geometry (see FIG. 33C).

Figure 34A:
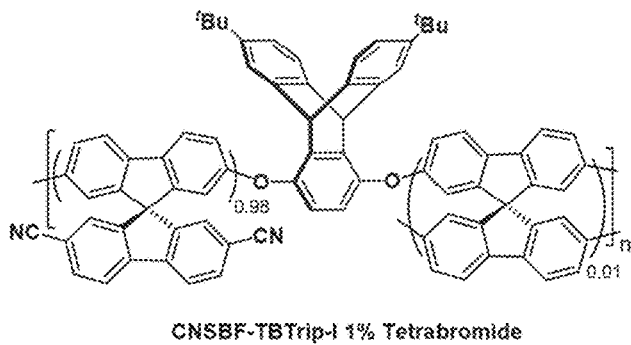
FIG. 34A shows, according to some embodiments, the structure of CNSBF-TBTrip-I 1% tetrabromide.
Figure 34B:
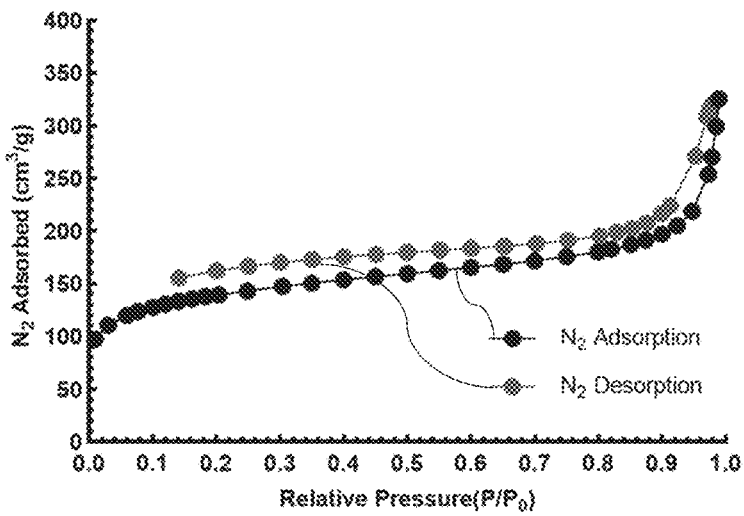
FIG. 34B shows, according to some embodiments, a $N_2$ adsorption-desorption isotherm and pore size distribution of CNSBF-TBTrip-I 1% tetrabromide.
Figure 34C:
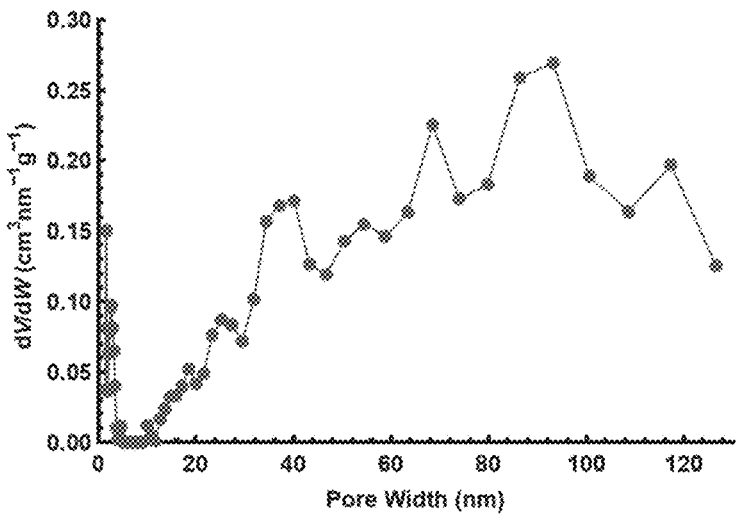
FIG. 34C shows, according to some embodiments, the pore size distribution of CNSBF-TBTrip-I 1% tetrabromide.

CNSBF-TBTrip-I 1% tetrabromide (see FIG. 34A): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), 2',7'-dibromo-9,9'-spirobi[fluorene]-2,7-dicarbonitrile (257 mg, 0.48 mmol, 0.98 equiv), 2,2',7,7'-tetrabromo-9,9'-spirobifluorene (3.2 mg, 0.005 mmol, 0.01 equiv). The reaction mixture was stirred at 140° C. for 20 h. After Workup I, the title compound as a gray powder (368 mg, 97% yield). $^1$H NMR (600 MHz, CDCl$_3$) δ 7.99 (dd, J=8.6, 5.3 Hz, 2H), 7.86-7.72 (m, 2H), 7.58 (d, J=8.5 Hz, 1H), 7.35-7.29 (m, 2H), 7.27-7.23 (m, 2H), 7.23-7.17 (m, 2H), 6.98 (d, J=7.8 Hz, 2H), 6.70-6.63 (m, 2H), 6.46 (d, J=13.4 Hz, 4H), 5.63 (d, J=9.2 Hz, 2H), 1.24 (s, 18H). $^{13}$C NMR (151 MHz, CDCl$_3$) δ 158.2, 150.3, 148.4, 147.5, 147.1, 144.7, 144.1, 141.9, 139.5, 136.2, 132.8, 128.5, 123.5, 122.1, 122.0, 121.6, 121.0, 118.7, 117.7, 117.6, 114.1, 113.0, 65.6, 47.8, 34.8, 31.7. IR (neat, cm$^{-1}$) 2961, 2905, 2228, 1608, 1584, 1478, 1460, 1262, 1219, 996, 820, 756. Molecular weight values were calculated using ChemStation GPC Data Analysis Software (Rev.B.01.01) based on the refractive index signal. Mn=39.6 kg/mol, Mw=304.0 kg/mol, PDI=7.7. The porosity of the polymer powder was measured using nitrogen adsorption isotherm at 77 K with a saturation pressure of P$_0$=1 bar (see FIG. 34B). BET surface area was calculated based on a p/po range from 0.06 to 0.20 for the adsorption measurement. CNSBF-TBTrip-I 1% tetrabromide has a Brunauer-Emmett-Teller (BET) internal surface area of 484 m$^2$g$^{-1}$. Pore-size distributions were analyzed using NLDFT based on the adsorption part of isotherm and carbon slit pore geometry (see FIG. 34C).

Figure 35A:
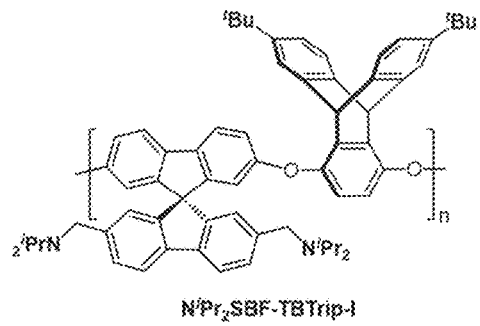
FIG. 35A shows, according to some embodiments, the structure of $N^iPr_2$SBF-TBTrip-I.
Figure 35B:
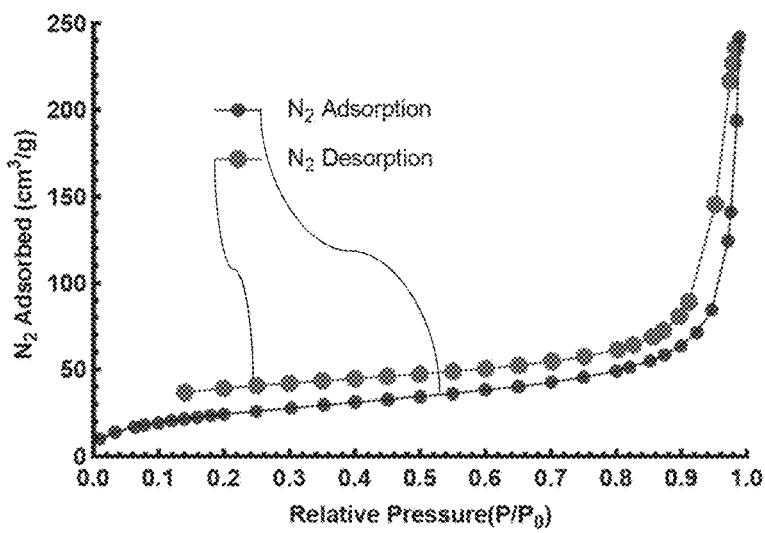
FIG. 35B shows, according to some embodiments, a $N_2$ adsorption-desorption isotherm of $N^iPr_2$SBF-TBTrip-I
Figure 35C:
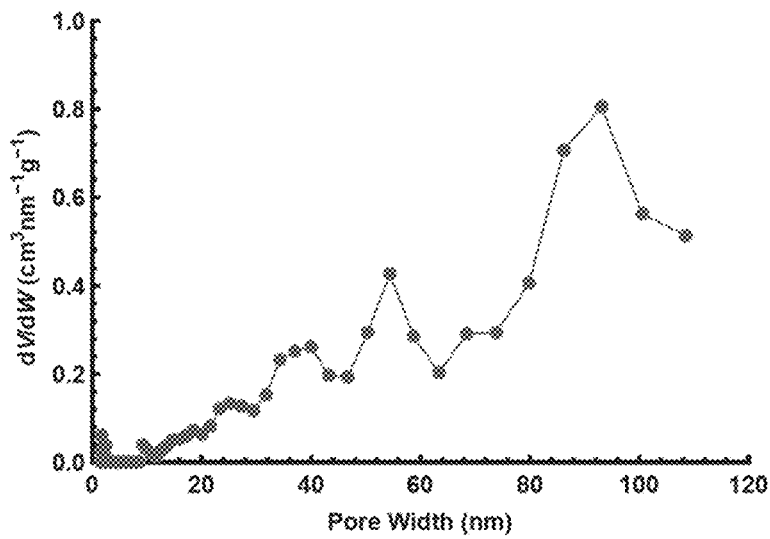
FIG. 35C shows, according to some embodiments, the pore size distribution of $N^iPr_2$SBF-TBTrip-I.

N'Pr₂SBF-TBTrip-I (see FIG. 35A): The general procedure was followed on a 0.36 mmol scale using 6,15-di-tert-butyl-9,10-dihydro-9,10-[1,2]benzenoanthracene-1,4-diol (143 mg, 0.36 mmol, 1.0 equiv), N,N'-((2',7'-dibromo-9,9'-spirobifluorene-2,7-diyl)bis(methylene))bis(N-isopropyl-propan-2-amine) (250 mg, 0.36 mmol, 1.0 equiv). The reaction mixture was stirred at 150° C. for 42 h. After Workup II, the title compound as a gray powder (300 mg, 94% yield). $^1$H NMR (500 MHz, CDCl$_3$) δ 7.84-7.69 (m, 2H), 7.56-7.43 (m, 4H), 7.22-7.11 (m, 2H), 7.10-7.04 (m, 2H), 6.99-6.88 (m, 4H), 6.71-6.60 (m, 2H), 6.57-6.30 (m, 2H), 5.57-5.39 (m, 2H), 3.60 (s, 4H), 2.95 (s, 4H), 1.23 (s, 18H), 0.93 (d, J=6.4 Hz, 24H). IR (neat, cm$^{-1}$) 2962, 2906, 2869, 1698, 1607, 1583, 1478, 1459, 1438, 1381, 1260, 1221, 1207, 996, 886, 816. Molecular weight values were calculated using ChemStation GPC Data Analysis Software (Rev.B.01.01) based on the refractive index signal. Mn=11.2 kg/mol, Mw=20.0 kg/mol, PDI=1.8. The porosity of the polymer powder was measured using nitrogen adsorption isotherm at 77 K with a saturation pressure of P$_0$=1 bar (see FIG. 35B). BET surface area was calculated based on a p/po range from 0.06 to 0.20 for the adsorption measurement. N'Pr₂SBF-TBTrip-I has a Brunauer-Emmett-Teller (BET) internal surface area of 93 m$^2$g$^{-1}$. Pore-size distributions were analyzed using NLDFT based on the adsorption part of isotherm and carbon slit pore geometry (see FIG. 35C).

Figure 36A:
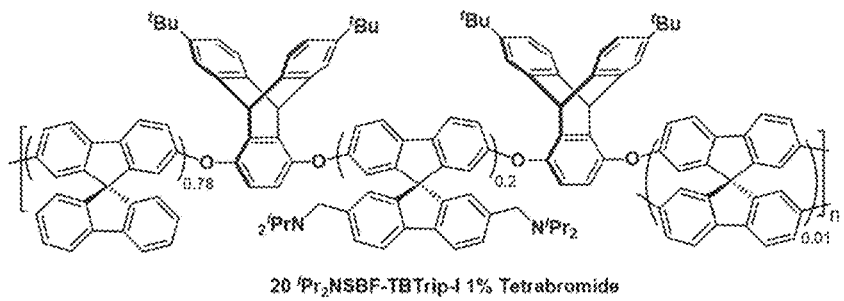
FIG. 36A shows, according to some embodiments, the structure of 20% $^iPr_2$NSBF-TBTrip-I 1% tetrabromide.
Figure 36B:
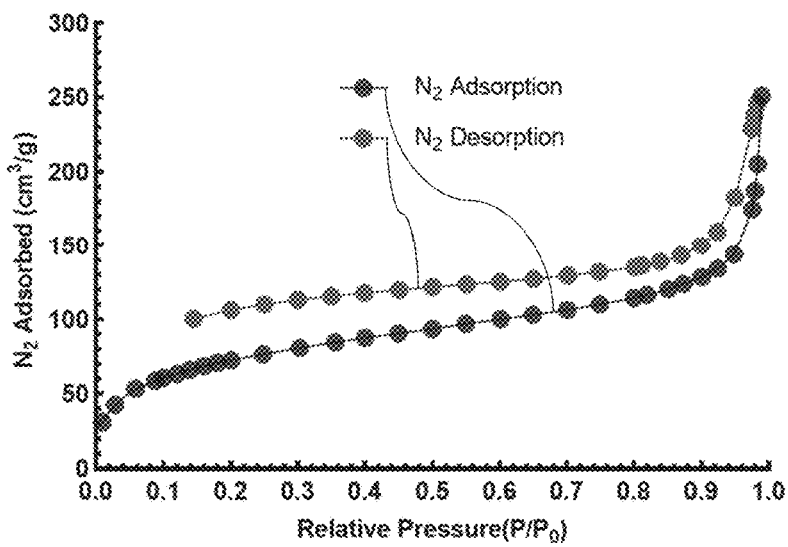
FIG. 36B shows, according to some embodiments, a $N_2$ adsorption-desorption isotherm of 20% $^iPr_2$NSBF-TBTrip-I 1% tetrabromide.
Figure 36C:
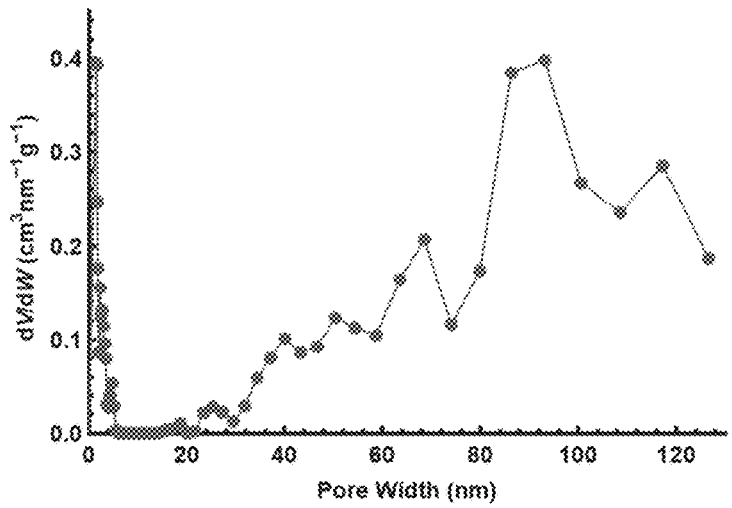
FIG. 36C shows, according to some embodiments, the pore size distribution of 20% $^i$Pr$_2$NSBF-TBTrip-I 1% tetrabromide.

20% $^i$Pr₂NSBF-TBTrip-I 1% Tetrabromide (see FIG. 36A): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), N,N'-((2',7'-dibromo-9,9'-spirobifluorene-2,7-diyl)bis(methylene))bis(N-isopropylpropan-2-amine) (71 mg, 0.1 mmol, 0.2 equiv), 2,7-dibromo-9,9'-spirobifluorene (185 mg, 0.39 mmol, 0.78 equiv), 2,2',7,7'-tetrabromo-9,9'-spirobifluorene (3.2 mg, 0.005 mmol, 0.01 equiv). The reaction mixture was stirred at 150° C. for 42 h. After Workup II, the title compound as a gray powder (360 mg, 95% yield). $^1$H NMR (600 MHz, CDCl$_3$) δ 7.98-7.75 (m, 2H), 7.60-7.33 (m, 4H), 7.32-7.10 (m, 6H), 7.00-6.87 (m, 4H), 6.64 (d, J=8.3 Hz, 2H), 6.56 (dd, J=18.4, 8.5 Hz, 2H), 6.45 (t, J=6.2 Hz, 2H), 5.55 (d, J=17.9 Hz, 2H), 3.58 (dd, J=28.9, 9.6 Hz, 0.4H), 2.95 (s, 0.4H), 1.25 (s, 18H), 0.94 (s, 2.4H). IR (neat, cm$^{-1}$) 3064, 3015, 2961, 2903, 2868, 1606, 1582, 1477, 1457, 1435, 1251, 1259, 1219, 1180, 1130, 996, 906, 865, 812, 728, 637. Molecular weight values were calculated using ChemStation GPC Data Analysis Software (Rev. B.01.01) based on the refractive index signal. Mn=22.9 kg/mol, Mw=64.1 kg/mol, PDI=2.8. The porosity of the polymer powder was measured using nitrogen adsorption isotherm at 77 K with a saturation pressure of P$_0$=1 bar (see FIG. 36B). BET surface area was calculated based on a p/po range from 0.06 to 0.20 for the adsorption measurement. 20 $^i$Pr₂NSBF-TBTrip-I 1% Tetrabromide has a Brunauer-Emmett-Teller (BET) internal surface area of 268 m$^2$g$^{-1}$. Pore-size distributions were analyzed using NLDFT based on the adsorption part of isotherm and carbon slit pore geometry (see FIG. 36C).

Figure 37A:
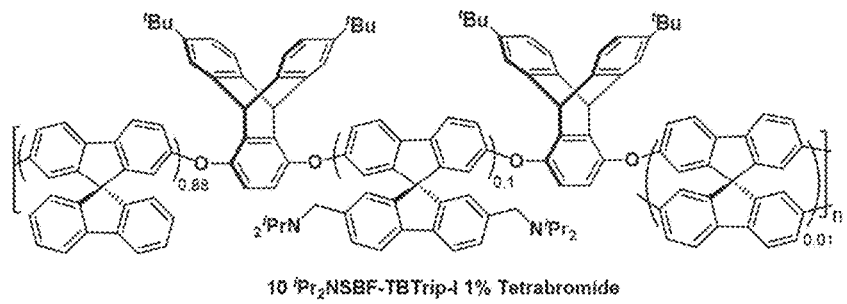
FIG. 37A shows, according to some embodiments, the structure of 10% $^i$Pr$_2$NSBF-TBTrip-I 1% tetrabromide.
Figure 37B:
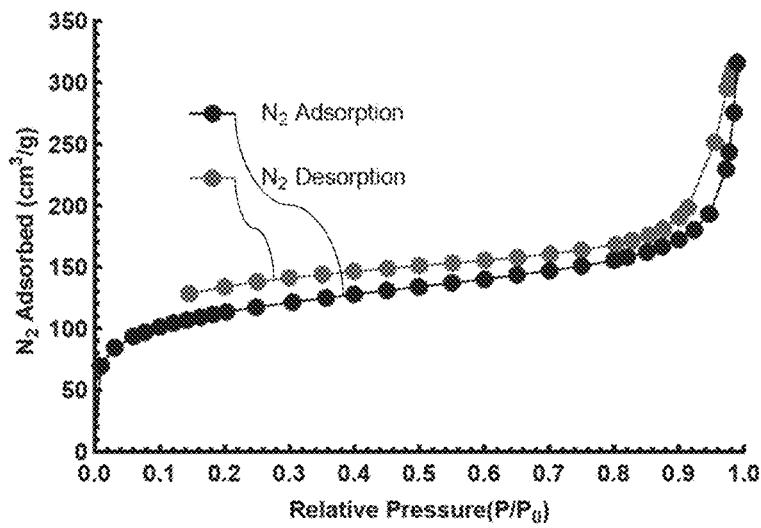
FIG. 37B shows, according to some embodiments, a N$_2$ adsorption-desorption isotherm of 10% $^i$Pr$_2$NSBF-TBTrip-I 1% tetrabromide.
Figure 37C:
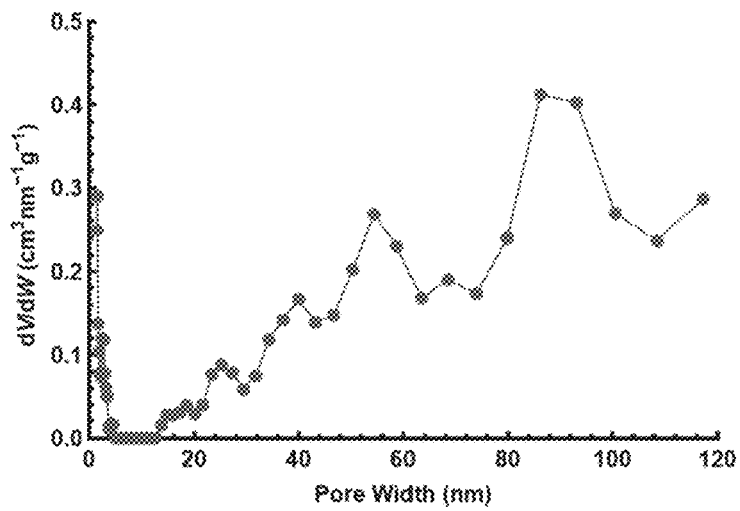
FIG. 37C shows, according to some embodiments, the pore size distribution of 10% $^i$Pr$_2$NSBF-TBTrip-I 1% tetrabromide.

10% $^i$Pr₂NSBF-TBTrip-I 1% tetrabromide (see FIG. 37A): The general procedure was followed on a 0.5 mmol scale using 6,15-di-tert-butyl-9,10-dihydro-9,10-[1,2]benzenoanthracene-1,4-diol (199 mg, 0.5 mmol, 1.0 equiv), N,N'-((2',7'-dibromo-9,9'-spirobifluorene-2,7-diyl)bis(methylene))bis(N-isopropylpropan-2-amine) (36 mg, 0.05 mmol, 0.1 equiv), 2,7-dibromo-9,9'-spirobifluorene (209 mg, 0.44 mmol, 0.78 equiv), 2,2',7,7'-tetrabromo-9,9'-spirobifluorene (3.2 mg, 0.005 mmol, 0.01 equiv). The reaction mixture was stirred at 150° C. for 20 h. After Workup II, the title compound as a gray powder (352 mg, 96% yield). $^1$H NMR (500 MHz, CDCl$_3$) δ 7.84-7.69 (m, 2H), 7.56-7.43 (m, 4H), 7.22-7.11 (m, 2H), 7.10-7.04 (m, 2H), 6.99-6.88 (m, 4H), 6.71-6.60 (m, 2H), 6.57-6.30 (m, 2H), 5.57-5.39 (m, 2H), 3.60 (s, 4H), 2.95 (s, 4H), 1.23 (s, 18H), 0.93 (d, J=6.4 Hz, 24H). IR (neat, cm$^{-1}$) 3064, 2961, 2904, 2868, 1606, 1582, 1477, 1458, 1426, 1260, 1220, 1130, 996, 908, 813, 732, 649. Molecular weight values were calculated using ChemStation GPC Data Analysis Software (Rev. B.01.01) based on the refractive index signal. Mn=25.3 kg/mol, Mw=77.7 kg/mol, PDI=3.1. The porosity of the polymer powder was measured using nitrogen adsorption isotherm at 77 K with a saturation pressure of P$_0$=1 bar (see FIG. 37B). BET surface area was calculated based on a p/po range from 0.06 to 0.20 for the adsorption measurement. 10 $^i$Pr₂NSBF-TBTrip-I 1% Tetrabromide has a Brunauer-Emmett-Teller (BET) internal surface area of 400 m$^2$g$^{-1}$. Pore-size distributions were analyzed using NLDFT based on the adsorption part of isotherm and carbon slit pore geometry (see FIG. 37C).

Figure 38:
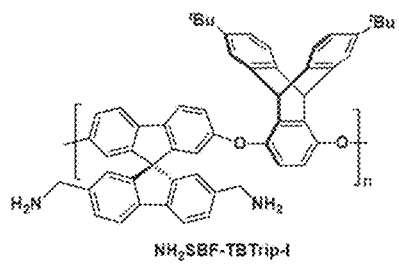
FIG. 38 shows, according to some embodiments, the structure of 10% $^i$Pr$_2$NSBF-TBTrip-I 1% tetrabromide.

NH₂SBF-TBTrip-I (see FIG. 38): CNSBF-TBTrip-I powder (100 mg) was stirred in anhydrous tetrahydrofuran (THF) (5 mL) under an inert atmosphere. Upon dissolution, the mixture was cooled to 0° C. and borane-dimethyl sulfide complex (0.1 mL) was added dropwise to the reaction mixture. The reaction mixture was stirred at room temperature overnight. Upon completion, the resulting polymer was precipitated in methanol (50 mL). The collected polymer was sonicated in HCl solution (5 mL, 1.0 M) for 0.5 h. And then NaOH (5 mL, 4.0 M) was added and the mixture was sonicated for another 0.5 h. The collected solid was washed repeatedly with water until neutral and dried at 120° C. under vacuum overnight. Yield: 85 mg (85%). IR (neat, cm-1) 2962, 2905, 2869, 2227, 1607, 1583, 1477, 1459, 1261, 1218, 1106, 995, 818, 644, 453.

Figure 39A:
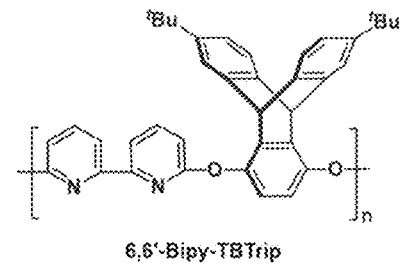
FIG. 39A shows, according to some embodiments, the structure of 6,6'-Bipy-TBTrip.
Figure 39B:
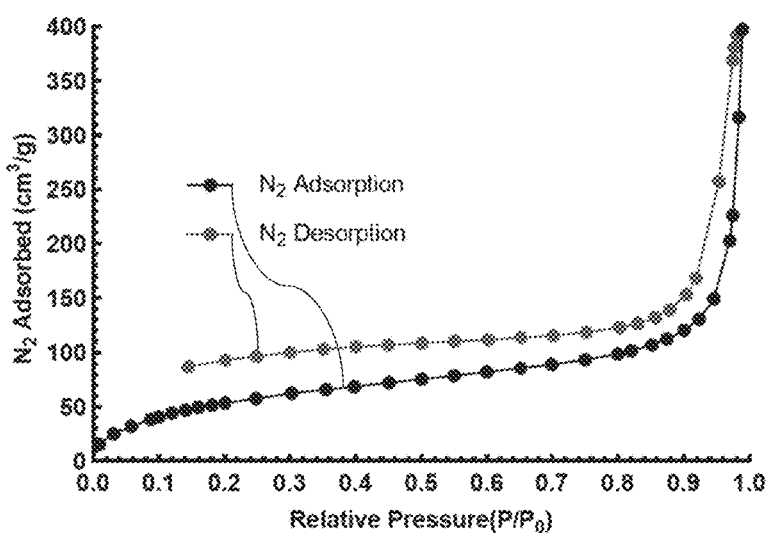
FIG. 39B shows, according to some embodiments, a N$_2$ adsorption-desorption isotherm of 6,6'-Bipy-TBTrip.
Figure 39C:
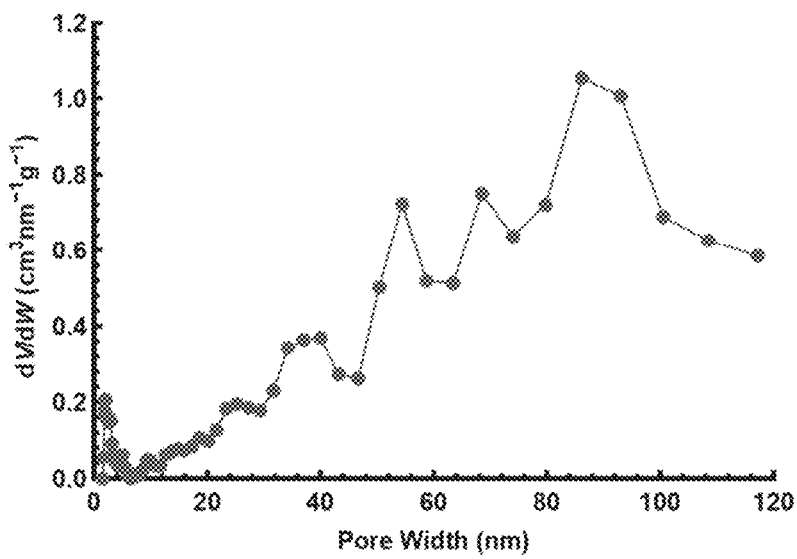
FIG. 39C shows, according to some embodiments, the pore size distribution of 6,6'-Bipy-TBTrip.

6,6'-Bipy-TBTrip (see FIG. 39A): The general procedure was followed on a 0.5 mmol scale using 6,15-di-tert-butyl-9,10-dihydro-9,10-[1,2]benzenoanthracene-1,4-diol (199 mg, 0.36 mmol, 1.0 equiv), 6,6'-dibromo-2,2'-bipyridine (162 mg, 0.5 mmol, 1.0 equiv, 95% purity). The reaction mixture was stirred at 140° C. for 72 h. After Workup II, the title compound as a gray powder (262 mg, 96% yield). $^1$H NMR (600 MHz, CDCl$_3$) δ 7.60-7.41 (m, 4H), 7.16 (d, J=6.7 Hz, 2H), 7.05 (dd, J=11.7, 7.7 Hz, 2H), 6.91 (s, 2H), 6.84 (s, 2H), 6.78-6.64 (m, 2H), 5.52 (s, 2H), 1.14 (s, 18H). $^{13}$C NMR (151 MHz, CDCl$_3$) δ 163.7, 153.8, 148.1, 145.8, 144.6, 141.9, 140.7, 140.7, 140.5, 123.6, 121.8, 121.4, 119.9, 115.8, 110.1, 48.5, 34.6, 31.6. IR (neat, cm$^{-1}$) 2962, 2868, 1666, 1582, 1565, 1480, 1426, 1238, 1212, 995, 866, 754. Molecular weight values were calculated using ChemStation GPC Data Analysis Software (Rev. B.01.01) based on the refractive index signal. Mn=18.5 kg/mol, Mw=32.5 kg/mol, PDI=1.8. The porosity of the polymer powder was measured using nitrogen adsorption isotherm at 77 K with a saturation pressure of P$_0$=1 bar (see FIG. 39B). BET surface area was calculated based on a p/po range from 0.06 to 0.20 for the adsorption measurement. 6,6'-Bipy-TBTrip has a Brunauer-Emmett-Teller (BET) internal surface area of 217 m$^2$g$^{-1}$. Pore-size distributions were analyzed using NLDFT based on the adsorption part of isotherm and carbon slit pore geometry (see FIG. 39C).

EXAMPLE 4

The following example describes the photoredox catalysis of various substrates and the synthesis of chiral poly(aryl ether)s.

Figure 40A:
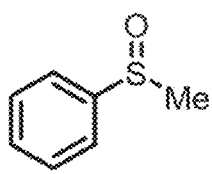
FIG. 40A shows, according to some embodiments, the structure of methyl phenyl sulfoxide.

Methyl phenyl sulfoxide (see FIG. 40A): To an oven-dried 20 mL scintillation vial equipped with a magnetic stir bar was added methyl phenyl sulfide (62 mg, 0.50 mmol), PDI-POP (0.65 mg, 0.018 mol % PDI relative to sulfide), and methanol (2.0 mL). The reaction mixture was sonicated for 1 min to disperse the catalyst. The vial was loosely capped, and the reaction mixture was stirred under irradiation by a blue (450 nm) LED lamp for 12 h or until SM consumption was determined by TLC. Then, methanol (5 mL) was added, and the crude mixture was filtered through a short plug of Celite (diatomaceous earth) to remove the catalyst and other insoluble byproducts, washing with additional methanol (5 mL). The filtrate was concentrated with the aid of a rotary evaporator. The title compound was isolated as a low-melting white solid (66 mg, 95% yield) by flash column chromatography on silica gel using dichloromethane/ether as the mobile phase.

Figure 40B:
FIG. 40B shows, according to some embodiments, the structure of 14-bromo-1,1,1,2,2,3,3,4,4,5,5,6,6,7,7,8,8,9,9-nonadecafluoro-11-iodotetradecane.

14-Bromo-1,1,1,2,2,3,3,4,4,5,5,6,6,7,7,8,8,9,9-nonadecafluoro-11-iodotetradecane (see FIG. 40B): To an oven-dried 250 mL round-bottom flask equipped with a magnetic stir bar was added 5-bromo-1-pentene (3.72 g, 25.0 mmol), perfluorooctyl iodide (17.7 g, 32.5 mmol), PDI-POP (91 mg, 0.05 mol % PDI relative to alkene), sodium L-ascorbate (1.73 g, 8.75 mmol), water (37 mL), and acetonitrile (75 mL). The flask was capped with a rubber septum and sealed tightly with paraffin film. Using a needle connected to a nitrogen-filled manifold, the reaction mixture was degassed through three freeze-pump-thaw cycles. After warming to rt and refilling the flask with nitrogen, the mixture was stirred vigorously under irradiation by a blue (450 nm) LED lamp for 8 h. Then, water (100 mL) was added and the mixture was filtered through Celite to remove the catalyst and other insoluble byproducts, washing with dichloromethane (50 mL). The crude mixture was extracted with dichloromethane (3×100 mL) and the combined organic phases were concentrated with the aid of a rotary evaporator. The title compound was isolated as a low-melting, slightly yellow, waxy solid (12.0 g, 65% yield) by flash column chromatography on silica gel using hexanes as the mobile phase.

Figure 40C:
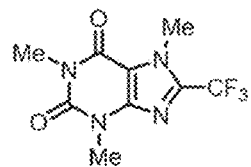
FIG. 40C shows, according to some embodiments, the structure of 1,3,7-trimethyl-8-(trifluoromethyl)-3,7-dihydro-1H-purine-2,6-dione.

1,3,7-Trimethyl-8-(trifluoromethyl)-3,7-dihydro-1H-purine-2,6-dione (see FIG. 40C): To an oven-dried 20 mL scintillation vial equipped with a magnetic stir bar was added caffeine (39 mg, 0.20 mmol), sodium trifluoromethanesulfinate (62 mg, 0.40 mmol), PDI-POP (14.5 mg, 1.0 mol % PDI relative to caffeine), and DMSO (1.0 mL). The vial was loosely capped, and the reaction mixture was stirred under irradiation by a blue (450 nm) LED lamp for 12 h or until SM consumption was determined by TLC. Then, methanol (5 mL) was added, and the crude mixture was filtered through a short plug of Celite (diatomaceous earth) to remove the catalyst and other insoluble byproducts, washing with additional methanol (5 mL). The filtrate was concentrated with the aid of a rotary evaporator. The title compound was isolated as a white powder (37 mg, 71% yield) by flash column chromatography on silica gel using ethyl acetate as the mobile phase.

Figure 40D:
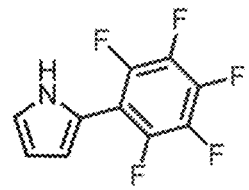
FIG. 40D shows, according to some embodiments, the structure of 2-(pentafluorophenyl)pyrrole.

2-(Pentafluorophenyl)pyrrole (see FIG. 40D): To an oven-dried microwave vial equipped with a magnetic stir bar was added pentafluorophenyl bromide (49 mg, 0.20 mmol), pyrrole (0.28 mL, 4.0 mmol), potassium bicarbonate (40 mg, 0.40 mmol), triethylamine (0.014 mL, 0.10 mmol), PDI-POP (14.5 mg, 1.0 mol % PDI relative to aryl bromide) and DMSO (1.0 mL). The vial was capped tightly with a septum-containing metal cap, and using a needle connected to a nitrogen-filled manifold, the reaction mixture was degassed through three freeze-pump-thaw cycles. After warming to rt and refilling the vial with nitrogen, the mixture was stirred under irradiation by a blue (450 nm) LED lamp, turning dark violet after 10-15 min. After 12 h, the crude mixture was poured into water (10 mL). The mixture was extracted with dichloromethane (3×10 mL) and combined organic extracts were filtered through magnesium sulfate. The filtrate was concentrated with the aid of a rotary evaporator. The title compound was isolated as a white solid (25 mg, 54% yield) by flash column chromatography on silica gel using hexane/dichloromethane as the mobile phase.

Figure 40E:
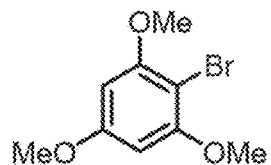
FIG. 40E shows, according to some embodiments, the structure of 2-bromo-1,3,5-trimethoxybenzene.

2-Bromo-1,3,5-trimethoxybenzene (see FIG. 40E): To an oven-dried 20 mL scintillation vial equipped with a magnetic stir bar was added 1,3,5-trimethoxybenzene (33 mg, 0.20 mmol), potassium bromide (119 mg, 1.0 mmol), PDI-POP (4.5 mg, 0.31 mol % PDI relative to 1,3,5-trimethoxybenzene), and DMSO (1.0 mL). The vial was loosely capped, and the reaction mixture was stirred under irradiation by a blue (450 nm) LED lamp for 36 h. Then, methanol (5 mL) was added, and the crude mixture was filtered through a short plug of Celite (diatomaceous earth) to remove the catalyst and other insoluble byproducts, washing with additional methanol (5 mL). The filtrate was concentrated with the aid of a rotary evaporator. The title compound was isolated as a white powder (45 mg, 90% yield) by flash column chromatography on silica gel using hexanes/ethyl acetate as the mobile phase.

Figure 40F:
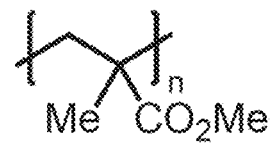
FIG. 40F shows, according to some embodiments, the structure of poly(methyl methacrylate)

Poly(methyl methacrylate) (see FIG. 40F): Methyl methacrylate was washed twice with equal volumes of 5% aqueous NaOH, then dried over sodium sulfate and filtered. The filtrate was purified by vacuum distillation at room temperature, and the purified monomer was stored in the freezer under argon. To an oven-dried microwave vial equipped with a magnetic stir bar was added purified methyl methacrylate (1.00 mL, 10.6 mmol), ethyl 2-bromoisobutyrate (21.2 mg, 0.109 mmol), perylene-POP (5.0 mg), and anhydrous DMF (1.0 mL). The vial was capped tightly with a septum-containing metal cap, and using a needle connected to a nitrogen-filled manifold, the reaction mixture was degassed through five freeze-pump-thaw cycles. The vial was placed into a rt water bath and stirred in direct sunlight for 6 h. Then, the vial was uncapped, and the cloudy mixture was poured into methanol (20 mL). The crude product was isolated by filtration and the solids were suspended in acetone (20 mL) and sonicated for 20 min. The insoluble colored solids were removed by filtration, and the filtrate was concentrated with the aid of a rotary evaporator to obtain the title polymer. The molecular weight distribution was determined by GPC using THF as an eluent ($M_n$=19,200, $M_w$=31,300, PDI=1.63).

Figure 41A:
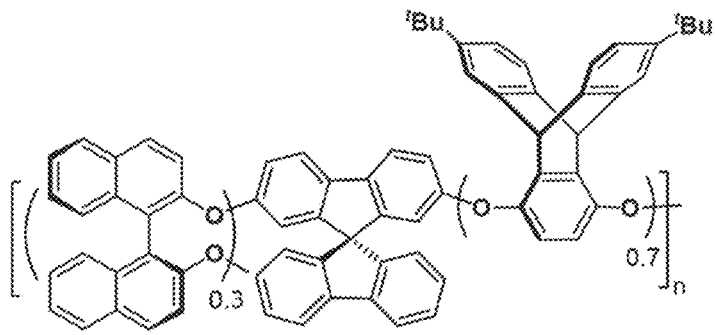
FIG. 41A shows, according to some embodiments, the structure of SBF-TBTrip-(S)-BINOL.

SBF-TBTrip-(S)-BINOL (see FIG. 41A): The general procedure was followed on a 0.5 mmol scale using 6,15-di-tert-butyl-9,10-dihydro-9,10-[1,2]benzenoanthracene-1,4-diol (139 mg, 0.7 mmol, 0.7 equiv), 2,7-dibromo-9,9'-spirobifluorene (237 mg, 0.5 mmol, 1.0 equiv), and (S)-(−)-1,1'-Bi(2-naphthol) (43 mg, 0.15 mmol, 0.3 equiv). The reaction mixture was stirred at 140° C. for 24 h. After workup, the title compound was obtained as a gray powder (311 mg, 91% yield). $^1$H NMR (500 MHz, CDCl$_3$) δ 7.95-7.87 (m), 7.87-7.69 (m), 7.59-7.30 (m, 6H), 7.26-7.15 (m), 7.14-7.01 (m), 7.00-6.89 (m), 6.88-6.70 (m), 6.64 (m), 6.61-6.48 (m), 6.44-6.35 (m), 6.33-6.26 (m), 6.24-6.18 (m), 5.62-5.47 (m), 1.24 (s). Molecular weight values were calculated using ChemStation GPC Data Analysis Software (Rev. B.01.01) based on the refractive index signal. $M_n$=16.7 kg/mol, $M_w$=27.6 kg/mol, PDI=1.7.

Figure 41B:
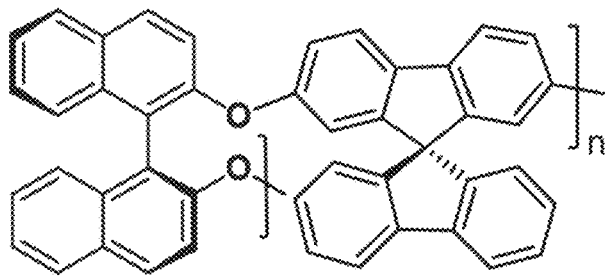
FIG. 41B shows, according to some embodiments, the structure of SBF-(S)-BINOL.

SBF-(S)-BINOL (see FIG. 41B): The general procedure was followed on a 0.5 mmol scale using 2,7-dibromo-9,9'- spirobifluorene (237 mg, 0.5 mmol, 1.0 equiv), and (S)-(−)-1,1'-Bi(2-naphthol) (143 mg, 0.5 mmol, 1.0 equiv). The reaction mixture was stirred at 140° C. for 24 h. After workup, the title compound was obtained as a gray powder (254 mg, 81% yield). $^1$H NMR (500 MHz, CDCl$_3$) δ 7.84-7.57 (m, 6H), 7.54-7.16 (m, 8H), 7.17-6.97 (m, 6H), 6.87-6.52 (m, 6H), 6.33-6.14 (m, 2H). Molecular weight values were calculated using ChemStation GPC Data Analysis Software (Rev. B.01.01) based on the refractive index signal. Mn=16.7 kg/mol, Mw=27.6 kg/mol, PDI=1.7.

What is claimed is:

1. A method of making a gas separation membrane comprising a poly(aryl ether), comprising:
   providing a first prepolymer comprising a monomer of a formula $(X)_x$—Ar—$(OH)_y$, wherein Ar comprises at least one aryl or heteroaryl group, X is a halogen or a halogen equivalent, each X is the same or different, and x+y is at least two;
   providing a second prepolymer comprising a comonomer of a formula $(X)_x$—Ar'—$(OH)_y$, wherein Ar' comprises at least one aryl or heteroaryl group, X is a halogen or a halogen equivalent, each X is the same or different, and x+y is at least two;
   providing a catalyst;
   providing a base;
   reacting the first prepolymer with the second prepolymer in the presence of the catalyst and the base to provide the poly(aryl ether); and
   forming the gas separation membrane.

2. The method of claim 1, wherein the poly(aryl ether) is of a formula [(—Ar—O—Ar'—O—)$_n$] or [(—Ar'—O—Ar—O—)$_n$], wherein n is greater than 1.

3. The method of claim 1, wherein the halogen is bromide, chloride, and/or iodide.

4. The method of claim 1, wherein the catalyst comprises a metal.

5. The method of claim 4, wherein the metal is palladium, nickel, or iron.

6. The method of claim 1, further comprising:
   providing a third prepolymer comprising a second comonomer of a formula $(X)_x$—Ar''-$(OH)_y$, wherein Ar'' comprises at least one aryl or heteroaryl group, X is a halogen or a halogen equivalent, each X is the same or different, and x+y is at least two, and
   reacting the first prepolymer with the second prepolymer and the third prepolymer in the presence of the catalyst and the base to provide the poly(aryl ether).

7. The method of claim 6, wherein the poly(aryl ether) is of a formula [(—Ar'—O—Ar—O—Ar''—O—)$_n$] or [(—Ar''—O—Ar—O—Ar'—O—)$_n$], wherein n is greater than 1.

8. The method of claim 1, further comprising:
   providing an endcapping agent; and
   reacting the first prepolymer with the second prepolymer and the endcapping agent in the presence of the catalyst and the base to provide the poly(aryl ether).

9. The method of claim 8, wherein the poly(aryl ether) is of a formula [(—Ar—O—Ar'—O—)$_n$EC], [EC(—Ar—O—Ar'—O—)$_n$], [EC—O—Ar'(—Ar—O—Ar'—O—)$_n$EC], [(—Ar'—O—Ar—O—)$_n$EC], [EC(—Ar'—O—Ar—O—)$_n$], [EC(—Ar'—O—Ar—O)$_n$—Ar'—EC], [EC(—Ar—O—Ar'—O—)$_n$Ar—EC], or [EC(—Ar'—O—Ar—O—)$_n$EC], wherein n is greater than 1 and EC is the endcapping agent.

10. The method of claim 8, wherein the endcapping agent comprises an alkyne, a polymer, a cyclic group, a heterocyclic group, and/or a nanoparticle.

11. The method of claim 8, wherein the endcapping agent comprises norbornene.

12. The method of claim 1, further comprising functionalizing the poly(aryl ether).

13. The method of claim 12, wherein the poly(aryl ether) is functionalized by halogenation, sulfonation, nitration, acylation, nitrene addition, carbene addition, radical addition, and/or chloromethylation.

14. The method of claim 1, wherein Ar and/or Ar' comprises a benzene group, a phenanthrene group, an iptycene group, a spirobi(indene) group, a fluorene group, a spirobifluorene group, a pyridine group, a bipyridine group, a phenanthroline group, a cyclopentane group, and/or a bicyclic ring structure, any of which may be optionally substituted.

* * * * *